US012600848B2

(12) United States Patent
Oshita et al.

(10) Patent No.: US 12,600,848 B2
(45) Date of Patent: Apr. 14, 2026

(54) RESIN COMPOSITION, MOLDED PRODUCT, LAMINATE, THERMOFORMED CONTAINER, BLOW-MOLDED CONTAINER, FILM, AGRICULTURAL FILM, PLANT MEDIUM, AND PIPE

(71) Applicant: KURARAY CO., LTD., Okayama (JP)

(72) Inventors: Mizuko Oshita, Kurashiki (JP); Yasuhiro Nonaka, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 678 days.

(21) Appl. No.: 17/800,652

(22) PCT Filed: Jun. 18, 2020

(86) PCT No.: PCT/JP2020/024040
§ 371 (c)(1),
(2) Date: Aug. 18, 2022

(87) PCT Pub. No.: WO2021/166276
PCT Pub. Date: Aug. 26, 2021

(65) Prior Publication Data

US 2023/0090237 A1 Mar. 23, 2023

(30) Foreign Application Priority Data

Feb. 21, 2020 (JP) ................................. 2020-028701

(51) Int. Cl.
*C08L 29/04* (2006.01)
*C08K 3/08* (2006.01)
*C08K 5/098* (2006.01)

(52) U.S. Cl.
CPC ................ *C08L 29/04* (2013.01); *C08K 3/08* (2013.01); *C08K 5/098* (2013.01); *C08K 2003/0812* (2013.01)

(58) Field of Classification Search
CPC ........... C08L 29/04; C08K 3/08; C08K 5/098; C08K 2003/0812
(Continued)

(56) References Cited

U.S. PATENT DOCUMENTS

| | | |
|---|---|---|
| 5,894,051 A | 4/1999 | Andreussi et al. |
| 7,683,135 B2 | 3/2010 | Uchiumi et al. |

(Continued)

FOREIGN PATENT DOCUMENTS

| | | |
|---|---|---|
| CN | 1777642 A | 5/2006 |
| CN | 103635526 A | 3/2014 |

(Continued)

OTHER PUBLICATIONS

International Search Report issued in corresponding International Patent Application No. PCT/JP2020/024040 dated Aug. 4, 2020.

(Continued)

*Primary Examiner* — Ruiyun Zhang
(74) *Attorney, Agent, or Firm* — Morgan, Lewis & Bockius LLP

(57) ABSTRACT

Provided are: a resin composition which inhibits the generation of aggregates at the time of melt molding and enables obtaining a molded product which has sufficient heat/light resistance and is unlikely to break down into microplastics after being discarded, the above-mentioned characteristics being sufficiently improved compared to a resin composition obtained using the same ethylene-vinyl alcohol copolymer (EVOH), and the like. The resin composition contains: an ethylene-vinyl alcohol copolymer (A); and an aluminum ion (B), wherein at least a part of the ethylene-vinyl alcohol copolymer (A) comprises, at a polymer end, at least one of a carboxylic acid unit (I) and a lactone ring unit (II), a total content (i+ii) of the carboxylic acid unit (I) and the lactone ring unit (II) per gram of the ethylene-vinyl alcohol copo- (Continued)

lymer (A) is 14 μmol/g or more and 78 μmol/g or less, and a content (b) of the aluminum ion (B) per gram of the ethylene-vinyl alcohol copolymer (A) is 0.002 μmol/g or more and 0.17 μmol/g or less.

19 Claims, 9 Drawing Sheets

(58) Field of Classification Search
USPC ........................................................ 524/399
See application file for complete search history.

(56) References Cited

U.S. PATENT DOCUMENTS

| | | | |
|---|---|---|---|
| 9,073,293 | B2 | 7/2015 | Yamasaki et al. |
| 9,663,592 | B2 | 5/2017 | Okamoto et al. |
| 11,015,038 | B2 | 5/2021 | Seno et al. |
| 2007/0106031 | A1 | 5/2007 | Uchiumi et al. |
| 2008/0061270 | A1 | 3/2008 | Tsuji et al. |
| 2013/0018133 | A1 | 1/2013 | Yamasaki et al. |
| 2014/0213701 | A1 | 7/2014 | Nonaka et al. |
| 2015/0210788 | A1 | 7/2015 | Okamoto et al. |
| 2017/0183426 | A1 | 6/2017 | Kawai et al. |
| 2019/0292359 | A1 | 9/2019 | Inoue et al. |
| 2019/0315941 | A1 | 10/2019 | Seno et al. |

FOREIGN PATENT DOCUMENTS

| | | | |
|---|---|---|---|
| CN | 106795232 | A | 5/2017 |
| CN | 109996843 | A | 7/2019 |
| JP | H11-001565 | A | 1/1999 |
| JP | 2004-018806 | A | 1/2004 |
| JP | 2007-063428 | A | 3/2007 |
| JP | 2014-034647 | A | 2/2014 |
| JP | 2014-111793 | A | 6/2014 |
| TW | 200500203 | A | 1/2005 |
| TW | 200607459 | A | 3/2006 |
| TW | 201202333 | A | 1/2012 |
| TW | 201831531 | A | 9/2018 |
| WO | 2004/092234 | A1 | 10/2004 |
| WO | 2005/061613 | A1 | 7/2005 |
| WO | 2005/123248 | A1 | 12/2005 |
| WO | 2018/124234 | A1 | 7/2018 |

OTHER PUBLICATIONS

Written Opinion issued in corresponding International Patent Application No. PCT/JP2020/024040 dated Aug. 4, 2020.

RESIN COMPOSITION, MOLDED PRODUCT, LAMINATE, THERMOFORMED CONTAINER, BLOW-MOLDED CONTAINER, FILM, AGRICULTURAL FILM, PLANT MEDIUM, AND PIPE

TECHNICAL FIELD

The present invention relates to a resin composition, a molded product, a laminate, a thermoformed container, a blow-molded container, a film, an agricultural film, a plant medium, and a pipe.

DISCUSSION OF THE BACKGROUND

Typically, ethylene-vinyl alcohol copolymers (hereinafter, may be also referred to as "EVOH(s)") are superior in terms of transparency, gas barrier properties, aroma retention, solvent resistance, oil resistance, and the like. By making use of such characteristics, EVOHs are used in films, sheets, containers, and the like as packaging materials for foods, medical drugs, industrial drugs, pesticides, and the like. Furthermore, making use of the barrier properties, heat retention, pollution resistance, and the like thereof, EVOHs are also used for purposes such as fuel tanks for vehicles such as automobiles, tube materials for tires, agricultural films, geomembranes, cushion materials for shoes, and the like.

Compared to other resins, EVOHs are inferior in thermal stability, whereby aggregates and the like may be generated in heat treatment and mold processing. Furthermore, when EVOHs are exposed to light, heat, and the like due to outdoor use, mechanical strength may deteriorate. With regard to the thermal stability of EVOHs, Patent Document 1 discloses an EVOH containing an ethylene unit (III), a vinyl alcohol unit (IV), and a vinyl ester unit (V), wherein a proportion of the ethylene unit (III) in a total (III+IV+V) of the units ranges from 20 to 60 mol %, and a proportion of a total (I+II) of a carboxylic acid unit (I) and a lactone ring unit (II) at polymer ends of the copolymer with respect to the total (III+IV+V) of the units is 0.12 mol % or less. According to Patent Document 1, due to such an EVOH, in which the carboxylic acid unit and the lactone ring unit at the ends are scarce, aggregates and the like are unlikely to be generated in heat treatment and mold processing, whereby it is considered that long-run workability at the time of melt molding is improved.

PRIOR ART DOCUMENTS

Patent Documents

Patent Document 1: PCT International Publication No. 2004/092234

SUMMARY OF THE INVENTION

Problems to be Solved by the Invention

However, the EVOH of Patent Document 1 is an EVOH in which the ratio of the total (I+II) of the carboxylic acid unit (I) and the lactone ring unit (II) is 0.12 mol % or less, and in a case of an EVOH in which the ratio of this total is high, improving the thermal stability, or in other words, inhibiting aggregates which are generated in heat treatment and mold processing, is not enabled. Furthermore, the EVOH of Patent Document 1 does not give consideration to heat/light resistance which considers outdoor usage over a long period. Moreover, in recent years, discarded plastic products flowing into the sea, breaking down into microplastics, and polluting the sea has become a problem. Thus, there is a demand for development of a resin which is less likely to break down into microplastics. In particular, as shown, for example, in Table 11 (Comparative Examples 18 to 20) of EXAMPLES, described later, the inventors have discovered that an EVOH such as the EVOH of Patent Document 1, in which the ratio of the total (I+II) of the carboxylic acid unit (I) and the lactone ring unit (II) is low, is likely to break down into microplastics.

On the other hand, the structure of the EVOH itself, such as the ethylene content and the like, affect the EVOH characteristics, such as thermal stability, heat/light resistance, and the like. Thus, by adjusting the ethylene content and the like, it is somewhat possible to improve the thermal stability, the heat/light resistance, and the like. However, since typically, an EVOH having an ethylene content and the like suitable for, e.g., an intended usage as a molded product is used, it is desirable to improve characteristics such as the thermal stability, the heat/light resistance, and the like without altering the EVOH itself.

The present invention was made in view of the foregoing circumstances, and it is an object of the present invention to provide: a resin composition which inhibits the generation of aggregates at the time of melt molding and enables obtaining a molded product having sufficient heat/light resistance and being unlikely to break down into microplastics after being discarded, wherein the above-mentioned characteristics are sufficiently improved compared to a resin composition obtained using the same EVOH; and a molded product, a laminate, a thermoformed container, a blow-formed container, a film, an agricultural film, a plant medium, and a pipe, the resin composition being contained in each of these.

Means for Solving the Problems

According to the present invention, the object of the invention is accomplished by providing any one of the following:

(1) A resin composition containing: an ethylene-vinyl alcohol copolymer (A); and an aluminum ion (B), wherein at least a part of the ethylene-vinyl alcohol copolymer (A) has, at a polymer end, at least one of a carboxylic acid unit (I) and a lactone ring unit (II), a total content (i+ii) of the carboxylic acid unit (I) and the lactone ring unit (II) per gram of the ethylene-vinyl alcohol copolymer (A) is 14 μmol/g or more and 78 μmol/g or less, and a content (b) of the aluminum ion (B) per gram of the ethylene-vinyl alcohol copolymer (A) is 0.002 μmol/g or more and 0.17 μmol/g or less.

(2) The resin composition according to (1), wherein a ratio ((i+ii)/b) of the total content (i+ii) of the carboxylic acid unit (I) and the lactone ring unit (II) to the content (b) of the aluminum ion (B) is 180 or more and 20,000 or less.

(3) The resin composition according to (1) or (2), wherein the aluminum ion (B) is derived from a fatty acid aluminum salt having 5 or fewer carbon atoms.

(4) The resin composition according to any one of (1) to (3), further containing at least one type of a compound (C) selected from the group consisting of a cinnamic acid component and a conjugated polyene compound having a molecular weight of 1,000 or less, wherein a content (c) of the compound (C) with respect to the ethylene-vinyl alcohol copolymer (A) is 1 ppm or more and 1,000 ppm or less.

(5) The resin composition according to any one of (1) to (4), wherein a proportion ((ii)/(i+ii)) of a content (ii) of the lactone ring unit (II) with respect to the total content (i+ii) of the carboxylic acid unit (I) and the lactone ring unit (II) is 40 mol % or more.

(6) The resin composition according to any one of (1) to (5), wherein the ethylene-vinyl alcohol copolymer (A) includes: an ethylene-vinyl alcohol copolymer (A1) having an ethylene unit content of 20 mol % or more and 50 mol % or less; and an ethylene-vinyl alcohol copolymer (A2) having an ethylene unit content of 30 mol % or more and 60 mol % or less, a value obtained by subtracting the ethylene unit content of the ethylene-vinyl alcohol copolymer (A1) from the ethylene unit content of the ethylene-vinyl alcohol copolymer (A2) is 5 mol % or more, and a mass ratio (A1/A2) of the ethylene-vinyl alcohol copolymer (A1) to the ethylene-vinyl alcohol copolymer (A2) is 60/40 or more and 95/5 or less.

(7) The resin composition according to any one of (1) to (5), further containing: a polyamide (D); and at least one type of a metal atom (E) selected from the group consisting of atoms of magnesium, calcium, and zinc, wherein a mass ratio (D/A) of the polyamide (D) to the ethylene-vinyl alcohol copolymer (A) is 5/95 or more and 40/60 or less, and a content (e), in terms of metal element equivalent, of the metal atom (E) with respect to the ethylene-vinyl alcohol copolymer (A) is 1 ppm or more and 500 ppm or less.

(8) The resin composition according to any one of (1) to (5), further containing a thermoplastic elastomer (F), wherein a mass ratio (F/A) of the thermoplastic elastomer (F) to the ethylene-vinyl alcohol copolymer (A) is 5/95 or more and 35/65 or less.

(9) The resin composition according to (8), wherein the thermoplastic elastomer (F) is at least one selected from the group consisting of a thermoplastic polyester elastomer, a thermoplastic polystyrene elastomer, and a thermoplastic polyolefin elastomer.

(10) The resin composition according to any one of (1) to (9), further containing an antioxidant (G), wherein a content (g) of the antioxidant (G) with respect to the ethylene-vinyl alcohol copolymer (A) is 0.01% by mass or more and 5% by mass or less.

(11) The resin composition according to any one of (1) to (10), further containing an inorganic particle (H), wherein a content (h) of the inorganic particle (H) with respect to the ethylene-vinyl alcohol copolymer (A) is 50 ppm or more and 5,000 ppm or less.

(12) A molded product formed from the resin composition according to any one of (1) to (11).

(13) A laminate including: a layer constituted from the resin composition according to any one of (1) to (11); and at least one other layer.

(14) A thermoformed container including a layer constituted from the resin composition according to any one of (1) to (11).

(15) A blow-molded container including a layer constituted from the resin composition according to any one of (1) to (11).

(16) A film including a layer constituted from the resin composition according to any one of (1) to (11).

(17) The film according to (16), further having an inorganic vapor deposition layer.

(18) An agricultural film including a layer constituted from the resin composition according to any one of (1) to (11).

(19) A plant medium constituted from the resin composition according to any one of (1) to (11).

(20) A pipe including a layer constituted from the resin composition according to any one of (1) to (11).

Effects of the Invention

The present invention can provide: a resin composition which inhibits the generation of aggregates at the time of melt molding and enables obtaining a molded product having sufficient heat/light resistance and being unlikely to break down into microplastics after being discarded, wherein the above-mentioned characteristics are sufficiently improved compared to a resin composition obtained using the same EVOH; and a molded product, a laminate, a thermoformed container, a blow-formed container, a film, an agricultural film, a plant medium, and a pipe, the resin composition being used in each of these.

DESCRIPTION OF EMBODIMENTS

Resin Composition

Figure 1:
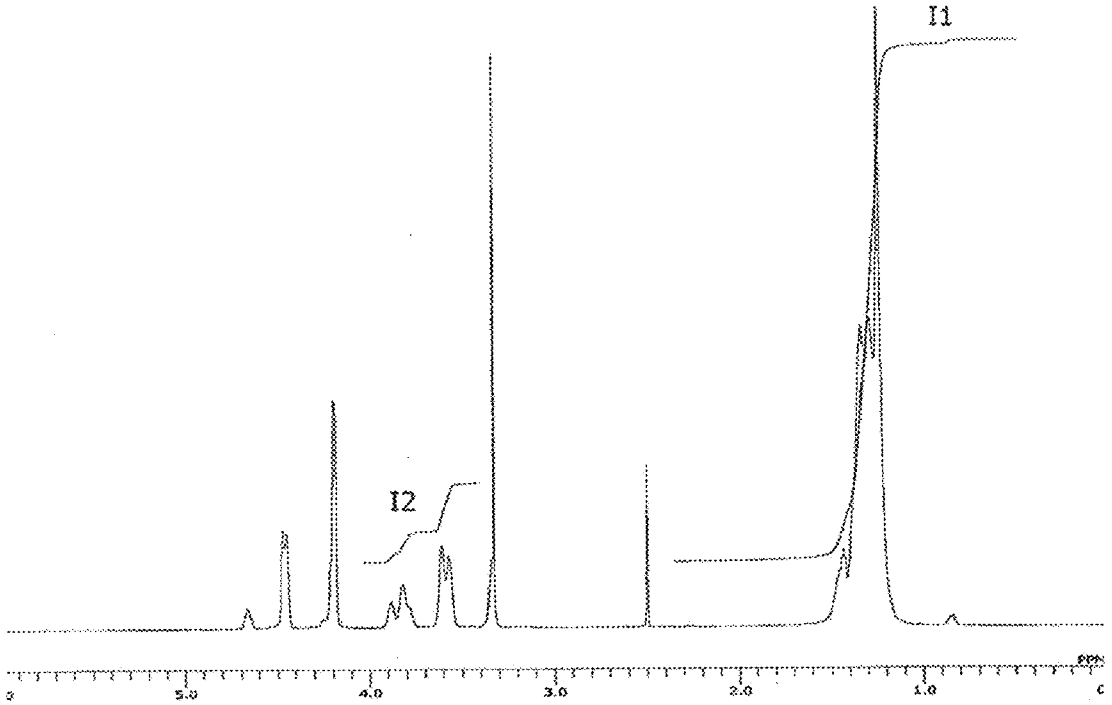
FIG. 1 shows a $^1$H-NMR spectrum of EVOH-A of Synthesis Example 1 when measured under conditions involving a solvent of DMSO-$d_6$ and a measurement temperature of 25° C.
Figure 2:
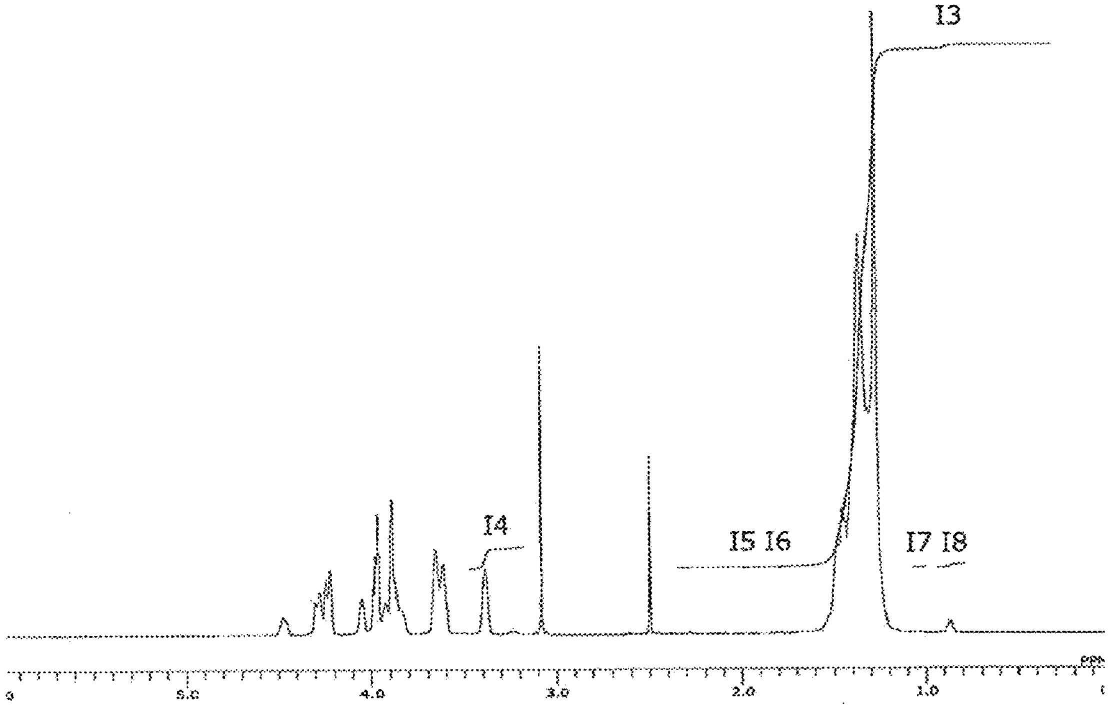
FIG. 2 shows a $^1$H-NMR spectrum of EVOH-A of Synthesis Example 1 when measured under conditions involving a solvent of DMSO-$d_6$ and a measurement temperature of 80° C.
Figure 3:
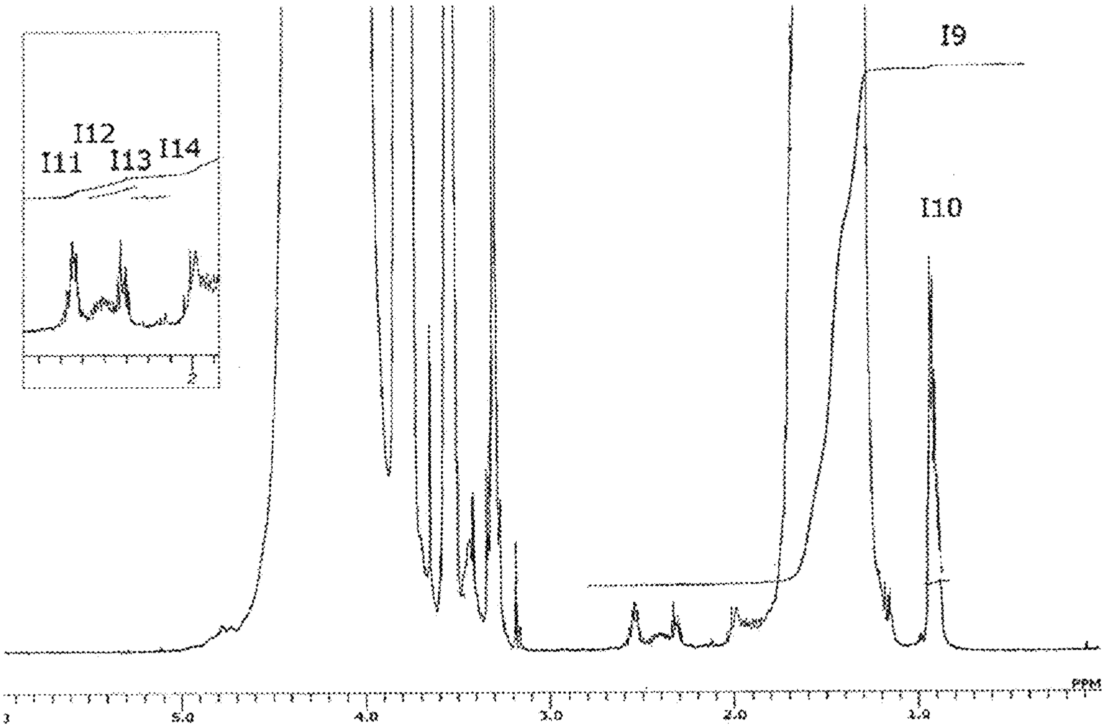
FIG. 3 shows a $^1$H-NMR spectrum of EVOH-A of Synthesis Example 1 when measured under conditions involving a solvent of $D_2O$+MeOD and a measurement temperature of 80° C.

The resin composition according to the embodiment of the present invention contains an ethylene-vinyl alcohol copolymer (A) (hereinafter, may be also referred to as "EVOH (A)") and an aluminum ion (B). At least a part of the EVOH (A) has, at a polymer end, at least one of a carboxylic acid unit (I) and a lactone ring unit (II). A total content (i+ii) of the carboxylic acid unit (I) and the lactone ring unit (II) per gram of the EVOH (A) is 14 μmol/g or more and 78 μmol/g or less. A content (b) of the aluminum ion (B) per gram of the EVOH (A) is 0.002 μmol/g or more and 0.17 μmol/g or less.

The resin composition according to the embodiment of the present invention inhibits the generation of aggregates at the time of melt molding and enables obtaining a molded product which has sufficient heat/light resistance and is unlikely to break down into microplastics after being discarded, wherein the above-mentioned characteristics are sufficiently improved compared to a resin composition obtained using the same EVOH. Thus, due to the resin composition according to the embodiment of the present invention, the generation of aggregates can be further inhibited, and the heat/light resistance and the resistance to breaking down into microplastics of, e.g., the molded product to be obtained can be improved without altering the type of EVOH. Although the reasons for achieving such effects are not clarified, it is speculated as follows. Due to an interaction of a certain amount of the aluminum ion (B) with the carboxylic acid unit (I) and the lactone ring unit (II) at the end of the EVOH (A), a stable structure is formed. Consequently, gelation at a time of melt molding is inhibited, and as a result, the generation of aggregates is inhibited. Further, with regard to the molded product to be obtained as well, it is presumed that as the result of the stable structure being formed, the molded product is superior in terms of the heat/light resistance and unlikely to break down into microplastics after being discarded.

The resin composition according to the embodiment of the present invention may further contain component(s) other than the EVOH (A) and the aluminum ion (B). Each component and the like of the resin composition according to the embodiment of the present invention will be described below.

EVOH (A)

The EVOH (A) is a copolymer having an ethylene unit and a vinyl alcohol unit. The EVOH (A) is typically obtained by a saponification reaction of an ethylene-vinyl ester copolymer. Thus, the EVOH (A) may further have a remaining vinyl ester unit. In other words, the EVOH (A) is a copolymer which has the ethylene unit and the vinyl alcohol unit, and which further has or does not have the vinyl ester unit as an optional monomer unit. The production and saponification of the ethylene-vinyl ester copolymer may be performed by a well-known method. The vinyl ester is typified by vinyl acetate, but may be another fatty acid vinyl ester such as vinyl formate, vinyl propionate, vinyl valerate, vinyl caprate, vinyl laurate, vinyl stearate, vinyl pivalate, vinyl versatate, or the like.

At least a part of the EVOH (A) has, at a polymer end (end of a main chain), at least one of a carboxylic acid unit (I) and a lactone ring unit (II). The carboxylic acid unit (I) refers to a structural unit having a carboxy group and being positioned at the polymer end. The carboxylic acid unit (I) may be also referred to as the terminal carboxylic acid unit. A part or all of the carboxy groups included in the carboxylic acid unit (I) may be present in the state of a salt or an anion ($—COO^-$). The lactone ring unit (II) refers to a structural unit having a lactone ring and being positioned at the polymer end. The lactone ring unit (II) may be also referred to as the terminal lactone ring unit. The number of ring atoms in the lactone ring is not particularly limited, and the lactone ring may be, for example, a 4 to 6-membered ring, and is preferably a 5-membered ring. The carboxylic acid unit (I) may, for example, be a structural unit represented by the following formula (1). The lactone ring unit (II) may be, for example, a structural unit represented by the following formula (2).

(1)

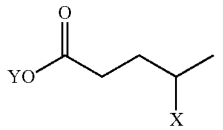

(2)

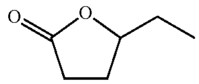

In the formula (1), X represents a hydrogen atom, a hydroxy group, or an esterified hydroxy group; and Y represents a hydrogen atom or a metal atom.

Examples of the esterified hydroxy group which may be represented by X include $—OCO—CH_3$, $—OCO—C_2H_5$, and the like.

Examples of the metal atom which may be represented by Y include atoms of alkali metals such as sodium; alkaline earth metals such as magnesium and calcium; metals being main group elements such as aluminum; transition metals; and the like. Of these, atoms of the main group elements are preferred, and atoms of the alkali metals, the alkaline earth metals, and aluminum are preferred. In the case in which Y represents an aluminum atom, the aluminum atom is contained in the aluminum ion (B). In a case in which Y represents a metal atom having a valency of 2 or greater, 2 or more carboxylate anions ($—COO^-$) may be bonded or coordinated to one Y.

The lower limit of a total content (i+ii) of the carboxylic acid unit (I) and the lactone ring unit (II) per gram of the ethylene-vinyl alcohol copolymer (A), i.e., a total amount (amount of substance: mol number) of the carboxylic acid unit (I) and the lactone ring unit (II) present per gram of the EVOH (A) is 14 μmol/g, preferably 18 μmol/g, and more preferably 22 μmol/g. Furthermore, the lower limit of the total content of the carboxylic acid unit (I) and the lactone ring unit (II) in the EVOH (A) with respect to ethylene units, vinyl alcohol units, and vinyl ester units is preferably 0.10 mol %, more preferably 0.12% mol, and still more preferably 0.14 mol %. When the total content of the carboxylic acid unit (I) and the lactone ring unit (II) is greater than or equal to the lower limits, the interaction with the aluminum ion (B) sufficiently occurs, and in particular, the resistance to breaking down into microplastics improves.

On the other hand, the upper limit of the total content (i+ii) of the carboxylic acid unit (I) and the lactone ring unit (II) per gram of the ethylene-vinyl alcohol copolymer (A) is 78 μmol/g, preferably 70 μmol/g, more preferably 60 μmol/g, still more preferably 50 μmol/g, and particularly preferably 40 μmol/g. Furthermore, the upper limit of the total content of the carboxylic acid unit (I) and the lactone ring unit (II) in the EVOH (A) with respect to ethylene units, vinyl alcohol units, and vinyl ester units is preferably 0.4 mol %, more preferably 0.3% mol, and still more preferably 0.25 mol %. In a case in which the carboxylic acid unit (I) and the lactone ring unit (II) are excessive, the thermal stability may deteriorate. Specifically, at high temperatures, the carboxylic acid unit (I) and the lactone ring unit (II) may react with the hydroxy group of the EVOH (A) to produce a branched polymer having a high degree of polymerization. Thus, when the content of the carboxylic acid unit (I) and the lactone ring unit (II) is high, there is a tendency for the melt moldability of the EVOH (A) to deteriorate. Accordingly, when the total content of the carboxylic acid unit (I) and the lactone ring unit (II) is less than or equal to the upper limits, generation of aggregates at the time of mold molding can be inhibited.

The lower limit of a proportion (ii/(i+ii): lactone ring unit proportion) of the content (ii) of the lactone ring unit (II) with respect to the total content (i+ii) of the carboxylic acid unit and the lactone ring unit (II) may be, for example, 30 mol %, and is preferably 40 mol %, and more preferably 50 mol %. In a case in which the lactone ring unit proportion (ii/(i+ii)) is greater than or equal to the lower limit, due to, e.g., the generation of an effective interaction with the aluminum ion (B), there is a tendency for the heat/light resistance and the resistance to breaking down into microplastics to be further improved. On the other hand, the upper limit of the lactone ring unit proportion (ii/(i+ii)) may be, for example, 90 mol %, and may be 80 mol % or 70 mol %.

The total content (i+ii) of the carboxylic acid unit (I) and the lactone ring unit (II) per gram of the EVOH (A) is adjusted in accordance with, for example, polymerization conditions such as a type of polymerization initiator, drying conditions such as a drying atmosphere, and the like. In the EVOH (A) not having a branched structure, there is a tendency for the total content (i+ii) of the carboxylic acid unit (I) and the lactone ring unit (II) to become relatively low when the degree of polymerization is high, but there are many cases that are not consistent with this tendency. For example, as disclosed in Patent Document 1, the total content (i+ii) of the carboxylic acid unit (I) and the lactone ring unit (II) can be reduced by bringing a reducing agent into contact with the ethylene-vinyl ester copolymer or the EVOH. Conversely, the total content (i+ii) of the carboxylic acid unit (I) and the lactone ring structure (II) can be increased by, for example, bringing an oxidizing agent into contact with the ethylene-vinyl ester copolymer or the EVOH, and/or performing drying in an oxidizing atmosphere. Furthermore, the proportion (ii/(i+ii): lactone ring unit proportion) of the content (ii) of the lactone ring unit (II) with respect to the total content (i+ii) of the carboxylic acid unit and the lactone ring unit (II) can be adjusted by saponification conditions and/or the like. For example, when saponification is performed under conditions in which saponification is promoted, there is a tendency for the lactone ring unit proportion (ii/(i+ii)) to increase.

The total content (i+ii) of the carboxylic acid unit (I) and the lactone ring unit (II) at the polymer end of the EVOH (A), and the lactone ring unit proportion (ii/(i+ii)) are determined by $^{1}$H-NMR measurement. It is to be noted that the inventors have found that the measurement results differ depending on a type of solvent used in the measurement. Thus, the measurement should be performed using a mixed solvent of water/methanol (mass ratio of 4/6, wherein the mass ratio is appropriately changed in a case in which a test material does not dissolve). Specifically, the total content (i+ii) of the carboxylic acid unit (I) and the lactone ring unit (II), and the lactone ring unit proportion (ii/(i+ii)) are values measured in accordance with a method described in EXAMPLES, described later.

The lower limit of a content of the ethylene unit in the EVOH (A) is preferably 10 mol %, more preferably 15 mol %, still more preferably 20 mol %, and may be yet more preferably 25 mol %. On the other hand, the upper limit of the content of the ethylene unit in the EVOH (A) is preferably 60 mol % and more preferably 55 mol %, and may be still more preferably 50 mol % or 45 mol %. When the content of the ethylene unit is greater than or equal to the lower limit, the thermal stability, the resistance to breaking down into microplastics, and the like tend to improve. Furthermore, when the content of the ethylene unit is less than or equal to the lower limit, oxygen barrier properties and the like tend to improve.

The lower limit of a degree of saponification of the EVOH (A) is preferably 90 mol %, more preferably 95 mol %, still more preferably 99 mol %, and particularly preferably 99.6 mol %. When the degree of saponification of the EVOH (A) is greater than or equal to the lower limit, for example, the melt moldability, as well as the gas barrier properties, heat/light resistance, and moisture resistance of the molded product and the like to be obtained tend to become favorable. Furthermore, the degree of saponification may be 100 mol % or less, 99.97 mol % or less, or 99.94 mol % or less.

The EVOH (A) may have, within a range not leading to impairment of the effects of the present invention, a unit derived from a monomer other than carboxylic acid unit (I), the lactone ring unit (II), the ethylene, the vinyl ester, and the saponification product thereof. A content of the unit derived from the other monomer (the unit other than the carboxylic acid unit (I), the lactone ring unit (II), the ethylene unit, the vinyl ester unit, and the vinyl alcohol unit) with respect to total structural units of the EVOH (A) is preferably 30 mol % or less, more preferably 20 mol % or less, still more preferably 10 mol % or less, yet more preferably 5 mol % or less, and particularly preferably 1 mol % or less. Furthermore, in the case in which the EVOH (A) has the unit derived from the other monomer, the content thereof may be 0.05 mol % or more, or may be 0.1 mol % or more.

Examples of the other monomer include: unsaturated acids such as acrylic acid, methacrylic acid, crotonic acid, and itaconic acid, or anhydrides, salts, or mono- or dialkyl esters thereof; nitriles such as acrylonitrile and methacrylonitrile; amides such as acrylamide and methacrylamide; olefin sulfonic acids such as vinyl sulfonic acid, allylsulfonic acid, and methallylsulfonic acid, or salts thereof; vinyl silane compounds such as vinyltrimethoxysilane, vinyltriethoxysilane, vinyl tris(β-methoxy-ethoxy)silane, and γ-methacryloxypropyl methoxysilane; alkyl vinyl ethers; vinyl ketone; N-vinylpyrrolidone; vinyl chloride; vinylidene chloride; and the like.

Furthermore, the unit derived from the other monomer may be at least one of a structural unit (X) represented by the following formula (I), a structural unit (Y) represented by the following formula (II), and a structural unit (Z) represented by the following formula (III).

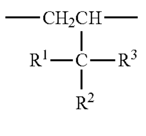

(I)

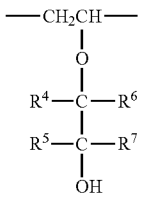

(II)

-continued (III)

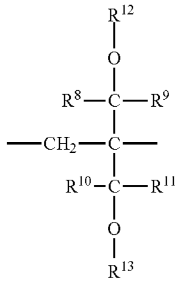

In the above formulae, $R^1$, $R^2$, $R^3$, $R^4$, $R^5$, $R^6$, $R^7$, $R^8$, $R^9$, $R^{10}$, and $R^{11}$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. A pair from $R^1$, $R^2$, and $R^3$; $R^4$ and $R^5$; and $R^6$ and $R^7$ may be bonded (except in a case in which both of the pair from $R^1$, $R^2$, and $R^3$ represent hydrogen atoms, and a case in which both of $R^4$ and $R^5$ or $R^6$ and $R^7$ represent hydrogen atoms). Furthermore, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxy group, an alkoxy group, a carboxyl group, or a halogen atom. In the above formulae, $R^{12}$ and $R^{13}$ each independently represent a hydrogen atom, a formyl group, or an alkanoyl group having 2 to 10 carbon atoms.

In the case in which the EVOH (A) has the structural unit (X), (Y), or (Z), there is a tendency for the flexibility and processability of the resin composition to improve, and for the stretchability, thermoformability, and the like of the molded product and/or multilayer structure to be obtained to become favorable.

In the structural unit (X), (Y), or (Z), the aliphatic hydrocarbon group having 1 to 10 carbon atoms is exemplified by an alkyl group and an alkenyl group; the alicyclic hydrocarbon group having 3 to 10 carbon atoms is exemplified by a cycloalkyl group and a cycloalkenyl group; and the aromatic hydrocarbon group having 6 to 10 carbon atoms is exemplified by a phenyl group.

In the structural unit (X), $R^1$, $R^2$, and $R^3$ each independently represent preferably a hydrogen atom, a methyl group, an ethyl group, a hydroxy group, a hydroxymethyl group, or a hydroxyethyl group, and of these, in light of enabling further improving the stretchability and the thermoformability of the multilayer structure and the like to be obtained, $R^1$, $R^2$, and $R^3$ each independently represent further preferably a hydrogen atom, a methyl group, a hydroxy group, or a hydroxymethyl group.

A method of incorporating the structural unit (X) into the EVOH (A) is not particularly limited, and for example, a method of copolymerizing a monomer induced by the structural unit (X) in polymerization of the ethylene and the vinyl ester may be exemplified. Examples of the monomer induced by the structural unit (X) include alkenes such as propylene, butylene, pentene, and hexene; and alkenes having an ester group or a hydroxy group such as 3-hydroxy-1-propene, 3-acyloxy-1-propene, 3-acyloxy-1-butene, 3-hydroxy-1-butene, 4-hydroxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, and 5,6-diacyloxy-1-hexene. Of these, in light of copolymerization reactivity and the processability and the gas barrier properties of the molded product and the multilayer structure to be obtained, propylene, 3-acyloxy-1-propene, 3-acyloxy-1-butene, 4-acyloxy-1-butene, and 3,4-diacyloxy-1-butene are preferred. It is to be noted that as the "acyloxy," acetoxy is preferred, and more specifically, 3-acetoxy-1-propene, 3-acetoxy-1-butene, 4-acetoxy-1-butene, and 3,4-diacetoxy-1-butene are preferred. In the case of the alkene having an ester, the monomer is induced by the structural unit (X) in the saponification reaction.

In the structural unit (Y), $R^4$ and $R^5$ preferably both represent a hydrogen atom. In particular, it is more preferable that $R^4$ and $R^5$ both represent a hydrogen atom, and that one of $R^6$ and $R^7$ represents the aliphatic hydrocarbon group having 1 to 10 carbon atoms, and the other of $R^6$ and $R^7$ represents a hydrogen atom. The aliphatic hydrocarbon group is preferably an alkyl group or an alkenyl group. In light of particularly emphasizing the gas barrier properties in the molded product and the multilayer structure to be obtained, it is more preferable that one of $R^6$ and $R^7$ represents a methyl group or an ethyl group, and the other of $R^6$ and $R^7$ represents a hydrogen atom. Furthermore, it is still more preferable that one of $R^6$ and $R^7$ represents a substituent represented by $(CH_2)_hOH$, and the other of $R^6$ and $R^7$ represents a hydrogen atom, wherein h is an integer of 1 to 8. It is to be noted that h is preferably an integer of 1 to 4, more preferably 1 to 2, and still more preferably 1.

A method of incorporating the structural unit (Y) into the EVOH (A) is not particularly limited, and a method in which an EVOH obtained by a saponification reaction is allowed to react with a monovalent epoxy compound, or the like may be used. As the monovalent epoxy compound, any one of compounds represented by the following formulae (IV) to (X) may be suitably used.

(IV)

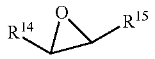

(V)

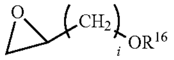

(VI)

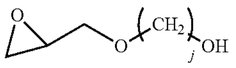

(VII)

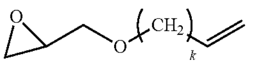

(VIII)

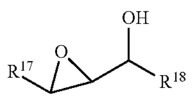

(IX)

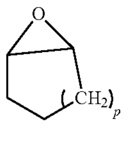

-continued (X)

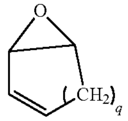

In the above formulae, $R^{14}$, $R^{15}$, $R^{16}$, $R^{17}$, and $R^{18}$ each independently represent a hydrogen atom, an aliphatic hydrocarbon group having 1 to 10 carbon atoms (an alkyl group, an alkenyl group, etc.), an alicyclic hydrocarbon group having 3 to 10 carbon atoms (a cycloalkyl group, a cycloalkenyl group, etc.), or an aliphatic hydrocarbon group having 6 to 10 carbon atoms (a phenyl group, etc.). Furthermore, i, j, k, p, and q each independently represent an integer of 1 to 8. However, in the case in which $R^{17}$ represents a hydrogen atom, $R^{18}$ has a substituent other than a hydrogen atom.

Examples of the monovalent epoxy compound represented by the formula (IV) include epoxyethane (ethylene oxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethylbenzene, 1-phenyl-1,2-epoxypropane, 3-phenyl-1,2-epoxypropane, and the like. Examples of the monovalent epoxy compound represented by the formula (V) include various types of alkyl glycidyl ethers. Examples of the monovalent epoxy compound represented by the formula (VI) include various types of alkylene glycol monoglycidyl ethers. Examples of the monovalent epoxy compound represented by the formula (VII) include various types of alkenyl glycidyl ethers. Examples of the monovalent epoxy compound represented by the formula (VIII) include various types of epoxy alkanols such as glycidol. Examples of the monovalent epoxy compound represented by the formula (IX) include various types of epoxy cycloalkanes. Examples of the monovalent epoxy compound represented by the formula (X) include various types of epoxy cycloalkenes.

Among the monovalent epoxy compounds, epoxy compounds having 2 to 8 carbon atoms are preferred. In particular, the monovalent epoxy compound more preferably has 2 to 6 atoms, and still more preferably has 2 to 4 carbon atoms, in light of ease in handling the compound and in light of reactivity. Furthermore, the monovalent epoxy compound is particularly preferably a compound represent by the formula (IV) or the formula (V). More specifically, in light of reactivity with the EVOH (A) and processability, gas barrier properties, and the like of the multilayer structure and thermoformed product to be obtained, the monovalent epoxy compound is preferably 1,2-epoxybutane, 2,3-epoxybutane, epoxypropane, epoxyethane, or glycidol, and of these, is more preferably epoxypropane or glycidol.

In the structural unit (Z), $R^8$, $R^9$, $R^{10}$, and $R^{11}$ represent preferably a hydrogen atom or an aliphatic hydrocarbon group having 1 to 5 carbon atoms, and preferably a methyl group, an ethyl group, an n-propyl group, an isopropyl group, an n-butyl group, an isobutyl group, a tert-butyl group, or an n-pentyl group.

A method of incorporating the structural unit (Z) into the EVOH (A) is not particularly limited, and for example, a method disclosed in Japanese Unexamined Patent Application, Publication No. 2014-034647 may be exemplified.

The EVOH (A) may be used alone of one type, or two or more types thereof may be used together.

The lower limit of a content of the EVOH (A) in the resin composition according to the embodiment of the present invention may be 50% by mass, and is preferably 70% by mass, more preferably 80% by mass, still more preferably 90% by mass, and may be yet more preferably 95% by mass, 97% by mass, or 99% by mass. On the other hand, the upper limit of the content of the EVOH (A) may be, for example, 99.9% by mass. It is to be noted that the content of the EVOH (A) as referred to means the content (proportion) in the resin composition in a dry state. Hereinafter, the same applies to contents with respect to the resin composition.

In the case in which the resin composition according to the embodiment of the present invention contains two or more types of the EVOH (A), there is a tendency for the flexibility, secondary processability, heat stretching properties, and the like to be improved while maintaining the gas barrier properties.

In the case in which two or more types of the EVOH (A) are used together, it is preferable that: an EVOH (A1) having an ethylene unit content of 20 mol % or more and 50 mol % or less, and an EVOH (A2) having an ethylene unit content of 30 mol % or more and 60 mol % or less are contained; a value obtained by subtracting the ethylene unit content of the ethylene-vinyl alcohol copolymer (A1) from the ethylene unit content of the ethylene-vinyl alcohol copolymer (A2) is 5 mol % or more; and a mass ratio (A1/A2) of the EVOH (A1) to the EVOH (A2) is 60/40 or more and 95/5 or less.

The lower limit of the ethylene content of the EVOH (A1) is typically 20 mol %, preferably 23 mol %, and more preferably 25 mol %. On the other hand, the upper limit of the ethylene content of the EVOH (A1) is typically 50 mol %, and preferably 47 mol %. When the ethylene content of the EVOH (A1) is greater than or equal to the lower limit, the effect of the flexibility, secondary processability, heat stretching properties, and the like of the resin composition may be more sufficiently exhibited. On the other hand, when the ethylene content of the EVOH (A1) is less than or equal to the upper limit, the gas barrier properties of the resin composition can be further improved.

The lower limit of the ethylene content of the EVOH (A2) is typically 30 mol %, preferably 34 mol %, and more preferably 38 mol %. On the other hand, the upper limit of the ethylene content of the EVOH (A2) is typically 60 mol %, preferably 55 mol %, and more preferably 52 mol %. When the ethylene content of the EVOH (A2) is greater than or equal to the lower limit, the effect of the flexibility, secondary processability, heat stretching properties, and the like of the resin composition may be more sufficiently exhibited. On the other hand, when the ethylene content of the EVOH (A2) is less than or equal to the upper limit, the gas barrier properties of the resin composition can be further improved.

The lower limit of the value obtained by subtracting the ethylene unit content of the EVOH (A1) from the ethylene unit content of the EVOH (A2) is preferably 5 mol %, more preferably 8 mol %, still more preferably 12 mol %, particularly preferably 15 mol %, and most preferably 18 mol %. Furthermore, the upper limit of the value is preferably 40 mol %, more preferably 30 mol %, and still more preferably 20 mol %. When the difference between the ethylene contents of the EVOH (A2) and the EVOH (A1) is greater than or equal to the lower limit, the heat stretching properties of the resin composition can be improved. Conversely, when the difference between the ethylene contents is less than or equal to the upper limit, the gas barrier properties of the resin composition can be further improved.

The lower limit of the mass ratio of the EVOH (A1) to the EVOH (A2) is preferably 60/40, more preferably 62/38, and may be still more preferably 65/35, 68/32, 70/30, or 85/15. The upper limit of the mass ratio is preferably 95/5, more preferably 93/7, still more preferably 92/8, yet more preferably 91/9, and may be even more preferably 85/15. When the mass ratio falls within the above range, the resin composition may be superior in terms of the flexibility, heat stretching properties, and secondary processability, while maintaining the gas barrier properties with respect to various gases. For example, when the mass ratio (A1/A2) is greater than or equal to the lower limit, the gas barrier properties and the oil resistance of the resin composition can be further improved. On the other hand, when the mass ratio (A1/A2) is less than or equal to the upper limit, the flexibility, heat stretching properties, and secondary processability of the resin composition can be improved.

The lower limit of a difference between a melting point of the EVOH (A1) and a melting point of the EVOH (A2) is preferably 12° C., more preferably 14° C., still more preferably 15° C., and particularly preferably 17° C. The upper limit of the difference between the melting point of the EVOH (A1) and the melting point of the EVOH (A2) may be, for example, 100° C., and is preferably 80° C., more preferably 40° C., still more preferably 34° C., and particularly preferably 28° C. When the difference between the melting points is greater than or equal to the lower limit, the heat stretching properties of the resin composition can be improved. Conversely, when the difference between the melting points is less than or equal to the upper limit, an effect of inhibiting flow marks during a long-run operation (continuous operation for a long period of time) of the resin composition can be enhanced.

The lower limit of a total content of the EVOH (A1) and the EVOH (A2) in the resin composition is preferably 80% by mass, more preferably 90% by mass, still more preferably 95% by mass, and may be particularly preferably 99.9% by mass.

The lower limit of a content of the EVOH (A2) in a resin part of the resin composition is preferably 4% by mass, more preferably 6% by mass, and still more preferably 7% by mass. On the other hand, the upper limit of the content of the EVOH (A2) is preferably 40% by mass, more preferably 35% by mass, still more preferably 30% by mass, and particularly preferably 15% by mass. When the content of the EVOH (A2) is greater than or equal to the lower limit, the flexibility, heat stretching properties, and secondary processability of the resin composition can be improved. Conversely, when the content of the EVOH (A2) is less than or equal to the upper limit, the content of the EVOH (A1) is increased, whereby the gas barrier properties and the oil resistance of the resin composition can be improved.

In light of improving the flexibility, secondary processability, and heat stretching properties of the resin composition, the EVOH (A2) may be a modified ethylene-vinyl alcohol copolymer (hereinafter, may be also referred to as "modified EVOH"). As the modified EVOH, an EVOH having a unit derived from another monomer aside from the above-mentioned carboxylic acid unit (I) and lactone ring unit (II), and the ethylene and the vinyl ester and the saponification product thereof may be exemplified.

Aluminum Ion (B)

The aluminum ion (B) contained in the resin composition according to the embodiment of the present invention may be present in a state of being dissociated from an anion, or may be present in a state of a salt being bonded to an anion. Furthermore, the aluminum ion (B) may be present in a state of being coordinated to a group (for example, a carboxy group, a hydroxy group, etc.) included in the EVOH (A), another optional component, or the like.

The aluminum ion (B) is typically derived from a salt, and is preferably derived from a fatty acid aluminum salt having 5 or fewer carbon atoms. More specifically, in preparing the resin composition of the embodiment of the present invention, using the fatty acid aluminum salt having 5 or fewer carbon atoms is preferred. In other words, in the resin composition of the embodiment of the present invention, as a component constituting the aluminum ion (B), the fatty acid aluminum salt having 5 or fewer carbon atoms being added or contained is preferred. An aluminum salt of a fatty acid having 5 or fewer carbon atoms has comparatively high solubility in water. Thus, even if a fatty acid aluminum salt having 5 or fewer carbon atoms is added in a production step, deposition is unlikely to occur, whereby a resin composition or molded product being superior in terms of appearance and having few unwanted substances can be obtained. The fatty acid aluminum salt having 5 or fewer carbon atoms which has been added may be present in the resin composition in a state of a salt in which the aluminum ion (b) and a fatty acid anion are still bonded, or may be present in the resin composition in a state in which the aluminum ion (b) and the fatty acid anion are dissociated.

Examples of the fatty acid aluminum salt having 5 or fewer carbon atoms include aluminum formate (aluminum triformate, etc.), aluminum acetate, aluminum propionate (aluminum tripropionate, etc.), aluminum butyrate (aluminum tributyrate, etc.), and the like. Of these, using at least one of aluminum acetate and aluminum tripropionate is preferred. The "aluminum acetate" as referred to herein is a collective term for salts having a structure of an aluminum salt of acetic acid, and is typified by basic aluminum acetate, aluminum triacetate, and the like. In light of solubility in a solvent and the like, any one, or two or more types of these are appropriately used.

Aside from these, a fatty acid aluminum salt having 6 or more carbon atoms, an aluminum salt other than fatty acid aluminum salt (aluminum nitrate, aluminum sulfate, etc.), and the like may be used.

In the resin composition of the embodiment of the present invention, the lower limit of a content (b) of the aluminum ion (B) per gram of the EVOH (A), or in other words, the lower limit of a content (amount of substance: mol number) of the aluminum ion (B) based on a content (by mass) of the EVOH (A), is 0.002 μmol/g, preferably 0.005 μmol/g, and may be more preferably 0.01 μmol/g or 0.015 μmol/g. On the other hand, the upper limit of the content (b) is 0.17 μmol/g, preferably 0.15 μmol/g, more preferably 0.10 μmol/g, and may be still more preferably 0.05 μmol/g or 0.03 μmol/g. Due to the content (b) of the aluminum ion (B) per gram of the EVOH (A) falling within the above range, the inhibition of the generation of aggregates, the heat/light resistance, and the resistance to breaking down into microplastics can be sufficiently improved. In particular, when the content (b) falls within a comparatively large range, there is a tendency for the heat/light resistance and the resistance to breaking down into microplastics to be greatly improved. On the other hand, when the content (b) falls within a comparatively small range, there is a tendency for the effect of inhibiting the generation of aggregates to increase.

The lower limit of a ratio ((i+ii)/b) of the total content (i+ii) of the carboxylic acid unit (I) and the lactone ring unit (II) positioned at the polymer end of the EVOH (A) to the content (b) of the aluminum ion (B) is preferably 180, more preferably 300, and still more preferably 1,000. On the other hand, the upper limit of the ratio ((i+ii)/b) is preferably 20,000, more preferably 15,000, and may be still more preferably 10,000, 8,000, 6,000, or 4,000. When the ratio ((i+ii)/b) falls within the above range, the inhibition of the generation of aggregates, the heat/light resistance, and the resistance to breaking down into microplastics can be more sufficiently improved. In particular, when the ratio ((i+ii)/b) falls within a comparatively high range, due to, e.g., a reduction of an excess of the aluminum ion (B) which does not contribute to the interaction with the EVOH (A), there is a tendency for the effect of inhibiting the generation of aggregates to increase. On the other hand, when the ratio (i+ii)/b) falls within a comparatively low range, there is a tendency for the heat/light resistance and the resistance to breaking down into microplastics to be further improved.

The lower limit of the content of the aluminum ion (B) in the resin composition of the embodiment of the present invention may be 0.01 ppm, and is preferably 0.05 ppm, and may be more preferably 0.1 ppm. When the content of the aluminum ion (B) in the resin composition as a whole is greater than or equal to the lower limit, the effects of the present invention may be further enhanced. On the other hand, the upper limit of the content is preferably 4 ppm, more preferably 3 ppm, and may be still more preferably 2 ppm or 1 ppm. The content of the aluminum ion (B) in the resin composition as a whole being less than or equal to the upper limit may enable inhibiting the generation of aggregates owing to an excess of the aluminum ion (B), and the like.

It is to be noted that as referred to herein, "ppm" means a content (proportion) based on mass.

Compound (C)

The resin composition of the embodiment of the present invention preferably further contains the compound (C). The compound (C) is at least one selected from the group consisting of a cinnamic acid component and a conjugated polyene compound. When the resin composition thus further contains the compound (C), the inhibition of the generation of aggregates, the heat/light resistance, and the resistance to breaking down into microplastics can be further improved. Although the reason is not clarified, it is speculated that due to the aluminum ion (B) further interacting also with the compound (C), the heat resistance, the light resistance, and the like are improved, and the like.

The cinnamic acid component is exemplified by a cinnamic acid (cis-cinnamic acid, trans-cinnamic acid, or a mixture thereof), and a cinnamic acid derivative such as a cinnamic acid ester and a cinnamic acid salt. The "cinnamic acid derivative" as referred to herein means a compound obtained by allowing a cinnamic acid to react, and the like. Examples of the cinnamic acid ester include methyl cinnamate, ethyl cinnamate, and the like. Examples of the cinnamic acid salt include sodium cinnamate, magnesium cinnamate, calcium cinnamate, and the like. Of these, as the cinnamic acid component, the cinnamic acid is preferred, and in particular, in light of stability and cost, trans-cinnamic acid is preferably used. It is to be noted that in the case of using the cinnamic acid, due to, for example, being present together with the aluminum ion (B), a part or all of the cinnamic acid may be a cinnamic acid salt.

The conjugated polyene compound as referred to means a compound having a conjugated double bond, as generally referred to, i.e., a compound: having a structure formed by alternately linking a carbon-carbon double bond and a carbon-carbon single bond; and having 2 or more carbon-carbon double bonds. The conjugated polyene compound may be a conjugated diene having 2 conjugated double bonds, a conjugated triene having 3 conjugated double bonds, or a conjugated polyene having more than 3 conjugated double bonds. In addition, the conjugated double bond may be present in a multiple number in a single molecule without the conjugated double bonds being conjugated with each other. For example, compounds having 3 conjugated triene structures in the same molecule, such as tong oil, may be also included in the conjugated polyene compound.

The conjugated polyene compound preferably has 7 or fewer conjugated double bonds. When a conjugated polyene compound having 7 or fewer conjugated double bonds is contained, coloring can be reduced.

The conjugated polyene compound may have, in addition to the conjugated double bond, another functional group such as a carboxy group and a salt thereof, a hydroxy group, an ester group, a carbonyl group, an ether group, an amino group, an imino group, an amide group, a cyano group, a diazo group, a nitro group, a sulfone group and a salt thereof, a sulfonyl group, a sulfoxide group, a sulfide group, a thiol group, a phosphoric acid group and a salt thereof, a phenyl group, a halogen atom, a double bond, and a triple bond.

Examples of the conjugated polyene compound include:

conjugated diene compounds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, ocimene, phellandrene, myrcene, farnesene, sorbic acid, sorbic acid esters, and sorbic acid salts;

conjugated triene compounds such as 1,3,5-hexatriene, 2,4,6-octatriene-1-carboxylic acid, eleostearic acid, tung oil, cholecalciferol, fulvene, and tropone;

conjugated polyene compounds such as cyclooctatetraene, 2,4,6,8-decatetraene-1-carboxylic acid, retinol, and retinoic acid; and the like.

A molecular weight of the conjugated polyene compound is typically 1,000 or less, preferably 500 or less, and more preferably 300 or less. When the molecular weight of the conjugated polyene compound is 1,000 or less, a state of dispersion of the conjugated polyene compound into the EVOH (A) may improve, whereby the appearance after melt molding may improve.

As the conjugated polyene compound, sorbic acid, a sorbic acid ester, a sorbic acid salt, myrcene, and a mixture of 2 or more of these are preferred, and sorbic acid, a sorbic acid salt, and a mixture of these are more preferred. Sorbic acid, a sorbic acid salt, and a mixture of these are preferred in light of hygiene and availability due to having a superior effect of inhibiting oxidative degradation at high temperatures, and being widely industrially used as food additives as well.

The compound (C) may be an unsaturated carboxylic acid and a salt thereof. Such a compound is exemplified by cinnamic acid, sorbic acid, salts thereof, and the like. The number of carbon atoms of the unsaturated carboxylic acid is preferably 4 or more and 20 or less, and more preferably 6 or more and 10 or less. The compound (C) may be present in the state of an anion.

In the resin composition of the embodiment of the present invention, the lower limit of a content (c) of the compound (C) with respect to the EVOH (A) is preferably 1 ppm, more preferably 5 ppm, still more preferably 10 ppm, and may be yet more preferably 30 ppm. When the content (c) of the compound (C) is greater than or equal to the lower limit, the effect of containing the compound (C) can be particularly sufficiently exhibited. On the other hand, the upper limit of the content (c) with respect to the EVOH (A) is preferably 1,000 ppm, and may be more preferably 500 ppm. The content (c) of the compound (C) being less than or equal to the upper limit enables further reducing the generation of aggregates, and the like. The content of the compound (C) with respect to the resin composition of the embodiment of the present invention also preferably falls within the above range. It is to be noted that the content (c) is a content (by mass) of the compound (C) per gram of the EVOH (A), and is a proportion of the content (by mass) of the compound (C) with respect to the content (by mass) of the EVOH (A).

Polyamide (D)

The resin composition of the embodiment of the present invention may further contain the polyamide (D) to improve retorting resistance of the resin composition, and the like.

The polyamide (D) is a resin that includes an amide linkage. The polyamide (D) is obtained by: ring-opening polymerization of a lactam having a 3 or more-membered ring; polycondensation of polymerizable ω-amino acids; polycondensation of a dibasic acid and a diamine; and the like. Examples of the polyamide (D) include polycaproamide (nylon 6), poly-ω-aminoheptanoic acid (nylon 7), poly-ω-aminononanoic acid (nylon 9), polyundecanamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), hexamethylenediammonium adipate/hexamethylenediammonium sebacate copolymers (nylon 66/610), ethylene diammonium adipate/hexamethylenediammonium adipate copolymers (nylon 26/66), caprolactam/hexamethylenediammonium adipate/hexamethylenediammonium sebacate copolymers (nylon 6/66/610), polyhexamethylene isophthalamide (nylon 6I), polyhexamethylene terephthalamide (nylon 6T), hexamethyleneisophthalamide/terephthalamide copolymers (nylon 6I/6T), and the like.

Furthermore, as a diamine, an aliphatic diamine into which a substituent such as 2,2,4-trimethylhexamethylenediamine or 2,4,4-trimethylhexamethylenediamine has been introduced; an aromatic amine such as methylbenzylamine or m-xylylenediamine, or the like may be used, and these may be used for modification of the polyamide. Furthermore, as the dicarboxylic acid, an aliphatic carboxylic acid into which a substituent such as 2,2,4-trimethyladipic acid or 2,4,4-trimethyladipic acid has been introduced; an alicyclic dicarboxylic acid such as 1,4-cyclohexanedicarboxylic acid; an aromatic dicarboxylic acid such as phthalic acid, a xylylenedicarboxylic acid, an alkyl-substituted terephthalic acid, an alkyl-substituted isophthalic acid, or a naphthalenedicarboxylic acid, or the like may be used, and these may be used for modification of the polyamide.

Of these, polycaproamide (nylon 6) is preferred. Alternatively, a caprolactam/lauryllactam copolymer (nylon 6/12) is also preferred. In this case, the ratio of 6 unit to 12 unit contained is not particularly limited, and the lower limit of the content of the 12 unit is preferably 5% by mass. On the other hand, the upper limit of the content of the 12 unit is preferably 60% by mass, and more preferably 50% by mass.

The lower limit of a mass ratio (D/A) of the polyamide (D) to the EVOH (A) in the resin composition of the embodiment of the present invention is preferably 5/95, more preferably 8/92, and still more preferably 13/87. Furthermore, the upper limit of the mass ratio (D/A) is preferably 40/60, more preferably 35/65, still more preferably 30/70, and particularly preferably 25/75. When the mass ratio (D/A) is greater than or equal to the lower limit, the retorting resistance of the resin composition can be further improved. Furthermore, when the mass ratio (D/A) is less than or equal to the upper limit, characteristics such as the gas barrier properties and the oil resistance, which the EVOH (A) intrinsically has, are particularly sufficiently exhibited.

In the case in which the resin composition of the embodiment of the present invention contains the polyamide (D), the lower limit of a total content of the EVOH (A) and the polyamide (D) in a resin part of the resin composition is preferably 80% by mass, more preferably 90% by mass, and still more preferably 95% by mass. Furthermore, the total content of the EVOH (A) and the polyamide (D) in the resin part of the resin composition is particularly preferably 100% by mass.

In the case in which the resin composition of the embodiment of the present invention contains the polyamide (D), the lower limit of a content of the polyamide (D) in the resin part of the resin composition is preferably 4% by mass, more preferably 8% by mass, and still more preferably 12% by mass. On the other hand, the upper limit of the content of the polyamide (D) is preferably 40% by mass, more preferably 35% by mass, still more preferably 30% by mass, and particularly preferably 25% by mass. When the content of the polyamide (D) is greater than or equal to the lower limit, the retorting resistance of the resin composition can be further improved. Furthermore, when the content of the polyamide (D) is less than or equal to the upper limit, the content of the EVOH (A) is increased, whereby the gas barrier properties, the oil resistance, and the like can be further improved.

Metal Atom (E)

In, e.g., the case in which the resin composition of the embodiment of the present invention contains the polyamide (D), to improve the long-run workability at the time of melt molding, at least one metal atom (E) selected from the group consisting of atoms of magnesium, calcium, and zinc may be further contained. It is to be noted that the "long-run workability" as referred to herein means a property in which deterioration of the quality is unlikely to occur and a favorable melt-molded product can be obtained, even in a case in which melt molding is continuously performed for a long period of time.

With regard to the resin composition of the embodiment of the present invention, the long-run workability at the time of melt molding is favorable due to containing 1 to 500 ppm of the metal atom (E) in terms of metal element equivalent with respect to the EVOH (A). In light of the long-run workability at the time of melt molding being more favorable, the metal atom (E) is more preferably a magnesium atom.

The metal atom (E) may be present as a metal atom simple substance or a constituent atom in a compound, or may be present in the state of a free metal ion. The metal atom (E) may be contained as: a salt of an organic acid such as an aliphatic carboxylic acid, an aromatic carboxylic acid, an aliphatic dicarboxylic acid, an aromatic dicarboxylic acid, a tricarboxylic acid, a tetracarboxylic acid, a hydroxycarboxylic acid, a ketodicarboxylic acid, and an amino acid; a salt of an inorganic acid such as nitric acid, sulfurous acid, carbonic acid, and phosphoric acid; a hydroxide; and/or the like. Of these, the metal atom (E) is preferably contained as an aliphatic carboxylic acid metal salt or a hydroxide, and in light of miscibility with the EVOH (A) and the like, is more preferably contained as an aliphatic carboxylic acid metal salt having 6 or fewer carbon atoms or a hydroxide. Examples of the fatty acid include: saturated fatty acids such as formic acid, acetic acid, propionic acid, and capronic acid; and unsaturated fatty acids such as acrylic acid and methacrylic acid. Of these, in light of miscibility with the EVOH (A) and the like, a salt of a saturated fatty acid having 1 to 3 carbon atoms and a hydroxide are preferred, and an acetic acid salt and a hydroxide are more preferred.

In the resin composition of the embodiment of the present invention, the metal atom (E) may form an organic or inorganic acid and a salt, as described above, or may form a salt as a counter cation of an alkoxide of the EVOH (A).

The lower limit of a content (e) of the metal atom (E) in the resin composition of the embodiment of the present invention with respect to the EVOH (A) is, in terms of metal element equivalent, preferably 1 ppm, more preferably 20 ppm, and still more preferably 30 ppm. The content (e) of the metal atom (E) being 1 ppm or more results in superiority in terms of the long-run workability at the time of melt molding and stability of film thickness at the time of film formation. On the other hand, the upper limit of the content (e) is preferably 500 ppm, more preferably 150 ppm, and still more preferably 100 ppm. The content (e) of the metal atom (E) being 500 ppm or less results in superiority in terms of the hue at the time of continuous film formation and the film thickness stability.

In the resin composition of the embodiment of the present invention, the metal atom (E) is preferably uniformly dispersed throughout the entirety of the resin composition. Furthermore, the metal atom (E) may be used alone of one type, or in a combination of two or more types.

Thermoplastic Elastomer (F)

The resin composition of the embodiment of the present invention may further contain the thermoplastic elastomer (F) to improve flex resistance of the resin composition, and the like.

The thermoplastic elastomer (F) is not particularly limited, and a thermoplastic polyester elastomer, a thermoplastic polystyrene elastomer, a thermoplastic polyolefin elastomer, and the like can be used. These may be used as one type, or two or more types may be combined. Of these, in light of improving the flex resistance, the thermoplastic elastomer (F) is preferably at least one selected from the group consisting of a thermoplastic polystyrene elastomer and a thermoplastic polyolefin elastomer.

The thermoplastic elastomer (F) is preferably a modified thermoplastic elastomer. The modified thermoplastic elastomer is preferably modified with an unsaturated carboxylic acid or a derivative thereof, and examples of the unsaturated carboxylic acid and the derivative thereof include maleic acid, fumaric acid, itaconic acid, maleic anhydride, itaconic anhydride, maleic acid monomethyl ester, maleic acid monoethyl ester, maleic acid diethyl ester, fumaric acid monomethyl ester, and the like. Of these, the thermoplastic elastomer (F) is more preferably an maleic anhydride-modified thermoplastic elastomer. The thermoplastic elastomer (F) being the modified thermoplastic elastomer is preferred due to miscibility with the EVOH (A) being improved, and the gas barrier properties, transparency, flexibility, and peelability being further improved.

The thermoplastic polyester elastomer (hereinafter, may be also referred to as "TPEE") may be exemplified by multi-block copolymer that includes in the molecule, a polyester as a hard segment, and a polyether or a polyester having a low glass transition temperature (Tg) as a soft segment. The TPEE can be separated into the following types depending on differences in the molecular structure, and of these, a polyester-polyether type TPEE and a polyester-polyester type TPEE are preferred.

(1) Polyester-Polyether Type TPEE

Generally, this is a thermoplastic elastomer in which an aromatic crystalline polyester is used as a hard segment, and a polyether is used as a soft segment.

(2) Polyester-Polyester Type TPEE

This is a thermoplastic elastomer in which an aromatic crystalline polyester is used as a hard segment, and an aliphatic polyester is used as a soft segment.

(3) Crystalline TPEE

This is a thermoplastic elastomer in which a rigid liquid crystal molecule is used as a hard segment, and an aliphatic polyester is used as a soft segment.

Examples of the polyester segment include polyester segments containing a dicarboxylic acid component such as: aromatic dicarboxylic acids such as terephthalic acid, isophthalic acid, and naphthalenedicarboxylic acid; alicyclic dicarboxylic acids such as 1,4-cyclohexanedicarboxylic acid; and aliphatic dicarboxylic acids such as succinic acid and adipic acid, and a diol component such as: aliphatic diols such as ethylene glycol, 1,2-propylene glycol, and 1,4-butanediol; and alicyclic diols such as cyclohexane-1,4-dimethanol. Examples of the polyether segment include aliphatic polyether segments such as polyethylene glycol, polypropylene glycol, and polybutylene glycol. The thermoplastic polyester elastomer is preferably a modified thermoplastic polyester elastomer and more preferably a maleic anhydride-modified thermoplastic polyester elastomer.

The thermoplastic polystyrene elastomer is not particularly limited, and typically contains a styrene-monomer polymer block (Hb) as the hard segment and a conjugated diene-compound polymer block or a hydrogenated block thereof (Sb) as the soft segment. The thermoplastic styrene elastomer may have a structure of a diblock structure represented by Hb-Sb, a triblock structure represented by Hb-Sb-Hb or Sb-Hb-Sb, a tetrablock structure represented by Hb-Sb-Hb-Sb, or a polyblock structure in which a total of 5 or more of Hb and Sb are linearly bonded.

The styrene monomer used for the styrene-monomer polymer block (Hb) is not particularly limited, and examples thereof may include styrene, derivatives thereof, and the like. Specific examples include vinyl group-containing aromatic compounds such as: styrenes such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene, and t-butoxystyrene; vinylnaphthalenes such as 1-vinylnaphthalene and 2-vinylnaphthalene; and the like, vinyl group-containing aromatic compounds such as indene and acenaphthylene, and the like. Of these, styrene is preferred. The styrene monomer may be only one type, or may be two or more types.

The conjugated diene compound used for the conjugated diene-compound polymer block or a hydrogenated block thereof (Sb) is also not particularly limited, and examples thereof may include butadiene, isoprene, 2,3-dimethylbutadiene, pentadiene, hexadiene, and the like. Of these, butadiene is preferred. The conjugated diene compound may be only one type or may be two or more types. Moreover, another comonomer, for example, ethylene, propylene, butylene, or styrene may be copolymerized. Furthermore, the conjugated diene-compound polymer block may be a hydrogenation product that is partially or completely hydrogenated.

Specific examples of the thermoplastic polystyrene elastomer include styrene-isoprene diblock copolymers (SI), styrene-butadiene diblock copolymers (SB), styrene-isoprene-styrene triblock copolymers (SIS), styrene-butadiene/isoprene-styrene triblock copolymers (SB/IS), and styrene-butadiene-styrene triblock copolymers (SBS), and hydrogenation products thereof. Of these, the thermoplastic polystyrene elastomer is preferably at least one selected from the group consisting of a hydrogenation product of styrene-isoprene diblock copolymers (SEP), a hydrogenation product of styrene-butadiene diblock copolymers (SEB), a hydrogenation product of styrene-isoprene-styrene triblock copolymers (SEPS), a hydrogenation product of styrene-butadiene/isoprene-styrene triblock copolymers (SEEPS), and a hydrogenation product of styrene-butadiene-styrene triblock copolymers (SEBS). The polystyrene-based thermoplastic elastomer is preferably a modified thermoplastic polystyrene elastomer, and more preferably a maleic anhydride-modified thermoplastic polystyrene elastomer.

The thermoplastic polyolefin elastomer includes thermoplastic elastomers, for example, containing a polyolefin block, such as polypropylene or polyethylene, as the hard segment and a rubber block, such as an ethylene-propylene-diene copolymer, as the soft segment. It is to be noted that such thermoplastic elastomers include a blend type and an implant type. Furthermore, modified thermoplastic polyolefin elastomers may include a maleic anhydride-modified ethylene-butene-1 copolymer, a maleic anhydride-modified ethylene-propylene copolymer, a butyl halide-based rubber, modified polypropylene, and modified polyethylene. The thermoplastic polyolefin elastomer is preferably a modified thermoplastic polyolefin elastomer, and more preferably a maleic anhydride-modified thermoplastic polyolefin elastomer.

The lower limit of a mass ratio (F/A) of the thermoplastic elastomer (F) to the EVOH (A) in the resin composition of the embodiment of the present invention is preferably 5/95, more preferably 8/92, still more preferably 12/88, and may be even more preferably 15/85 or 25/75. When the mass ratio (F/A) is greater than or equal to the lower limit, the flex resistance and the like can be improved. On the other hand, the upper limit of the mass ratio (F/A) is preferably 35/65, more preferably 30/70, and may be still more preferably 25/75. When the mass ratio (F/A) is less than or equal to the upper limit, the gas barrier properties and the like can be further improved.

Phase Separation Structure

In the resin composition of the embodiment of the present invention, particles of the thermoplastic elastomer (F) are preferably dispersed in a matrix of the EVOH (A). That is, the resin composition of the embodiment of the present invention preferably has a sea-island structure in which the sea phase is mainly constituted from the EVOH (A), and the island phases are mainly constituted from the thermoplastic elastomer (F). When the sea structure is thus mainly constituted from the EVOH (A), the flexibility can be improved while maintaining the gas barrier properties.

In the case in which the resin composition of the embodiment of the present invention has the sea-island structure in which the sea phrase is mainly constituted from the EVOH (A) and the island phrases are mainly constituted from the thermoplastic elastomer (F), in light of improving the transparency, an average particle diameter of the island phases constituted from the thermoplastic elastomer (F) is preferably 4.5 μm or less, more preferably 3.5 μm or less, still more preferably 3.0 μm or less, particularly preferably 2.5 μm or less, and most preferably 2.0 μm or less. The average particle diameter of the thermoplastic elastomer (F) may be 1.0 μm or more. The average particle diameter of the island phases constituted from the thermoplastic elastomer (F) falling within the above range is preferred due to the flexibility being improved and, furthermore, the peelability being improved, while maintaining the gas barrier properties and the transparency. The average particle diameter of the thermoplastic elastomer (F) can be adjusted by adjusting kneading intensity, and by means of a component ratio of the EVOH (A) and the thermoplastic elastomer (F).

In the resin composition of the embodiment of the present invention, a refractive index difference between the EVOH (A) and the thermoplastic elastomer (F) is preferably 0.05 or less, more preferably 0.04 or less, and still more preferably 0.03 or less. The refractive index difference may be 0.005 or more. The refractive index difference falling within the above range is preferred due to the transparency of the resin composition of the embodiment of the present invention being more favorable.

Antioxidant (G)

The resin composition of the embodiment of the present invention may further contain the antioxidant (G) to improve the oxidative degradation and the like of the resin composition. In the case of the resin composition further containing the antioxidant, the generation of cracks in a molded product such as a pipe formed from the resin composition can be inhibited, and the like.

The antioxidant (G) is a compound having an oxidation-preventing function. A melting point of the antioxidant (G) is not necessarily limited, but is preferably 170° C. or less. In the case in which the melting point of the antioxidant (G) is 170° C. or less, in producing a resin composition by melt mixing, melting in an extruder is easier. Thus, the antioxidant (G) is localized in the resin composition, whereby a highly concentrated part becoming colored can be inhibited. Furthermore, the melting point of the antioxidant (G) is preferably 50° C. or more, and may be more preferably 100° C. or more. In the case in which the melting point of the antioxidant (G) is 50° C. or more, the antioxidant bleeding out to a surface of the molded product (the pipe, etc.) obtained, whereby the appearance deteriorates, can be inhibited.

A molecular weight of the antioxidant (G) is preferably 300 or more. In the case in which the molecular weight of the antioxidant (G) is 300 or more, when the molded product has been obtained from the resin composition of the embodiment of the present invention, the antioxidant bleeding out to the surface and deteriorating the appearance can be inhibited, and furthermore, the thermal stability of the resin composition is improved. The molecular weight is more preferably 400 or more, and particularly preferably 500 or more. On the other hand, the upper limit of the molecular weight of the antioxidant (G) is not particularly limited, and in light of dispersibility, is preferably 8,000 or less, more preferably 6,000 or less, still more preferably 4,000 or less, and particularly preferably 2,000 or less.

A compound having a hindered phenol group is suitably used as the antioxidant (G). While on one hand the compound having a hindered phenol group has excellent thermal stability itself, it also has the ability to capture the oxygen radical that is the cause of oxidation degradation, and when blended with the resin composition as an antioxidant, the compound exhibits a superior effect of preventing oxidative degradation.

Commercially available products, for example those described below, can be used as the compound having a hindered phenol group.

(1) "IRGANOX 1010," manufactured by BASF: Pentaerythritol tetrakis[3-(3,5-di-tert-butyl-4-hydroxyphenyl)propionate] with a melting point in the range of 110 to 125° C. and a molecular weight of 1,178

(2) "IRGANOX 1076," manufactured by BASF: Octadecyl-3-(3,5-di-tert-butyl-4-hydroxyphenyl)-propionate with a melting point in a range of 50 to 55° C. and a molecular weight of 531

(3) "IRGANOX 1098," manufactured by BASF: N, N'-hexane-1,6-diylbis[3-(3,5-di-tert-butyl-4-hydroxyphenyl)propionamide)] with a melting point in a range of 156 to 161° C. and a molecular weight of 637

(4) "IRGANOX 245," manufactured by BASF: Triethylene glycol-bis[3-(3-tert-butyl-5-methyl-4-hydroxyphenyl)propionate] with a melting point in a range of 76 to 79° C. and a molecular weight of 587

(5) "IRGANOX 259," manufactured by BASF: 1,6-hexanediol-bis[3-(3,5-di-tert-butyl-4-hydroxyphenyl) propionate] with a melting point in a range of 104 to 108° C. and a molecular weight of 639

(6) "Sumilizer MDP-s," manufactured by Sumitomo Chemical Co., Ltd.: 2,2'-methylene-bis(4-methyl-6-tert-butylphenol) with a melting point of about 128° C. and a molecular weight of 341

(7) "Sumilizer GM," manufactured by Sumitomo Chemical Co., Ltd.: 2-tert-butyl-6-(3-tert-butyl-2-hydroxy-5-methylbenzyl)-4-methylphenyl acrylate with a melting point of about 128° C. and a molecular weight of 395

(8) "Sumilizer GA-80," manufactured by Sumitomo Chemical Co., Ltd.: 3,9-bis[2-{3-(3-tert-butyl-4-hydroxy-5-methylphenyl)propionyloxy}-1,1-dimethylethyl]-2,4,8,10-tetraoxaspiro[5,5]undecane with a melting point of about 110° C. and a molecular weight of 741

A compound having a hindered amine group may also be suitably used as the antioxidant (G). When a compound having a hindered amine group is blended with the resin composition as the antioxidant (G), the compound does not just prevent thermal degradation of the EVOH (A), but also exhibits the effect of capturing the aldehyde generated as a result of thermal decomposition of the EVOH (A), and can inhibit generation of a void or air bubble during molding by reducing generation of decomposition gases. Furthermore, when the resin composition of the embodiment of the present invention is used as a food packaging container, spoiling of the taste of the content due to the smell of the aldehyde is addressed due to the capture of the aldehyde.

A piperidine derivative is preferably used as the compound having a hindered amine group, and in particular, a 2,2,6,6-tetraalkylpiperidine derivative having a substituent group at the fourth position is preferable. A carboxyl group, an alkoxy group, or an alkylamino group can be used as the substituent at the fourth position.

Furthermore, an alkyl group may be substituted at an N-position of the hindered amine group, but the use of the compound having a hindered amine group where a hydrogen atom is bonded is preferred due to being superior in a thermal stability effect.

Commercially available products, for example those described below, can be used as the compound having a hindered amine group.

(9) "TINUVIN 770," manufactured by BASF: Bis(2,2,6,6-tetramethyl-4-piperidyl) sebacate with a melting point in a range of 81 to 85° C. and a molecular weight of 481

(10) "TINUVIN 765," manufactured by BASF: Bis(1,2,2,6,6-pentamethyl-4-piperidyl) sebacate, which is a liquid compound with a molecular weight of 509, and 1,2,2,6,6-pentamethyl-4-piperidyl sebacate (mixture)

(11) "TINUVIN 622LD," manufactured by BASF: Polycondensate of dimethyl succinate and 1-(2-hydroxyethyl)-4-hydroxy-2,2,6,6-tetramethylpiperidine with a melting point in a range of 55 to 70° C. and a molecular weight of 3,100 to 4,000

(12) "CHIMASSORB 119FL," manufactured by BASF: Condensate of N,N'-bis(3-aminopropyl)ethylenediamine and 2,4-bis[N-butyl-N-(1,2,2,6,6-pentamethyl-4-piperidyl)amino]-6-chloro-1,3,5-triazine with a melting point in a range of 130 to 140° C. and a molecular weight of 2,000 or more

(13) "CHIMASSORB 944LD," manufactured by BASF: poly[[6-(1,1,3,3-tetramethylbutyl)amino-1,3,5-triazin-2,4-diyl](2,2,6,6-tetramethyl-4-piperid yl)imino]hexamethylene(2,2,6,6-tetramethyl-4-piperidyl)imino]] with a melting point in a range of 100 to 135° C. and a molecular weight between 2,000 and 3,100

(14) "TINUVIN 144," manufactured by BASF: Bis(1,2,2,6,6-pentamethyl-4-piperidyl)[[3,5-bis(1,1-dimethylethyl)-4-hydroxyphenyl]methyl]butyl malonate with a melting point in a range of 146 to 150° C. and a molecular weight of 685

(15) "UVINUL 4050H," manufactured by BASF: N, N'-1,6-hexanediylbis{N-(2,2,6,6-tetramethyl-4-piperidinyl)formamide with a melting point of 157° C. and a molecular weight of 450

(16) "UVINUL 5050H," manufactured by BASF: Compound having the following structure with a melting point in a range of 104 to 112° C. and a molecular weight of about 3,500

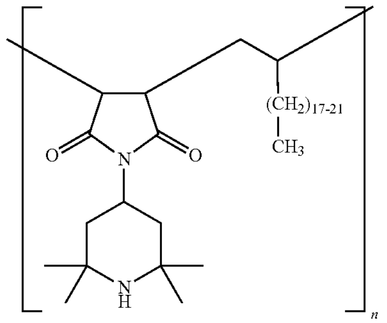

These compounds having a hindered phenol group or a hindered amine group may be used either alone, or by combining two or more types.

The lower limit of a content (g) of the antioxidant (G) with respect to the EVOH (A) is preferably 0.01% by mass, more preferably 0.1% by mass, and still more preferably 0.3% by mass. The upper limit of the content (g) of the antioxidant (G) is preferably 5% by mass, more preferably 3% by mass, and still more preferably 1% by mass. When the content (g) of the antioxidant (G) falls within the above range, the antioxidant (G) is favorably dispersed, wherein, in the case of obtaining a molded product from the resin composition of the embodiment of the present invention, there is a tendency to exhibit superiority in terms of the appearance.

Inorganic Particle (H)

The resin composition of the embodiment of the present invention may further contain the inorganic particle (H) for, e.g., improving breakage resistance, a vapor deposition flaw-inhibiting property, and adhesion strength of a vapor deposition layer of a film and the like formed from the resin composition.

In the resin composition containing the inorganic particle, an appropriate value is adopted for an arithmetic average roughness (Ra) of a surface of the film formed to improve blocking resistance and slipperiness. The "inorganic particle" as referred to herein means a particle in which an inorganic substance is the principal component. The "principal component" as referred to herein means the component having the highest content, and for example, is a component having a content of 50% by mass or more.

The inorganic substance constituting the inorganic particle (H) is preferably at least one selected from the group consisting of silicon, aluminum, magnesium, zirconium, cerium, tungsten, and molybdenum. Of these, in light of ease of availability, the inorganic substance is more preferably at least one selected form the group consisting of silicon, aluminum, and magnesium. Examples of the inorganic substance include oxides, nitrides, oxynitrides, and the like of the exemplified elements, and an oxide is preferred.

The lower limit of an average particle diameter of the inorganic particle (H) is preferably 0.5 μm, more preferably 1.5 μm, and still more preferably 2.5 μm. The upper limit of the average particle diameter of the inorganic particle (H) is preferably 10 μm, more preferably 8 μm, and still more preferably 5 μm. When the average particle diameter of the inorganic particle (H) falls within the above range, the arithmetic average roughness (Ra) of the surface of the film formed from the resin composition is appropriate, and the blocking resistance and slipperiness improve. As a result, the resin composition enables improving the breakage resistance, vapor deposition flaw-inhibiting property, and adhesion strength of the vapor deposition layer.

The lower limit of a content (h) of the inorganic particle (H) with respect to the EVOH (A) is preferably 50 ppm, more preferably 100 ppm, and still more preferably 150 ppm. The upper limit of the content (h) of the inorganic particle (H) is preferably 5,000 ppm, more preferably 4,000 ppm, still more preferably 3,000 ppm, and may be even more preferably 2,000 ppm or 1,000 ppm. When the content (h) of the inorganic particle (H) falls within the above range, the arithmetic average roughness (Ra) of the surface of the film formed from the resin composition is appropriate, and the blocking resistance and slipperiness improve. As a result, the resin composition is superior in terms of the breakage resistance and the vapor deposition flaw-inhibiting property, and furthermore, adhesion strength, to the vapor deposition layer, of the film to be obtained can be improved. One, or two or more types of the inorganic particle (H) may be contained. Furthermore, one particle may be formed from one, or two or more types of inorganic substances.

Other Component(s)

The resin composition of the embodiment of the present invention may contain, within a range not leading to impairment of the effects of the present invention, other component (s) such as: a resin other than the EVOH (A), the polyamide (D), and the thermoplastic elastomer (F); a metal ion other than the aluminum ion (B) and the metal atom (E); an acid (except those corresponding to the compound (C)); a boron compound, a plasticizer, a filler, an antiblocking agent, a lubricant, a stabilizer, a surfactant, a coloring agent, an ultraviolet ray-absorbing agent, an antistatic agent, a desiccant, a crosslinking agent, a reinforcing agent, and the like. Of these, in light of thermal stability and adhesiveness to the other resins, the resin composition preferably contains one, or two or more types from the metal ion other than the aluminum ion (B) and the metal ion (E), the acid (except those corresponding to the compound (C)), and the boron compound.

In light of further improving interlayer adhesiveness in the case of using the resin composition of the embodiment of the present invention as a laminate (multilayer structure), the metal ion other than the aluminum ion (B) and the metal atom (E) is preferably an alkali metal ion. These metal ions may be present in the state of a salt.

In the case in which the resin composition of the embodiment of the present invention contains the metal ion, the content of the metal ion with respect to the resin composition is preferably 1 ppm or more, more preferably 5 ppm or more, still more preferably 10 ppm or more, even more preferably 20 ppm or more, and particularly preferably 40 ppm or more. Furthermore, the content of the metal ion other than the aluminum ion (B) and the metal atom (E) with respect to the resin composition is preferably 3,000 ppm or less, more preferably 1,000 ppm or less, still more preferably 500 ppm or less, and particularly preferably 300 ppm or less. When the content of the metal ion other than the aluminum ion (B) and the metal atom (E) falls within the above range, thermal stability in recovering and recycling the laminate tends to be favorable, while keeping the interlayer adhesiveness of the laminate favorable.

The acid (except for those corresponding to the compound (C)) is preferably a carboxylic acid or a phosphoric acid in light of improving the thermal stability during melt molding. Examples of the carboxylic acid include formic acid, acetic acid, butyric acid, lactic acid, and the like. The carboxylic acid is preferably a carboxyclic acid or saturated carboxyclic acid having 4 or fewer carbon atoms, and more preferably acetic acid. The acid may be present in the state of a salt or anion.

In the case in which the resin composition of the embodiment of the present invention contains the carboxylic acid, a content of the carboxylic acid with respect to the resin composition is preferably 1 ppm or more, more preferably 10 ppm or more, and still more preferably 50 ppm or more. Furthermore, the content of the carboxylic acid is preferably 10,000 ppm or less, more preferably 1,000 ppm or less, and still more preferably 500 ppm or less. In the case in which the resin composition of the embodiment of the present invention contains the phosphoric acid, a content of the phosphoric acid with respect to the resin composition, in terms of phosphate radical, is preferably 1 ppm or more, more preferably 10 ppm or more, and still more preferably 30 ppm or more. Furthermore, the content of the phosphorus compound is preferably 10,000 ppm or less, more preferably 1,000 ppm or less, and still more preferably 300 ppm or less. When the resin composition of the embodiment of the present invention contains the carboxylic acid or the phosphoric acid within the above ranges, the thermal stability during melt molding tends to become favorable.

The boron compound is exemplified by boric acid, a boric acid ester, a boric acid salt, and boron hydride.

In the case in which the resin composition of the embodiment of the present invention contains the boron compound, a content of the boron compound with respect to the resin composition or the EVOH (A) is preferably 1 ppm or more, and more preferably 10 ppm or more. Furthermore, the content of the boron compound is preferably 2,000 ppm or less, and more preferably 1,000 ppm or less. When the resin composition of the embodiment of the present invention contains the boron compound within the above range, the thermal stability during melt molding tends to become favorable.

A method of incorporating each of these components into the resin composition of the embodiment of the present invention is not particularly limited, and this incorporation may be performed in accordance with a well-known method.

The upper limit of a content of components other than the EVOH (A), the aluminum ion (B), the compound (C), the metal ion other than the aluminum ion (B) and the metal atom (E), the acid (except for those corresponding to the compound (C)), and the boron compound may be preferably 10% by mass, or may be preferably 1% by mass, 0.1% by mass, 0.01% by mass, or 0.001% by mass.

Melt Flow Rate

The lower limit of a melt flow rate of the resin composition of the embodiment of the present invention at a temperature of 210° C. under a load of 2,160 g is preferably 1.0 g/10 min, and more preferably 2.0 g/10 min. On the other hand, the upper limit of the melt flow rate is preferably 30 g/10 min, more preferably 20 g/10 min, and still more preferably 10 g/10 min. When the melt flow rate of the resin composition of the embodiment of the present invention falls within the above range, the melt moldability, the processability, and the like become favorable.

Method for Producing Resin Composition

Examples of a method for producing the resin composition of the embodiment of the present invention include: 1) a method of bringing a porous precipitate of the EVOH (A) having a moisture content of 20 to 80% by mass into contact with an aqueous dispersion containing an aluminum salt, etc., and drying after incorporating the EVOH (A) into the aluminum salt, etc.; 2) a method of incorporating a uniform solution (water/alcohol solution, etc.) of the EVOH (A) into the aluminum salt, etc., then extruding a resulting mixture into a thin strand in a coagulation liquid, followed by cutting the obtained strand to make pellets and further performing a drying treatment; 3) a method of dry-blending the EVOH (A) with the aluminum salt, etc. at one time; 4) a method of dry-blending the EVOH (A) with the aluminum salt, etc. at one time, and then performing melt kneading with an extruder or the like; 5) a method of obtaining an ethylene-vinyl ester copolymer at the time of producing the EVOH (A), and then adding the aluminum salt, etc.; and the like. To more significantly achieve the effects of the present invention, 1), 2), and 5) are preferred in light of being superior in terms of dispersibility of the aluminum ion (B).

After adding the aluminum salt, etc. in the methods of 1) and 2), and after obtaining the ethylene-vinyl ester copolymer in the method of 5), a saponification step and washing step are performed, and then, typically, drying is performed. As a drying procedure, various drying procedures may be employed. Examples include fluidized drying where a substantially pelletized EVOH composition is dried while being stirred and dispersed mechanically or by hot air, or static drying where a substantially pelletized EVOH composition is dried without a dynamic action such as stirring or dispersion. Examples of a dryer for the fluidized drying include a cylindrical/groove-type stirred dryer, a circular tube dryer, a rotary dryer, a fluidized bed dryer, a vibrating fluidized bed dryer, and a conical rotary dryer. Examples of a dryer for the static drying include, but are not limited to, a batch box dryer as a stationary material type, and a band dryer, a tunnel dryer, and a vertical dryer as a material transfer type. The fluidized drying and the static drying may be combined.

As a heating gas used in the drying treatment, air or an inert gas (nitrogen gas, helium gas, argon gas, etc.) is used, and in light of productivity and prevention of thermal degradation of the EVOH (A), a temperature of the heating gas is preferably 40 to 150° C. A time period of the drying treatment depends on a moisture content of the EVOH composition and a treatment amount, and in light of productivity and prevention of thermal degradation of the EVOH (A), is typically preferably about 15 min to 72 hrs.

Furthermore, as the method of 4), for example, there is a method of performing melt kneading with a single-screw or twin-screw extruder, or the like. A temperature of the melt kneading is typically 150 to 300° C., and preferably 170 to 250° C.

In the case in which the resin composition of the embodiment of the present invention further contains other component(s) aside from the EVOH (A) and the aluminum ion (B), the resin composition of the embodiment of the present invention can be produced by, for example: (1) a method of mixing the other component(s) into the mixture of the EVOH (A) and the aluminum ion (B) by melt kneading or the like; (2) a method of mixing the EVOH (A), the aluminum salt, and the like, with the other component(s) at one time by melt kneading or the like; and the like.

The resin composition of the embodiment of the present invention is worked into an optional form such as a pellet or a powder, can be used as a molding material, and is typically in a dried state. The upper limit of a proportion of water with respect to total solid content in the resin composition of the embodiment of the present invention may be preferably 1% by mass, and may be more preferably 0.1% by mass or 0.01% by mass. When the resin composition of the embodiment of the present invention is in the dried state, favorable melt moldability and the like can be exhibited.

Molded Product

The resin composition of the embodiment of the present invention can be formed into molded products such as a film, a sheet, a tube, a bag, and a container by melt molding or the like. In other words, the molded product of the embodiment of the present invention is a molded product molded from the resin composition of the embodiment of the present invention. The molded product of the embodiment of the present invention may be formed from only the resin composition of the embodiment of the present invention, or may have a part formed from other material(s). For example, the laminate (multilayer structure), described later, is one mode of the molded product.

The molded product of the embodiment of the present invention inhibits the generation of aggregates at the time of melt molding, has sufficient heat/light resistance, and is resistant to breaking down into microplastics after being discarded, wherein the above-mentioned characteristics are sufficiently improved compared to a molded product obtained using the same EVOH. Thus, the resin composition of the embodiment of the present invention is particularly useful as a melt molding material.

Examples of a procedure for the melt molding include extrusion-molding, cast-molding, inflation extrusion-molding, blow-molding, melt spinning, injection molding, injection blow molding, and the like. The melt molding temperature may vary depending on the melting point of the EVOH (A) and the like, and is preferably 150° C. to 270° C. It is possible to subject these molded products to remolding for the purpose of reuse of the same after grinding. Alternatively, the film, the sheet, or the like can also be monoaxially or biaxially stretched.

Laminate (Multilayer Structure)

The laminate of the embodiment of the present invention has at least one layer constituted from the resin composition of the embodiment of the present invention. The laminate typically has a layer constituted from the resin composition of the embodiment of the present invention, and a layer constituted from another component. The lower limit of a number of layers of the laminate of the embodiment of the present invention is, for example, 2, may be 3, and may be 4. The upper limit of the number of layers is, for example, 1,000, may be 100, and may be 20.

Examples of the layer constituted from the other component include a layer constituted from, e.g., an other thermoplastic resin aside from the EVOH (A), a paper, a woven fabric, a nonwoven fabric, a metal cotton, a wooden material, a metal, or the like, and of these, the other thermoplastic resin is preferred. A layer configuration of the laminate of the embodiment of the present invention is not particularly limited, and when: the layer constituted from the resin composition of the embodiment of the present invention is represented by "E"; an adhesive layer is represented by "Ad"; and the layer obtained from the other thermoplastic resin is represented by "T", configurations such as T/E/T, E/Ad/T, and T/Ad/E/Ad/T may be exemplified. Each of these layers may be either a monolayer or a multilayer.

A method of producing the laminate of the embodiment of the present invention is not particularly limited, and examples thereof include a method in which a thermoplastic resin is melt extruded on a shaped article (film, sheet, etc.) obtained from the resin composition of the embodiment of the present invention; a method in which the resin composition of the embodiment of the present invention and the other thermoplastic resin are coextruded; a method in which the resin composition of the embodiment of the present invention and the thermoplastic resin are coinjected; a method in a barrier layer obtained from the resin composition of the embodiment of the present invention and the other thermoplastic resin are laminated using a known adhesive, such as an isocyanate compound, and a polyester-based compound; and the like.

Examples of the other thermoplastic resin include: linear low-density polyethylene, low-density polyethylene, medium-density polyethylene, high-density polyethylene, ethylene-vinyl acetate copolymers, ethylene-propylene copolymers, polypropylene, propylene-α-olefin (α-olefin having 4 to 20 carbon atoms) copolymers, homopolymers of an olefin such as polybutene or polypentene and copolymers thereof; polyesters such as polyethylene terephthalate; polyester elastomers; polyamides such as nylon-6 and nylon-66; polystyrenes; polyvinyl chlorides, polyvinylidene chlorides; acrylic resins; vinyl ester resins; polyurethane elastomers; polycarbonates; chlorinated polyethylenes; chlorinated polypropylenes; and the like. Of these, examples of preferably employed thermoplastic resins include polypropylenes, polyethylenes, ethylene-propylene copolymers, ethylene-vinyl acetate copolymers, polyamides, polystyrenes, and polyesters.

The adhesive layer is acceptable as long as it has adhesiveness to the layer of the resin composition of the embodiment of the present invention and the layer of the other thermoplastic resin, and is preferably an adhesive resin containing a carboxylic acid-modified polyolefin. As the carboxylic acid-modified polyolefin, a modified olefin polymer containing a carboxyl group, obtained by chemically bonding an ethylenic unsaturated carboxylic acid, an ester thereof, or an anhydride therefrom to an olefin polymer, is suitably used. The olefin polymer as referred to herein means a polyolefin such as polyethylene, linear low-density polyethylene, polypropylene, or polybutene, or a copolymer of the olefin with another monomer. Of these, linear low-density polyethylene, an ethylene-vinyl acetate copolymer, and an ethylene-ethyl acrylate ester copolymer are preferred, and linear low-density polyethylene and an ethylene-vinyl acetate copolymer are particularly preferred.

In a case in which the laminate of the embodiment of the present invention is a multilayer film or sheet, an average thickness is not particularly limited, and the lower limit thereof may be, for example, 1 μm, 5 μm, or 10 μm. On the other hand, the upper limit of the average thickness may be, for example, 3 mm, 1 mm, 300 μm, or 100 μm. A shape of the laminate is not particularly limited as long as it has a laminated structure. A multilayer thermoformed container, a multilayer blow-molded container, a multilayer pipe, a vapor deposition film, each described later, and the like are included in modes of the laminate.

The molded product and the laminate of the embodiments of the present invention inhibit the generation of aggregates at the time of melt molding, have sufficient heat/light resistance, and are resistant to breaking down into microplastics after being discarded, wherein the above-mentioned characteristics are sufficiently improved compared to products obtained using the same EVOH. Thus, the molded product and the laminate are suitable for a daily use product, a packaging material, a machine component, and the like, each of which is to be used outdoors. Examples of intended uses in which the characteristics of the molded product and the like are effectively exhibited include packaging materials for food/drinks, packing materials for containers, films, agricultural films, geomembranes, bag materials for medical fluid infusions, high-pressure tank materials, gasoline tank materials, fuel containers, tube materials for tires, cushion materials for shoes, inner bag materials for bag-in-boxes, tank materials for organic liquid storage, pipes (pipe materials for transporting organic liquids, pipe materials for warm water for heating (warm water pipe materials for floor heating, etc.), and the like), resin wallpapers, plant mediums, and the like. In particular, the molded product and the laminate of the embodiments of the present invention are suitably used as films, pipes, agricultural films, plant mediums, and geomembranes, each of which is to be used outdoors and is resistant to deterioration due to heat and/or light.

The molded product and the laminate of the embodiment of the present invention have properties of the generation of aggregates at the time of melt molding being inhibited, having sufficient heat/light resistance, and being resistant to breaking down into microplastics after being discarded; thus, they can also be suitably used as a thermoformed container, a blow-molded container, and the like.

Thermoformed Container

The thermoformed container of the embodiment of the present invention has a layer constituted from the resin composition of the embodiment of the present invention. The thermoformed container of the embodiment of the present invention is used in intended usages for which gas barrier properties are demanded in a variety of fields of, for example, foods, cosmetics, medical drugs, chemicals, toiletries, and the like. The thermoformed container of the embodiment of the present invention is formed to have a retaining portion through, for example, subjecting a multilayer body to thermoforming. The thermoformed container of the embodiment of the present invention is favorable in appearance due to inhibiting the generation of aggregates at the time of molding, has sufficient heat/light resistance, and is resistant to breaking down into microplastics after being discarded, wherein the above-mentioned characteristics are sufficiently improved compared to a thermoformed container obtained using the same EVOH.

Retaining Portion

The retaining portion is a portion for retaining contents such as foods. The shape of the retaining portion is decided in accordance with the shape of the contents. Specifically, the thermoformed container is formed to give, for example, a cup-shaped container, a tray-shaped container, a bag-shaped container, a bottle-shaped container, a pouch-shaped container, and/or the like.

The form of the retaining portion may be expressed by a draw ratio (S) as one indicator. The draw ratio (S) as referred to means a value obtained by dividing the depth of the bottom of the container by the diameter of an inscribed circle having the maximum diameter in the opening of the container. Thus, a greater value of the draw ratio (S) indicates a deeper container, whereas a smaller value of the draw ratio (S) indicates a shallower container. For example, in the case of the thermoformed container of this embodiment having a cup shape, the draw ratio (S) thereof would be larger, whereas in the case of the thermoformed container being a tray, the draw ratio (S) thereof would be smaller. It is to be noted that the value of the maximum inscribed diameter of a circle corresponds to, for example: a diameter of a circular shape when the opening of the retaining portion is circular; a shortest diameter (minor axis) of an elliptical shape when the opening of the retaining portion is elliptical; and a length of the shorter side of a rectangular shape when the opening of the retaining portion is rectangular.

An appropriate value for the draw ratio (S) differs depending on whether the multilayer body for forming the thermoformed container is a film or a sheet, or in other words, depending on a thickness of the multilayer body. In the case in which the thermoformed container is a thermoformed film, the draw ratio (S) is preferably 0.2 or more, more preferably 0.3 or more, and still more preferably 0.4 or more. On the other hand, in the case in which the thermoformed container is a formed sheet, the draw ratio (S) is preferably 0.3 or more, more preferably 0.5 or more, and still more preferably 0.8 or more. It is to be noted that as referred to herein, the "film" means a body which is soft and has a thickness of less than 0.2 mm, and the "sheet" means a body which is thicker than the film, for example, a body which is soft and has a thickness of 0.2 mm or more.

Multilayer Body

The multilayer body used in production of the thermoformed container of the embodiment of the present invention includes a layer (a) constituted from the resin composition of the embodiment of the present invention, and other layer(s) is/are laminated to at least one face side of both faces of the layer (a). In this regard, the term "one face" as referred to herein means the inner surface side of the retaining portion, provided that the thermoformed container is formed from the multilayer sheet, whereas the term "other face" means the outer surface side of the retaining portion. The multilayer body may be in the form of a film, and may be in the form of a sheet.

The lower limit of a thickness ratio (I/O) of the total I of the other layer(s) laminated to the one face side of the first layer (a) to the total thickness O of the other layer(s) laminated to the other face side of the layer (1) is preferably 1/99, and more preferably 30/70. The upper limit of the thickness ratio I/O is preferably 70/30, and more preferably 55/45. It is to be noted that the thickness of the total layers or a monolayer of the multilayer sheet is an average value of thicknesses measured by optical microscopic inspection of samples obtained from a plurality of portions of the multilayer sheet by cutting away with a microtome, and is substantially consistent with a thickness of the total layers or the monolayer of the thermoformed container.

The lower limit of an overall average thickness of the thermoformed container of the embodiment of the present invention is preferably 300 μm, more preferably 500 μm, and still more preferably 700 μm. Furthermore, the upper limit of the overall average thickness is preferably 10,000 μm, more preferably 8,500 μm, and still more preferably 7,000 μm. It is to be noted that the overall average thickness of the thermoformed container as referred to herein means the thickness of the total layers in the retaining portion of the thermoformed container, and the measuring method thereof is the same as that in the case of the measurement of the thickness of the total layers of the multilayer sheet. When the overall average thickness of the thermoformed container is less than or equal to the upper limit, production cost of the thermoformed container is suppressed. On the other hand, when the overall average thickness of the thermoformed container is less than or equal to the upper limit, the rigidity increases, whereby the thermoformed container is less likely to break easily. Thus, it is important to set the average overall thickness of the thermoformed container to a thickness in accordance with a volume and intended usage.

The other layer(s) laminated to the layer (α) constituted from the resin composition of the embodiment of the present invention are exemplified by: a thermoplastic resin layer (layer (β)); a polyolefin layer (layer (γ)); a layer (layer (δ)) containing EVOH, a thermoplastic resin, and a carboxylic acid-modified polyolefin; and the like. Hereinafter, the layer (α), the layer (β), the layer (γ), and the layer (δ) will be described in detail.

Layer (α)

The layer (α) is a layer constituted from the resin composition of the embodiment of the present invention. The lower limit of an average thickness of the layer (α) is not particularly limited, and in light of barrier properties, mechanical strength, and the like, is, with respect to the overall average thickness, preferably 0.5%, more preferably 1.0%, and still more preferably 1.5%. On the other hand, the upper limit of the average thickness of the layer (a) with respect to the overall average thickness is preferably 5.0%, more preferably 4.5%, and still more preferably 4.1%.

Layer (β)

The layer (β) is, for example, a thermoplastic resin layer provided on an inner face side and an outer face side of the layer (α). The layer (β) may be, for example, a layer having, as a principal component, a thermoplastic resin in which a solubility parameter calculated from Fedor's equation is 11 $(cal/cm^3)^{1/2}$ or less. A resin in which the solubility parameter as calculated in accordance with this equation is 11 (cal/

$cm^3)^{1/2}$ or less is superior in terms of moisture resistance. It is to be noted that the "solubility parameter as calculated from Fedor's equation" as referred to herein is a value represented by $(E/V)^{1/2}$. In the above equation, E represents molecular cohesive energy (cal/mol), and is represented by $E=\Sigma ei$. It is to be noted that ei represents evaporative energy. Furthermore, V represents a molar volume ($cm^3$/mol), and is represented by $V=\Sigma vi$ (vi: molar volume).

Examples of the thermoplastic resin constituting the layer (β) include: homopolymers or copolymers of an olefin, such as polyethylenes (linear low-density polyethylene, low-density polyethylene, medium-density polyethylene, high-density polyethylene, and the like), ethylene-vinyl acetate copolymers, ethylene-propylene copolymers, polypropylenes, copolymers of propylene with an α-olefin having 4 to 20 carbon atoms, polybutenes, and polypentenes; polystyrenes, polyvinyl chlorides; polyvinylidene chlorides; acrylic resins; vinyl ester-based resins; polyurethane elastomers; polycarbonates; chlorinated polyethylenes and chlorinated polypropylenes; and the like. Of these, the polyethylenes, the ethylene-propylene copolymers, the ethylene-vinyl acetate copolymers, the polypropylenes, and the polystyrenes are preferred.

It is to be noted that with regard to the polyethylenes, the ethyl-propylene copolymers, the ethylene-vinyl acetate copolymers, the polypropylenes, and the polystyrenes, atypically commercially available product may be appropriately selected and used. Furthermore, within a range not leading to impairment of the effects of the present invention, the layer (β) may contain other optional component(s).

The lower limit of an average thickness of the layer (β) is not particularly limited, and is, with respect to the overall average thickness, preferably 5%, more preferably 8%, and still more preferably 10%. On the other hand, the upper limit of an average thickness of the layer (β) is not particularly limited, and is, with respect to the overall average thickness, preferably 70%, more preferably 60%, and still more preferably 50%.

Layer (γ)

The layer (γ) is a polyolefin layer typically provided between the layer (α) and the layer (β). The layer (γ) is preferably a layer having, as a principal component, a carboxylic acid-modified polyolefin. The layer (γ) can function as an adhesive layer between the layer (α) and another layer, such as the layer (β). It is to be noted that the carboxylic acid-modified polyolefin as referred to herein means: an olefin polymer having a carboxy group or an anhydride group thereof obtained by chemical bonding of an ethylenic unsaturated carboxylic acid or an anhydride therefrom to an olefin polymer by an addition reaction, a graft reaction or the like.

The ethylenic unsaturated carboxylic acid and the anhydride therefrom are exemplified by a monocarboxylic acid, a monocarboxylic acid ester, a dicarboxylic acid, a dicarboxylic acid monoester, a dicarboxylic acid diester, a dicarboxylic acid anhydride, and the like. Specific examples of the ethylenic unsaturated carboxylic acid and the anhydride therefrom include maleic acid, fumaric acid, itaconic acid, maleic anhydride, itaconic anhydride, maleic acid monomethyl ester, maleic acid monoethyl ester, maleic acid diethyl ester, fumaric acid monomethyl ester, and the like. Of these, dicarboxylic acid anhydrides such as maleic anhydride and itaconic anhydride are preferred, and maleic anhydride is more preferred.

Examples of the olefin polymer that serves as a base polymer include:

polyolefins such as low-density, medium-density, or high-density polyethylene, linear low-density polyethylene, polypropylenes, and polybutenes;

copolymers of an olefin with a comonomer such as ethylene-vinyl acetate copolymers and ethylene-ethyl acrylate copolymers; and the like. The comonomer is not particularly limited as long as it is a monomer capable of copolymerizing with an olefin, and examples thereof may include a vinyl ester, an unsaturated carboxylic acid ester, and the like. As the olefin-derived polymer, a linear low-density polyethylene, an ethylene-vinyl acetate copolymer having a vinyl acetate content of 5% by mass or more and 55% by mass or less, and an ethylene-ethyl acrylate copolymer having an ethyl acrylate content of 8% by mass or more and 35% by mass or less are preferred, and a linear low-density polyethylene and an ethylene-vinyl acetate copolymer having a vinyl acetate content of 5% by mass or more and 55% by mass or less are more preferred.

The carboxylic acid-modified polyolefin is obtained by introducing the ethylenic unsaturated carboxylic acid or the anhydride therefrom into the olefin-derived polymer in the presence of, for example, a solvent such as xylene and a catalyst such as a peroxide through an addition reaction or a graft reaction. In this procedure, the lower limit of the amount of addition or grafting of the carboxylic acid or the anhydride therefrom to the olefin-derived polymer (i.e., degree of modification) is preferably 0.01% by mass, and more preferably 0.02% by mass with respect to the olefin-derived polymer. On the other hand, the upper limit of the amount of addition or grafting to the olefin-derived polymer (i.e., degree of modification) is preferably 15% by mass, and more preferably 10% by mass.

It is to be noted that within a range not leading to impairment of the effects of the present invention, the layer (γ) may contain optional component(s).

The lower limit of an average thickness of the layer (γ) is not particularly limited, and is, with respect to the overall average thickness, preferably 0.3%, more preferably 0.6%, and still more preferably 1.2%. The upper limit of the average thickness of the layer (γ) is preferably 12%, more preferably 9%, and still more preferably 6%. When the average thickness of the layer (γ) as the adhesive resin layer is greater than or equal to the lower limit, the adhesiveness can be increased. Furthermore, when the average thickness of the layer (γ) is less than or equal to the upper limit, the production cost can be suppressed.

Layer (δ)

The layer (δ) is a layer which contains an EVOH, a thermoplastic resin, and a carboxylic acid-modified polyolefin. Furthermore, the layer (δ) is preferably formed by using recovered materials of the layer (a), the layer (β), and the layer (γ) in the production step of the thermoformed container. Examples of the recovered material include burrs generated in the production step of the thermoformed container, products which have failed an inspection, and the like. When the thermoformed container further contains the layer (δ) as such a regrind layer, loss of the resin used during production of the thermoformed container can be reduced.

The layer (δ) may be used as a substitute for the layer (β) described above. However, in general, the layer (δ) is preferably used after being laminated with the layer (β), since the layer (δ) usually has less mechanical strength than the layer (β). Taking it into consideration that when the thermoformed container of the embodiment of the present invention is subjected to an external impact, concentration of stress would occur in the container, and in the stress concentration area, a compression stress in response to the impact would be generated on the inner layer side of the container, which may lead to breakage, the layer (δ), which is inferior in strength, is preferably provided so as to be situated on the outer layer side with respect to the layer (α). Moreover, in a case where a large amount of the resin needs to be recycled, e.g., in the case of the generation of a large amount of the burr, the regrind layer as the layer (δ) may be provided on both sides of the layer (α).

The upper limit of a content of the EVOH in the layer (δ) is preferably 9.0% by mass. When the content of the EVOH in the layer (δ) is greater than the upper limit, a crack is prone to occurring at an interface with other layer(s), and breakage of the overall thermoformed container may occur, originating at this crack. It is to be noted that the lower limit of the content of the EVOH in the layer (δ) is, for example, 3.0% by mass.

The lower limit of an average thickness of the layer (δ) is not particularly limited, and is, with respect to the overall average thickness, preferably 10%, more preferably 20%, and still more preferably 30%. The upper limit of an average thickness of the layer (δ) is, with respect to the overall average thickness, preferably 60%, more preferably 55%, and still more preferably 50%.

Method for Producing Multilayer Body

The multilayer body used in the thermoformed container may be formed by using a coextrusion molding apparatus. The multilayer body may be formed so as to have a predetermined layer configuration by, for example, charging the resin composition for forming the layer (α), the resin composition for forming the layer (β), the resin composition for forming the layer (γ), and the resin composition for forming the layer (δ) into separate extruders, and carrying out coextrusion using these extruders.

The extrusion molding of each layer is carried out by operating an extruder equipped with a single screw at a certain temperature. The temperature for forming the layer (α) is set to, for example, 170° C. or more and 240° C. or less. Furthermore, the temperature for forming the layer (β) is set to, for example, 200° C. or more and 240° C. or less. Moreover, the temperature for forming the layer (γ) is set to, for example, 160° C. or more and 220° C. or less. Moreover, the temperature for forming the layer (δ) is set to, for example, 200° C. or more and 240° C. or less.

Thermoforming

The thermoformed container can be formed by heating the multilayer body, being the film, sheet, etc., to be softened, and thereafter carrying out molding so as to fit a die shape. The thermoforming procedure is exemplified by: a procedure involving carrying out the molding so as to fit a die shape by means of vacuum or compressed air, which may be used in combination with a plug as needed (a straight process, a drape process, an air slip process, a snap-back process, a plug-assist process, and the like); a procedure involving press molding; and the like. Various molding conditions such as the molding temperature, the degree of vacuum, the pressure of the compressed air, and the molding speed are appropriately selected in accordance with the shape of the plug and/or the die, as well as properties of the film/sheet as a base material, and the like.

The molding temperature is not particularly limited as long as it is a temperature at which the resin can be sufficiently softened for molding, and a suitable range of the temperature may vary in accordance with the construction of the multilayer body, being the film, sheet, etc.

In the case of thermoforming the film, it is desired that the film is not exposed to: high temperatures at which melting of the film by heating occurs or the roughness of a metal surface of a heater plate is transferred to the multilayer sheet; or low temperatures at which shaping cannot be sufficiently attained. The lower limit of a specific heating temperature of the film is typically 50° C., preferably 60° C., and more preferably 70° C. The upper limit of the heating temperature of the film is typically 120° C., preferably 110° C., and more preferably 100° C.

On the other hand, in the case of thermoforming the sheet, in comparison to the case of the film, forming at even a high temperature may be possible. The heating temperature of the sheet may be set to, for example, 130° C. or more and 180° C. or less.

In terms of the layer configuration of the thermoformed container, the layer (β) is preferably provided as an outermost layer. More specifically, providing in an order of: layer (β)/layer (γ)/layer (α)/layer (γ)/layer (β) from the inner surface of the retaining portion to the outer surface of the retaining portion (hereinafter, represented as "(β)/(γ)/(α)/(γ)/(β) from the inner surface to the outer surface") is preferred in light of the impact resistance. Furthermore, in the case of including the layer (δ), being the regrind layer, examples of the layer configuration include:

- (β)/(γ)/(α)/(γ)/(δ)/(β) from the inner surface to the outer surface;
- (β)/(δ)/(γ)/(α)/(γ)/(δ)/(β) from the inner surface to the outer surface;
- (δ)/(γ)/(α)/(γ)/(δ) from the inner surface to the outer surface; and the like.

It is to be noted that in these layer configurations, the layer (δ) may be provided in place of the layer (β). As the layer configuration, of these, (β)/(γ)/(α)/(γ)/(δ)/(β) from the inner surface to the outer surface, and (β)/(δ)/(γ)/(α)/(γ)/(δ)/(β) from the inner surface to the outer surface are preferred. It is to be noted that in the case of a construction in which the layer (α) to the layer (δ) are each used in a plurality of number, the resin constituting each layer may be the same or different.

Cup-Shaped Container

Figure 4:
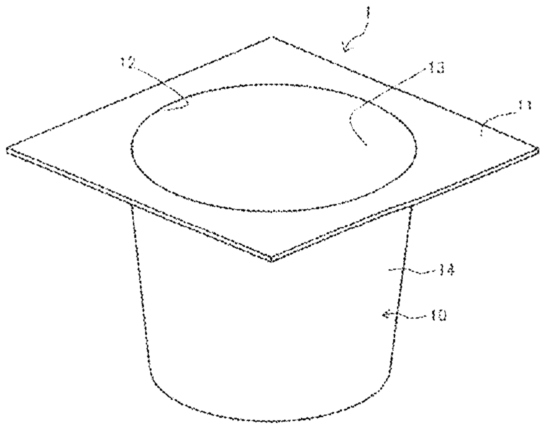
FIG. 4 shows a schematic perspective view illustrating a cup-shaped container which is one embodiment of a thermoformed container according to the present invention.
Figure 5:
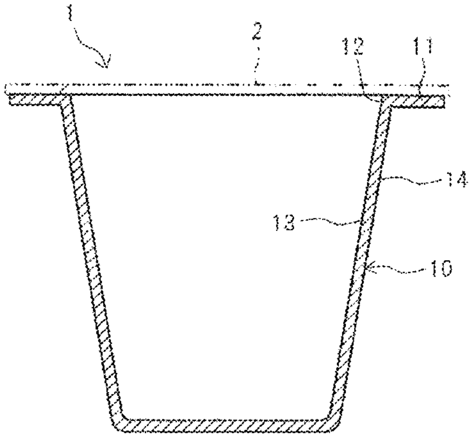
FIG. 5 shows a cross sectional view of the cup-shaped container shown in FIG. 4.

Next, a cup-shaped container shown in FIGS. 4 and 5 will be specifically described by way of an example of the thermoformed container. However, the cup-shaped container is merely an example of the thermoformed container, and the following explanation of the cup-shaped container does not limit the scope of the present invention. The cup-shaped container 1 shown in FIGS. 4 and 5 includes a cup main body 10 as the retaining portion, and a flange portion 11. The cup-shaped container 1 is used such that contents are retained in the cup main body 10, and a lid 2 is attached to the flange portion 11 so as to seal an opening 12 of the cup main body 10. The sealer is exemplified by a resin film, a metal foil, a metal-resin composite film, and the like, and among these, a metal-resin composite film in which a metal layer is laminated to a resin film is preferred. Examples of the resin film include polyethylene films, polyethylene terephthalate films, and the like. The metal layer is not particularly limited, and is preferably a metal foil or an inorganic vapor deposition layer, and is more preferably an aluminum foil in light of gas barrier properties and productivity.

The cup-shaped container 1 is obtained by subjecting the multilayer body, having the film shape, the sheet shape, etc., to thermoforming. It is preferred that the multilayer body includes at least the layer (α), and an other layer is preferably laminated to the layer (α). The other layer is exemplified by the layer (β), the layer (γ), the layer (δ), and the like.

Figure 6:
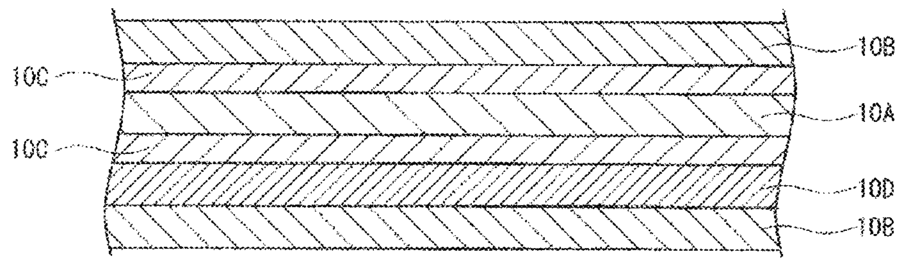
FIG. 6 shows a schematic cross sectional view illustrating a main section of the cup-shaped container shown in FIG. 4.

The layer configuration of the cup-shaped container 1 is preferably the configuration shown in FIG. 6. With regard to the layer configuration shown in FIG. 6, the layer (β) 10B is laminated to one face side of the layer (α) 10A (an inner surface 13 side of the cup main body 10 of the cup-shaped container 1) via the layer (γ) 10C, and the layer (δ) 10D and the layer (β) 10B are laminated to the other face side (an outer surface 14 side of the cup main body 10 of the cup-shaped container 1) via the layer (γ) 10C.

Method for Producing Cup-Shaped Container

Figure 7:
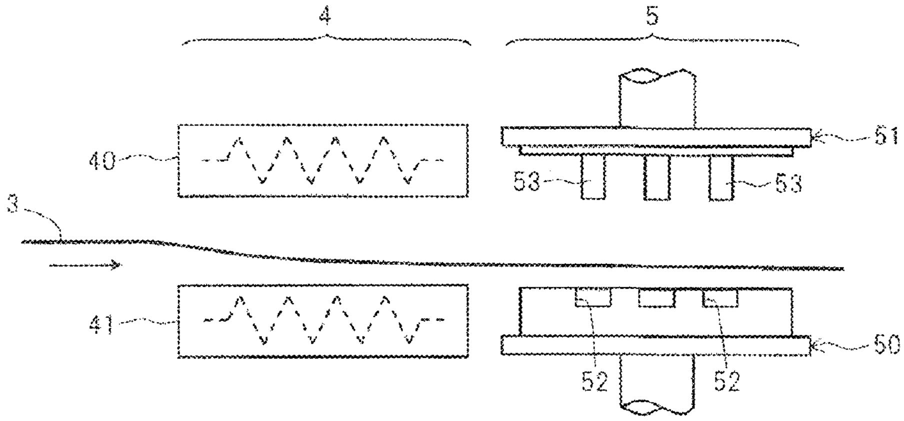
FIG. 7 shows a schematic view for illustrating the method for producing the cup-shaped container shown in FIG. 4.

As shown in FIG. 7, the cup-shaped container 1 is produced by heating a continuous multilayer body 3 having, e.g., a film shape or a sheet shape, by means of a heating apparatus 4 to permit softening, followed by thermoforming by using a die apparatus 5.

The heating apparatus 4 is provided with a pair of heaters 40 and 41, and is configured such that the continuous multilayer body 3 can be passed between the heaters 40 and 41. It is to be noted that as the heating apparatus 4, an apparatus which performs heating by hot pressing may be used.

The die apparatus 5 is suitable for thermoforming by a plug-assist process, and includes a lower mold half 50 and an upper mold half 51 that are placed in a chamber (not shown in the Figure). The lower mold half 50 and the upper mold half 51 are configured such that they are each independently vertically movable, and in a state of being spaced apart from one another, the continuous multilayer body 3 can be passed between the lower mold half 50 and the upper mold half 51. The lower mold half 50 includes a plurality of recessed parts 52 for shaping the retaining portion of the cup-shaped container 1. The upper mold half 51 includes a plurality of plugs 53 that protrude toward the lower mold half 50. The plurality of plugs 53 are each provided in the position corresponding to each of the plurality of recessed parts 52 of the lower mold half 50. Each plug 53 can be inserted into the corresponding recessed part 52.

Figure 8:
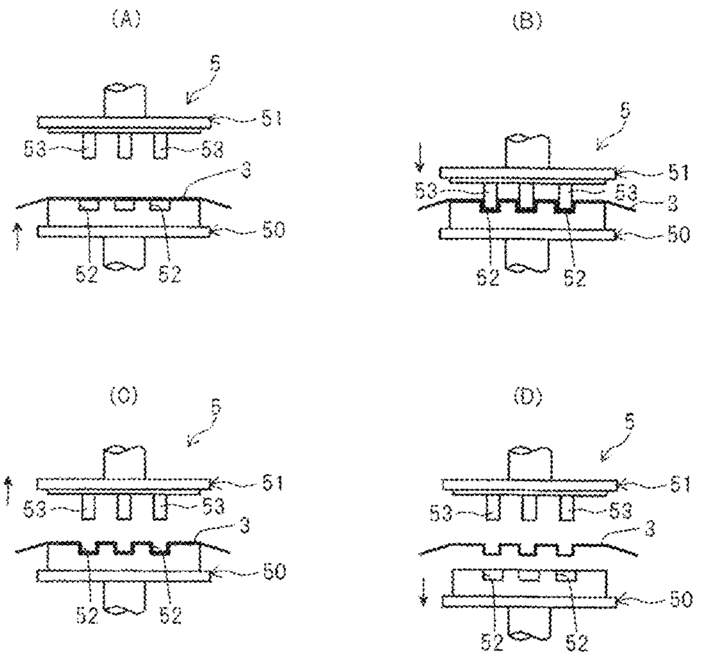
FIG. 8 shows a schematic view for illustrating the method for producing the cup-shaped container shown in FIG. 4.

First, as shown in FIGS. 7 and 8(A), the lower mold half 50 is moved upward with respect to the continuous multilayer body 3 which has been softened using the heating apparatus 4 to bring the softened continuous multilayer body 3 into close contact with the lower mold half 50, and the continuous multilayer body 3 is somewhat lifted up to apply tension to the continuous multilayer body 3. Next, as shown in FIG. 8(B), the upper mold half 51 is moved downward, whereby the plugs 53 are inserted into each corresponding recessed part 52.

Subsequently, as shown in FIG. 8(C), the upper mold half 51 is moved upward to separate the plugs 53 from each corresponding recessed part 52, and the inside of the chamber (not shown in the Figure) is evacuated to bring the continuous multilayer body 3 into close contact with the inner face of the recessed parts 52. Thereafter, the mold is cooled by blowing air thereto to fix the shape. As shown in FIG. 8(D), the inside of the chamber (not shown in the Figure) is then exposed to ambient air and the lower mold half 50 is moved downward to release the lower mold half 50, whereby a primary molded article is obtained. The primary molded article is cut away to give the cup-shaped container 1 shown in FIGS. 4 and 5.

Other Embodiments of Thermoformed Container

The thermoformed container is not limited to the above-described modes, and is acceptable as long as it includes at least the layer (α). Specifically, the layer (δ) and the like may be included as a regrind layer. Furthermore, other layer(s) may be laminated. Moreover, the thermoformed container may be formed by thermoforming a monolayer body including only the layer (α) including the resin composition of the embodiment of the present invention. A thermoforming method, a shape of the thermoformed container, and the like in this case may be similar to those of the thermoformed container described above.

Blow-Molded Container

The blow-molded container of the embodiment of the present invention is a layer constituted from the resin composition of the embodiment of the present invention. The blow-molded container of the embodiment of the present invention can be used for various containers which are required to have gas barrier properties, oil resistance, and the like. The blow-molded container of the embodiment of the present invention is favorable in appearance due to inhibiting the generation of aggregates at the time of molding, has sufficient heat/light resistance, and is resistant to breaking down into microplastics after being discarded, wherein the above-mentioned characteristics are sufficiently improved compared to a blow-molded container obtained using the same EVOH. Furthermore, the blow-molded container is also favorable in terms of impact resistance and the like. Hereinafter, the blow-molded container will be specifically described using, as an example, a blow-molded container 105 shown in FIG. 9. It is to be noted that FIG. 9 is a partial cross sectional view of a peripheral wall of the blow-molded container 105.

Figure 9:
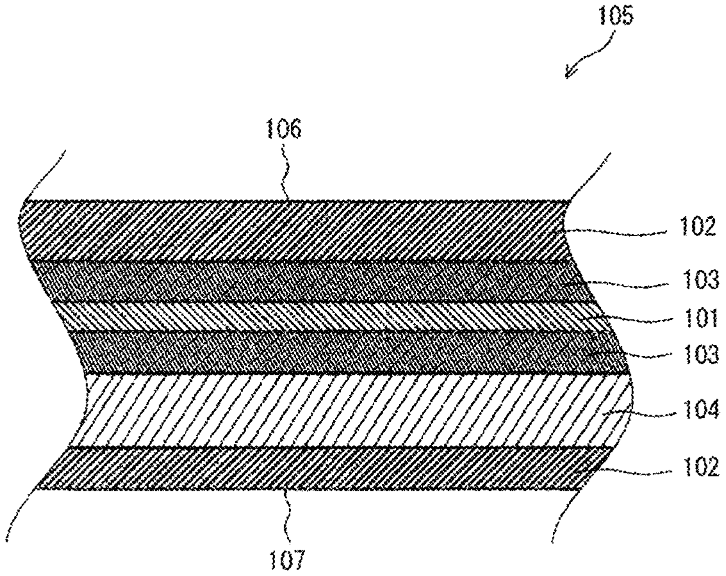
FIG. 9 shows a schematic partial cross sectional view illustrating a blow-molded container which is one embodiment of the blow-molded container according to the present invention.

The blow-molded container 105 of FIG. 9 includes: a layer (α) 101 constituted from the resin composition of the embodiment of the present invention, a thermoplastic resin layer (layer (β) 102), a polyolefin layer (layer (γ) 103), and a layer (layer (δ) 104) containing EVOH, a thermoplastic resin, and a carboxylic acid-modified polyolefin; and the like.

The layer (β) 102 is provided on both face sides of the layer (α) 101, and is, for example, a layer having, as a principal component, a thermoplastic resin in which a solubility parameter calculated from Fedor's equation is 11 $(cal/cm^3)^{1/2}$ or less. The layer (γ) 103 is provided between the layer (α) 101 and the layer (β) 102, and is, for example, a layer having carboxylic acid-modified polyolefin as a principal component. The layer (δ) may be, for example, a layer containing an EVOH, a thermoplastic resin in which a solubility parameter calculated from Fedor's equation is 11 $(cal/cm^3)^{1/2}$ or less, and a carboxylic acid-modified polyolefin.

Specifically, the blow-molded container 105 has a multilayer configuration in which the layer (β) 102, the layer (γ) 103, the layer (α) 101, the layer (γ) 103, the layer (δ) 104, and the layer (β) 102 are laminated in this order, from a container inner surface 106 to a container outer surface 107.

The lower limit of an overall average thickness of the blow-molded container 105 is preferably 300 μm, more preferably 500 μm, and still more preferably 1,000 μm. On the other hand, the upper limit of the overall average thickness of the blow-molded container 105 is preferably 10,000 μm, more preferably 8,500 μm, and still more preferably 7,000 μm. It is to be noted that the "overall average thickness" of the blow-molded container 105 as referred to herein means the average thickness in a trunk part of the blow-molded container 105. When the overall average thickness is greater than the upper limit, the weight increases, whereby, for example, in a case of use for a fuel container of an automobile or the like, there may be a negative impact on fuel economy, and there may also be a rise in production costs. On the other hand, when the overall average thickness is less than the lower limit, the rigidity cannot be maintained, which may lead to ease of breaking.

Thus, it is important to set the overall average thickness to a thickness in accordance with a volume and intended usage.

Components, average thicknesses, and the like of the layer (α) 101, the layer (β) 102, the layer (γ) 103, and the layer (δ) 104 may each be set similarly to, for example, those of the layer (α), the layer (β), the layer (γ), and the layer (δ) of the thermoformed container, described above; thus, descriptions thereof have been omitted.

The blow-molded container 105 is preferably produced by a method including a step of blow-molding using the resin composition of the embodiment of the present invention. Specifically, the blow molding is carried out by using resin composition pellets which form the layer (α) 101, high-density polyethylene or the like which forms the layer (β) 102, a carboxylic acid-modified polyolefin or the like which forms the layer (γ) 103, and recovered resin or the like which forms the layer (δ) 104, and using a four-type, six-layer parison of, for example, layer (β)/layer (γ)/layer (α)/layer (γ)/layer (δ)/layer (β) (hereinafter, represented as "(inside) β/γ/α/γ/δ/β (outside)") in a blow-molding machine at a temperature of 100° C. or more and 400° C. or less, and cooling at an internal die temperature of 10° C. or more and 30° C. or less for 10 sec or more to 30 min or less, whereby a hollow container having an overall average thickness of 300 μm or more and 10,000 μm or less can be formed.

The blow-molded container is not limited to the above-described modes, and is acceptable as long as it includes at least the layer (α). Specifically, the layer (δ) and the like may be included as a regrind layer. Furthermore, other layer(s) may be laminated. Moreover, by selecting a combination of resins having favorable adhesiveness, the layer (γ) as the adhesive layer may be omitted.

In the case in which the blow-molded container includes the layer (β), the layer (β) is preferably provided as an outermost layer. In other words, in view of impact resistance, from the inner surface of the container to the outer surface of the container, the arrangement of (inside) β/γ/α/γ/β (outside) is preferred. Furthermore, in the case of including the layer (δ) as the regrind layer or the like, an arrangement of (inside) β/γ/α/γ/δ/β (outside), (inside) β/δ/γ/α/γ/δ/β (outside), or (inside) δ/γ/α/γ/δ (outside) is preferred, and an arrangement of (inside) β/γ/α/γ/δ/β (outside) or (inside) β/δ/γ/α/γ/δ/β (outside) is more preferred. It is to be noted that a configuration which includes the layer (δ) in place of the layer (β) may be adopted, and in the case of an arrangement in which a plurality of each of the layers (α) to (δ) is used, the resin constituting each layer may be identical or different.

A fuel container is described as one mode of the blow-molded container of the embodiment of the present invention. The fuel container may be further provided with a filter, a fuel gauge, a baffle plate and the like in addition to the blow-molded container. Due to being provided with the blow-molded container, the fuel container is also superior in gas barrier properties, oil resistance, and the like; therefore, it can be suitably used as a fuel container. The "fuel container" as referred to herein means a fuel container mounted in an automobile, a motorcycle, a watercraft, an airplane, an electric power generator, an industrial or agricultural instrument or the like, or a portable fuel container for supplying the fuel to such a fuel container, as well as a container for retaining the fuel. Further, typical examples of the fuel include gasoline, in particular, oxygen-containing gasoline prepared by blending gasoline with methanol, ethanol, MTBE or the like, and further, heavy oil, light mineral oil, kerosene and the like are also included. The fuel container is particularly suitably used as a fuel container for oxygen-containing gasoline, among these.

In the case of the fuel container, the thermoplastic resin constituting the layer (β) is preferably high-density polyethylene. In light of rigidity, impact resistance, formability, drawdown resistance, gasoline resistance, and the like, the lower limit of a density of the high-density polyethylene is preferably 0.93 g/cm$^3$, more preferably 0.95 g/cm$^3$, and still more preferably 0.96 g/cm$^3$. On the other hand, the upper limit of the density of the high-density polyethylene is preferably 0.98 g/cm$^3$. Furthermore, the lower limit of a melt flow rate of the high-density polyethyelene at 190° C. and under a load of 2,160 g is preferably 0.01 g/10 min. On the other hand, the upper limit of the melt flow rate is preferably 0.5 g/10 min, and more preferably 0.1 g/10 min.

It is to be noted that with regard to the high-density polyethylene, a typically commercially available product may be appropriately selected and used. Furthermore, within a range not leading to impairment of the effects of the present invention, the layer (β) may contain other optional component(s).

Film

The film of the embodiment of the present invention is a film having a layer constituted from the resin composition of the embodiment of the present invention. The film includes a monolayer film and a multilayer film. Due to including the resin composition, the film inhibits the generation of aggregates at the time of melt molding, has sufficient heat/light resistance, and is resistant to breaking down into microplastics after being discarded. Furthermore, in the case in which the resin composition contains the inorganic particle (H), superiority in terms of film breakage resistance is also achieved. Furthermore, in the case in which the resin composition contains the inorganic particle (H), the vapor deposition flaw-inhibiting property, and the adhesion strength of a vapor deposition layer are also superior.

The lower limit of an arithmetic average roughness (Ra) of at least one surface of the film as measured in accordance with JIS B0601 is preferably 0.05 μm, more preferably 0.10 μm, still more preferably 0.15 μm, and particularly preferably 0.20 μm. On the other hand, the upper limit of an arithmetic average roughness (Ra) of the at least one surface of the film is preferably 1.0 μm, more preferably 0.8 μm, still more preferably 0.6 μm, and particularly preferably 0.4 μm. When the arithmetic average roughness (Ra) of the at least one surface of the film falls within the above range, the film breakage resistance can be further improved.

The lower limit of an average length (RSm) of a contour curve element of at least one surface of the film as measured in accordance with JIS B0601 is preferably 50 μm, more preferably 100 μm, still more preferably 150 μm, and particularly preferably 200 μm. The upper limit of the average length (RSm) of the contour curve element of the at least one surface of the film is preferably 1,000 μm, more preferably 800 μm, still more preferably 600 μm, and particularly preferably 400 μm. When the average length (RSm) of the contour curve element of the at least one surface of the film falls within the above range, the film breakage resistance can be further improved. It is to be noted that JIS-B0601 refers to, for example, JIS-B0601 (2001).

An average thickness of the film is not particularly limited, and the lower limit thereof may be, for example, 1 μm, 5 μm, or 10 μm. On the other hand, the upper limit of the average thickness may be, for example, 3 mm, 1 mm, 300 μm, or 100 μm. In the film, the lower limit of an average thickness of the layer constituted from the resin composition of the embodiment of the present invention may be, for example, 1 μm, 5 μm, or 10 μm. On the other hand, the upper limit of the average thickness of the layer may be, for example, 3 mm, 1 mm, 300 μm, or 100 μm.

As a method of producing the film of the embodiment of the present invention, a method having: a cast molding step of melt-extruding the resin composition of the embodiment of the present invention on casting rolls; and a step (a monoaxial stretching step, a sequential twin-screw step, a simultaneous biaxial stretching step, or an inflation molding step) of stretching an unstretched film obtained from the resin composition in the cast molding step, and the like may be exemplified. In the case in which the resin composition contains the inorganic particle (H), the film breakage resistance can be further improved by producing the film by the above-described method.

Vapor Deposition Film

The film of the embodiment of the present invention may be a vapor deposition film having an inorganic vapor deposition layer. The vapor deposition film includes, for example, a film (hereinafter, may be also referred to as "base film") constituted from the resin composition of the embodiment of the present invention, and an inorganic vapor deposition film provided to the base film. The vapor deposition film may, in addition to the above-described layers, also include a resin coating layer laminated to the inorganic vapor deposition layer, and an other layer.

The upper limit of the oxygen transmission rate of the vapor deposition film measured at 40° C., with a humidity of 90% RH on the vapor deposition layer side, and with a humidity of 0% RH on the base film side is preferably 5 $mL/m^2$·day·atm, more preferably 3 $mL/m^2$·day·atm, still more preferably 2 $mL/m^2$·day·atm, particularly preferably 1 $mL/m^2$·day·atm, and further particularly preferably 0.1 $mL/m^2$·day·atm. When the oxygen transmission rate is less than or equal to the upper limit, a time period during which a degree of vacuum can be maintained in the internal space of the container, etc., formed from the packaging that includes the vapor deposition film of the above embodiment can be prolonged. The term oxygen transmission rate (mL/$m^2$·day·atm) as referred to herein means a value obtained by dividing the amount of oxygen (ml) that transmits the vapor deposition film, by: the vapor deposition film area ($m^2$); the transmission time (day); and the difference (atm) between the oxygen gas pressure on one face side, and the oxygen gas pressure on the other face side of the vapor deposition film. Specifically, the oxygen transmission rate being, for example, "5 $mL/m^2$·day·atm or less" indicates that under the difference in pressure of the oxygen gas of 1 atmospheric pressure, 5 mL of oxygen transmits per 1 $m^2$ of the film per day. In addition, in the case where the inorganic vapor deposition layer is provided to both faces of the base film, the oxygen transmission rate is to be measured at 40° C., with a humidity of 90% RH on one inorganic vapor deposition layer side, and a humidity of 0% RH on other inorganic vapor deposition layer side.

The lower limit of a content of volatiles included in the vapor deposition film is not particularly limited, and preferably 0.01% by mass, more preferably 0.03% by mass, and still more preferably 0.05% by mass. The upper limit of the content of the volatiles is preferably 1.1% by mass, more preferably 0.5% by mass, and still more preferably 0.3% by mass.

However, in the case where the vapor deposition film is applied to a vacuum insulator, the content of the volatiles in the vapor deposition film is preferably as low as possible. The reason for such a feature is that volatiles generated from the vapor deposition film penetrate into a vacuum area of the vacuum insulator, and consequently, the degree of vacuum inside the vacuum insulator decreases, whereby thermal insulation performance may be impaired.

Herein, the content of the volatiles may be determined from a change of the mass before and after drying at 105° C. for 3 hrs, according to the following equation.

Content of volatiles (% by mass)=[((mass before drying)−(mass after drying)/(mass after drying)]×100

Base Film

The base film is constituted from the resin composition of the embodiment of the present invention. A method for producing the base film may be exemplified by methods similar to those exemplified in connection with the method for producing the film, described above, and the like.

The upper limit of the oxygen transmission rate of the base film is preferably 50 mL 20 μm/$m^2$·day·atm, more preferably 10 mL 20 μm/$m^2$·day·atm, still more preferably 5 mL 20 μm/$m^2$·day·atm, and particularly preferably 1 mL 20 μm/$m^2$·day·atm.

The upper limit of the average thickness of the base film is not particularly limited, and is preferably 30 μm, more preferably 25 μm, and still more preferably 20 μm. On the other hand, the lower limit of the average thickness of the base film is preferably 5 μm, more preferably 7 μm, and still more preferably 10 μm.

A method for forming of the base film is not particularly limited; a melting process, a solution process, a calendar process, and the like may be exemplified, and of these, a melting process is preferred. The melting process is exemplified by a casting process and an inflation process, and of these, a casting process is preferred.

In the case of the film formation by the casting process, stretching may be carried out. The stretching procedure is not particularly limited, and may be any of monoaxial stretching, simultaneous biaxial stretching, and sequential biaxial stretching. The lower limit of the draw ratio on area basis is preferably 8 times, and more preferably 9 times. The upper limit of the draw ratio is preferably 12 times, and more preferably 11 times. When the draw ratio falls within the above range, uniformity of the thickness, gas barrier properties and mechanical strength of the fil can be improved. In contrast, when the draw ratio is less than the lower limit, patches on stretching may be likely to remain, whereas when the draw ratio is greater than the upper limit, film breakage may be likely to occur during the stretching.

When the stretching is carried out, it is preferred that an original piece is hydrated beforehand. Accordingly, continuous stretching is facilitated. The lower limit of the moisture content of the original piece before stretching is preferably 2% by mass, more preferably 5% by mass, and still more preferably 10% by mass. The upper limit of the moisture content of the original piece before stretching is preferably 30% by mass, more preferably 25% by mass, and still more preferably 20% by mass. When the moisture content is less than the lower limit, patches on stretching are likely to remain, and particularly in a case where the stretching is carried out with a tenter, the draw ratio in the area close to the grip may become so great that the film may be easily tom in the vicinity of the grip. On the other hand, when the moisture content is greater than the upper limit, the modulus of elasticity at the stretched portion becomes so low to result in insufficient difference from unstretched portion, whereby patches on stretching may be likely to remain.

Although the stretching temperature may somewhat vary depending on the moisture content of the original piece before the stretching, and on the stretching procedure, the stretching temperature may be typically 50° C. or more and 130° C. or less. In order to obtain a biaxially stretched film accompanied by fewer patches on stretching, the stretching temperature is: preferably 70° C. or more and 100° C. or less in simultaneous biaxial stretching; preferably 70° C. or more and 100° C. or less in stretching along a longitudinal direction with rolls in sequential biaxial stretching; and preferably 80° C. or more and 120° C. or less in stretching along a width direction with a tenter.

Inorganic Vapor Deposition Layer

The inorganic vapor deposition layer is provided for principally ensuring the gas barrier properties of the vapor deposition film. The inorganic vapor deposition layer is provided to the base film. The inorganic vapor deposition layer may be provided either to both faces of the base film, or to only one face of the base film, but is preferably provided to both faces of the base film. By providing the inorganic vapor deposition layer to both faces of the base film, the gas barrier properties are more improved, stability of the gas barrier can be attained. More specifically, even if a defect is generated on one inorganic vapor deposition layer resulting from physical impact or the like, gas barrier properties as a vapor deposition film would be suitably maintained due to another inorganic vapor deposition layer maintaining the barrier properties.

The inorganic vapor deposition layer can be formed by vapor-depositing an inorganic substance. As the inorganic substance, a metal (for example, aluminum), a metal oxide (for example, silicon oxide and aluminum oxide), a metal nitride (for example, silicon nitride), a metal oxide nitride (for example, silicon oxynitride), and a metal carbide nitride (for example, silicon carbonitride) may be exemplified. Of these, in light of industrial productivity, the inorganic vapor deposition layer being formed from aluminum oxide, silicon oxide, magnesium oxide, or silicon nitride is preferred, and aluminum is more preferred.

It is to be noted that even in the case of the aluminum vapor deposition layer, oxidation may unavoidably occur, whereby aluminum oxide is contained in a part thereof. In the case in which the inorganic vapor deposition layer contains aluminum oxide in a part thereof, a ratio ($O_{mol}/Al_{mol}$) of a substance amount of oxygen atoms to the substance amount ($Al_{mol}$) of aluminum atoms constituting the inorganic vapor deposition layer is preferably 0.5 or less, more preferably 0.3 or less, still more preferably 0.1 or less, and particularly preferably 0.05 or less.

The lower limit of an average thickness of the inorganic vapor deposition layer is preferably 15 nm, more preferably 20 nm, still more preferably 30 nm, and particularly preferably 40 nm. The upper limit of the average thickness of the inorganic vapor deposition layer is preferably 200 nm, more preferably 130 nm, and still more preferably 80 nm. When the average thickness of the inorganic vapor deposition layer is greater than or equal to the lower limit, the gas barrier properties and the like can be further improved. On the other hand, when the average thickness of the inorganic vapor deposition layer is less than or equal to the upper limit, for example, a thermal bridge can be inhibited, and a heat insulation effect can be enhanced. It is to be noted that in a case in which the inorganic vapor deposition layer is constituted from a plurality of layers, it is preferred that the average thickness of each layer falls within the above range, and further preferred that the sum of the average thicknesses of the plurality of layers falls within the above range. The average thickness of the inorganic vapor deposition layer as referred to herein means an average value of thicknesses at 10 arbitrary points of a cross section of the inorganic vapor deposition layer, measured by using an electron microscope.

The lower limit of the average particle diameter of vapor deposition particles such as aluminum particles in the inorganic vapor deposition layer is not particularly limited, and preferably 10 nm, more preferably 15 nm, and still more preferably 20 nm. On the other hand, the upper limit of the average particle diameter of the vapor deposition particles is preferably 150 nm, more preferably 125 nm, still more preferably 100 nm, particularly preferably 75 nm, and most preferably 50 nm. The average particle diameter of the vapor deposition particles as herein referred to means an averaged value obtained by observing the surface of the inorganic vapor deposition layer with a scanning electron microscope, determining maximum diameters of a plurality of vapor deposition particles present along an identical direction (maximum diameter in a certain direction), and dividing the sum of the maximum diameters by the number of particles measured. In addition, in the case where the vapor deposition particles form particle aggregates, the average particle diameter means the particle size of the vapor deposition particles forming the particle aggregates (primary particle size).

In the case in which the inorganic vapor deposition layer is formed on the base film, it becomes possible to form the inorganic vapor deposition layer having the average particle diameter of the vapor deposition particles of 150 nm or less by satisfying any one of the following requirements.

(1) The surface temperature of the base film in vapor deposition is kept at 60° C. or less.
(2) The content of volatiles included in the base film before the vapor deposition is regulated to 1.1% by mass or less.
(3) The surface of the base film before the vapor deposition is modified by subjecting to a plasma treatment.

Of these, it is preferred that the requirement (1) is satisfied, and is more preferred that in addition to the requirement (1), at least one of the requirement (2) and the requirement (3) is satisfied.

The upper limit of the surface temperature of the base film in carrying out the vapor deposition is, as described above, preferably 60° C., more preferably 55° C., and still more preferably 50° C. In addition, the lower limit of the surface temperature of the base film in the vapor deposition is not particularly limited, but is preferably 0° C., more preferably 10° C., and still more preferably 20° C.

The lower limit of the content of the volatiles included in the base film before the vapor deposition is not particularly limited, and is preferably 0.01% by mass, more preferably 0.03% by mass, and still more preferably 0.05% by mass. The upper limit of the content of the volatiles is preferably 1.1% by mass, more preferably 0.5% by mass, and still more preferably 0.3% by mass. The content of the volatiles may be determined in a similar manner to the content of the volatiles in the vapor deposition film described above, from the change before and after drying at 105° C. for 3 hrs.

As the procedure for the plasma treatment of the surface of the base film before the vapor deposition, a well-known procedure can be used, and an atmospheric-pressure plasma treatment is preferred. In this atmospheric-pressure plasma treatment, examples of the discharge gas include a nitrogen gas, helium, neon, argon, krypton, xenon, radon, and the like. Of these, nitrogen, helium and argon are preferred, and in light of the cost reduction, nitrogen is more preferred.

Resin Coating Layer

The resin coating layer is provided for inhibiting the damage of the inorganic vapor deposition layer resulting from flexion and the like in the film processing such as lamination, for example, in the step following the production of the vapor deposition film. According to the vapor deposition film provided with such a resin coating layer, deterioration of the gas barrier properties can be inhibited. The resin coating layer may contain, for example, a vinyl alcohol polymer (an ethylene-vinyl alcohol copolymer, polyvinyl alcohol, etc.), and as needed, a swellable inorganic layered silicate may be also contained.

The swellable inorganic layered silicate improves the strength of the resin coating layer. Examples of the swellable inorganic layered silicate include swellable montmorillonite, swellable synthetic smectite, swellable fluorinemica minerals, and the like. The lower limit of the content of the swellable inorganic layered silicate with respect to the vinyl alcohol polymer in the resin coating layer is not particularly limited, and in terms of the solid content equivalent, the lower limit of the content is preferably 0.5% by mass, more preferably 1% by mass, still more preferably 3% by mass, and particularly preferably 5% by mass. On the other hand, the upper limit of the content of the swellable inorganic layered silicate with respect to the vinyl alcohol polymer in the resin coating layer is not particularly limited, and in terms of the solid content equivalent, the upper limit of the content is preferably 55% by mass, more preferably 40% by mass, still more preferably 30% by mass, and particularly preferably 20% by mass. When the content of the swellable inorganic layered silicate is less than the lower limit, the strength of the resin coating layer may not be sufficiently improved. On the other hand, when the content of the swellable inorganic layered silicate is greater than the upper limit, flexibility of the resin coating layer is impaired, and thus defects such as cracks may be likely to be generated.

The lower limit of the average thickness of the resin coating layer is not particularly limited, but is preferably 0.001 m in order to obtain effective gas barrier properties. On the other hand, the upper limit of the average thickness of the resin coating layer is not particularly limited, but is preferably 10 μm, and more preferably 2 μm.

Although the procedure for laminating the resin coating layer on the inorganic vapor deposition layer is not particularly limited, a coating process, and a laminating process are preferred. Examples of the coating process include: a direct gravure process; a reverse gravure process; a micro gravure process; roll coating processes such as a two-roll bead coating process and a bottom feed three-roll reverse coating process; a doctor knife process; a die coating process; a dipping coating process; a bar coating process; a combination thereof; and the like. In addition, an interface between the inorganic vapor deposition layer and the resin coating layer may have undergone a corona treatment or a treatment with an anchor coating agent or the like.

Other Layer

The other layer is exemplified by a layer containing a thermoplastic resin as a principal component (hereinafter, referred to as "thermoplastic resin layer"), a paper layer, and the like.

The thermoplastic resin layer may be laminated to any one of the base film, the inorganic vapor deposition layer, and the resin coating layer, or may be a layer that serves as an adhesion layer. The thermoplastic resin layer may be formed from a stretched film or from an unstretched film, or may be formed by coating.

Examples of the thermoplastic resin which may form the other layer include: polyolefins such as polyethylene and polypropylene; polyesters such as polyethylene terephthalate; polyamides; ethylene-vinyl alcohol copolymers; and the like.

The vapor deposition film has few vapor deposition flaws, and superior adhesion strength of the inorganic vapor deposition layer can be provided. Thus, the vapor deposition film can be applied to various intended usages. Examples of the intended usages of the vapor deposition film include packaging, vacuum insulators, and the like.

Agricultural Film

The agricultural film of the embodiment of the present invention is a layer constituted from the resin composition of the embodiment of the present invention. The agricultural film of the embodiment of the present invention is favorable in appearance and the like due to inhibiting the generation of aggregates at the time of molding, has sufficient heat/light resistance, and is resistant to breaking down into microplastics after being discarded, wherein the above-mentioned characteristics are sufficiently improved compared to an agricultural film obtained using the same EVOH. Furthermore, the agricultural film is also superior in terms of various types of performance necessary for an agricultural film, such as barrier properties, wrapping properties, durability, and the like.

The agricultural film may be a monolayer film consisting of only a layer constituted from the resin composition of the embodiment of the present invention, and may be a multilayer film having other layer(s). The other layer(s) which may be included in the agricultural film is/are exemplified by a thermoplastic resin layer, and the like. Specific modes and favorable modes of the agricultural film may be similar to the film of the embodiment of the present invention, described above. In the case in which the agricultural film is a multilayer film, the layer configuration thereof may be exemplified by cases of layer configurations similar to the laminate of the embodiment of the present invention, described above. For example, with regard to the layer configuration of the agricultural film, when: the layer constituted from the resin composition of the embodiment of the present invention is represented by "E"; an adhesive layer is represented by "Ad"; and a layer obtained from the other thermoplastic resin is represented by "T", configurations such as T/E/T, E/Ad/T, and T/Ad/E/Ad/T may be exemplified. Each of these layers may be either a monolayer or a multilayer. Specific examples of the resin used in the adhesive layer and the layer obtained from the other thermoplastic resin include resins similar to those used in these layers in the laminate of the embodiment of the present invention. Furthermore, a method for producing the agricultural film is also not particularly limited, and various molding methods exemplified as the method of melt-molding the resin composition of the embodiment of the present invention may be employed.

The agricultural film of the embodiment of the present invention may be used for various films for use in the agricultural field, such as a large silo film, a soil fumigation film, a grain storage bag, a silage film, a film for a vinyl house, a multi-film, and the like.

The large silo film is a film for wrapping and storing grain. By wrapping and storing grain with the large silo film, the grain can be protected from humidity, mold, insects, and the like.

The soil fumigation film is a film used for, e.g., preventing transpiration of a soil fumigation agent when performing soil fumigation in a field or the like.

The soil storage bag is a bag for storing grain to protect the grain from humidity, mold, insects, and the like, and is also referred to as a "hermetic bag" and the like. The grain storage bag according to one mode of the present invention is a product in which a film including at least one layer constituted from the resin composition of the embodiment of the present invention is formed into a bag shape, a saccate shape, or another container shape.

The silage film is a film used for the production, wrapping, and/or the like of silage. Silage, which is obtained by fermenting pastorage or the like under anaerobic conditions, is used for feed for livestock, and the like. A form of a silo where the silage film is used is not particularly limited, and various forms, such as a bunker silo, an underground (or semi-underground) silo, a bag silo, a tube silo, a stack silo, a wrap silo, and the like, may be exemplified.

Plant Medium

The plant medium of the embodiment of the present invention is constituted from the resin composition of the embodiment of the present invention. The plant medium inhibits the generation of the aggregates at the time of melt molding, has sufficient heat/light resistance, and is resistant to breaking down into microplastic after discarding, wherein the above-mentioned characteristics are sufficiently improved compared to a plant medium obtained using the same EVOH. Furthermore, the plant medium also sufficiently exhibits types of performance required for a conventional plant medium, such as moisture retention and the like, thereby enabling favorable cultivation of plants.

The plant medium is a soil replacement for germination, cultivation, and the like of various plants. The various plants may not be particularly limited, and may include vegetables, ornamental plants, garden plants, grasses, other vegetation, and the like. The plant medium may be used to sow and culture seeds, bulbs, and the like, and may be used for greening of desert regions and the like. The plant medium may be used upon mixing with another medium such as soil, sand, and/or the like. The plant medium may also be used upon being mixed or impregnated with water, a nourishing liquid, a fertilizer, and/or the like. The plant medium may also be used for wet field agriculture.

As a shape of the plant medium, the plant medium may be porous, spongy, granular, e.g., in the shape of pellets, or the like. In the case in which the plant medium is granular, a diameter thereof is preferably 1 mm or more and 20 mm or less, and more preferably 2 mm or more and 10 mm or less. When the size of the plant medium falls within the above range, moisture retention, germinating properties, viability, handleability, and the like become favorable. It is to be noted that in a case in which the plant medium is not spherical, a maximum diameter thereof corresponds to the diameter. A method for producing the plant medium is not particularly limited, and the plant medium may be produced by a conventionally well-known method in accordance with the shape and the like.

Pipe

The pipe of the embodiment of the present invention has a layer constituted from the resin composition of the embodiment of the present invention. The pipe inhibits the generation of aggregates at the time of melt molding, has sufficient heat/light resistance, and is resistant to breaking down into microplastic after discarding, wherein the above-mentioned characteristics are sufficiently improved compared to a pipe obtained using the same EVOH.

With regard to the layer constituted from the resin composition of the embodiment of the present invention, the layer included in the pipe, the resin composition preferably contains an antioxidant (G). In such a case, due to the heat resistance and the like being particularly enhanced, generation of cracks and the like is inhibited, enabling use for a long period of time, and the like.

The pipe may be a monolayer pipe, and may be a multilayer pipe. In the case in which the pipe is a multilayer pipe, the layer structure thereof may be exemplified by layer structures similar to the laminate of the embodiment of the present invention, described above. With regard to the layer structure of the multilayer pipe, for example, when: the layer constituted from the resin composition of the embodiment of the present invention is represented by "E"; an adhesive layer is represented by "Ad"; and a layer obtained from the other thermoplastic resin is represented by "T", configurations such as T/E/T, E/Ad/T, and T/Ad/E/Ad/T may be exemplified. Each of these layers may be either a monolayer or a multilayer. Specific examples of the resin used in the adhesive layer and the layer obtained from the other thermoplastic resin include resins similar to those used in these layers in the laminate of the embodiment of the present invention. Furthermore, a method for producing the pipe is also not particularly limited, and various molding methods exemplified as the method of melt-molding the resin composition of the embodiment of the present invention may be employed.

An intended usage of the pipe is not particularly limited, and for example, the pipe can be used as a heated water circulation pipe, a fuel pipe, a gas pipe, and the like.

EXAMPLES

Hereinafter, the present invention is specifically explained by way of Examples and the like, but the present invention is not limited to these Examples. It is to be noted that methods for measurement, calculation, and evaluation were each performed in accordance with the following methods.

Measurement Conditions for Quantitative Determination of Primary Structure of EVOH (NMR Method)

Apparatus name: ECZ-600, superconductive nuclear magnetic resonance apparatus manufactured by JEOL, Ltd.

Observation frequency: 600 MHz ($^1H$)

(1) Solvent: deuterated dimethyl sulfoxide (DMSO-$d_6$); polymer concentration: 5% by mass; measurement temperature: 25° C., 80° C.

Flip angle: 30°; integration number: 256 s

Internal standard substance: tetramethylsilane (TMS)

(2) Solvent: deuterated water ($D_2O$)+deuterated methanol (MeOD) (mass ratio: 4/6); polymer concentration: 5% by mass; measurement temperature: 80° C.

Flip angle: 30°; integration number: 1,024 s

Internal standard substance: tetramethylsilane (TMS)

Quantitative Determination of Ethylene Unit Content, Degree of Saponification, Terminal Carboxylic Acid Unit Content, and Terminal Lactone Ring Unit Content With regard to the EVOH, the ethylene unit content (Et Cont.), the degree of saponification (SP), the terminal carboxylic acid unit content (α), and the terminal lactone ring unit content (β) were calculated in accordance with the following formulae by using $^1H$-NMR measurement (measurement results with DMSO-$d_6$ solvent at 25° C., 80° C.; measurement results with $D_2O$+MeOD solvent). It is to be noted that the chemical shift values are based on a TMS peak of 0 ppm. Furthermore, in the formulae, VAc, VA1, and Et represent vinyl acetate units, vinyl alcohol units, and ethylene units, respectively.

I1, I3: integrated value of methylene hydrogens at 0.4 to 2.35 ppm (I1: measurement value using DMSO-$d_6$ at 25° C., I3: measurement value using DMSO-$d_6$ at 80° C.)

I9: integrated value of methylene hydrogens at 0.4 to 2.8 ppm (measurement value using $D_2O$+MeOD solvent)

I2: integrated value of methine hydrogens of vinyl alcohol units (methine hydrogens in the units having both sides adjacent to vinyl alcohol) at 3.4 to 4.0 ppm (measurement value using DMSO-$d_6$ at 25° C.)

I4: integrated value of methine hydrogens of vinyl alcohol units (methine hydrogens in the units having both sides adjacent to vinyl alcohol) at 3.15 to 3.45 ppm (measurement value using DMSO-$d_6$ at 80° C.)

I5: integrated value derived from hydrogens of terminal methyl groups in vinyl acetate units (measurement value using DMSO-$d_6$ at 80° C.)

I6: integrated value around 1.8 to 1.85 (measurement value using DMSO-$d_6$ at 80° C.)

I7: integrated value derived from hydrogens of methyl groups in $—CH(OH)CH_3$ groups present at polymer ends of EVOH (measurement value using DMSO-$d_6$ at 80° C.)

I8: integrated value derived from hydrogens of methyl groups in $—CH_2CH_3$ groups present at polymer ends of EVOH (measurement value using DMSO-$d_6$ at 80° C.)

I10: integrated value around 0.8 to 0.95 (measurement value using $D_2O$+MeOD solvent)

I11: integrated value derived from hydrogens of $CH_2$ units adjacent to carbonyl groups of terminal lactone ring units (measurement value using $D_2O$+MeOD solvent)

I12: integrated value derived from linear COOH groups of terminal carboxylic acid unit (measurement value using $D_2O$+MeOD solvent)

I13, I14: integrated value derived from carboxylic acid salts of terminal carboxylic acid unit (measurement value using $D_2O$+MeOD solvent)

It is to be noted that each of the ethylene unit content (Et Cont.), the terminal carboxylic acid unit content (α), and the terminal lactone ring unit content (β) determined is a percentage (mol %) of an amount (mol) of each unit with respect to a total amount (mol) of all of the ethylene units, the vinyl ester units, and the vinyl alcohol units. With regard to this point, contents of units other than the ethylene units, the vinyl ester units, and the vinyl alcohol units are extremely low in comparison to these units. Thus, each of the ethylene unit content (Et Cont.), the terminal carboxylic acid unit content (α), and the terminal lactone ring unit content (β) determined is substantially equivalent to a percentage (mol %) of an amount (mol) of each unit with respect to total amount (mol) of total structural units.

$$VAc = \frac{I5}{3}$$

$$VA1 = I2 \times \frac{I3}{I1} + 14$$

$$Et = \frac{I3 - I5 \times 5/3 - VAl \times 2 - I7 - I8 \times 5/3 - I6}{4} + \frac{I8}{3}$$

$$VAc\,Cont. = \frac{VAc}{VAc + VAl + Et} \times 100$$

$$VA1Cont. = \frac{VAl}{VAc + VAl + Et} \times 100$$

$$Et\,Cont. = \frac{Et}{VAc + VAl + Et} \times 100$$

-continued $$SP = 100 - \frac{VAc}{VAc + VAl} \times 100$$

$$CH_2 = \frac{VAl\,Cont.}{100} \times 2 + \frac{VAc\,Cont.}{100} \times 5 + \frac{Et\,Cont.}{100} \times 4$$

$$EVOH = \frac{I9 - I10 \times 1/3}{CH_2}$$

$$\alpha = \frac{(I12 - I11/2)/2 + (I13 + I14)/2}{EVOH} \times 100$$

$$\beta = \frac{I11/2}{EVOH} \times 100$$

Measurement of Melt Flow Rate (MFR)

Dry resin composition pellets obtained from each of the Examples and the Comparative Examples were packed into a cylinder of the melt indexer L244 (manufactured by Takara Kogyo Co., Ltd.), the cylinder having an inner diameter of 9.55 mm and a length of 162 mm; melting was performed at 210° C.; and then an even load was applied on the melted resin composition by using a plunger having a mass of 2,160 g and a diameter of 9.48 mm. An amount of the resin composition extruded from an orifice with a diameter of 2.1 mm provided in the center of the cylinder was measured per unit time (g/10 min), and this was defined as the MFR.

Sodium Ion Content, Phosphoric Acid Content, and Boric Acid Content

Into a Teflon (registered trademark) pressure container, 0.5 g of the dried resin composition pellets obtained from each of the Examples and Comparative Examples was charged, and 5 mL of concentrated nitric acid was added thereto, whereby the dried resin composition pellets were decomposed at room temperature for 30 min. After a lapse of 30 min, the container was covered with a lid, and a heat treatment was carried out at 150° C. for 10 min and a subsequent heat treatment was carried out at 180° C. for 5 min, by using a wet degradation device ("MWS-2," manufactured by Actac Project Service Corporation) to permit degradation, and then the mixture was cooled to room temperature. The treatment liquid thus obtained was transferred to a 50 mL volumetric flask (TPX (registered trademark)) and diluted with pure water. Metals contained in the solution were analyzed by using an ICP optical emission spectrophotometer ("OPTIMA4300DV," manufactured by PerkinElmer Inc.), whereby the content of the sodium ion (sodium element), the content of the phosphoric acid in terms of phosphate radical, and the content of the boric acid in terms of boron element were calculated. It is to be noted that in the quantitative determination, in each case, a calibration curve created by using a commercially available standard solution was used.

Acetic Acid Content 20 g of dried resin composition pellets obtained from each of the Examples and the Comparative Examples was charged into 100 ml of ion exchanged water and thermally extracted at 95° C. for 6 hrs. The extracted liquid was subjected to neutralization titration with 1/50 N NaOH using phenolphthalein as an indicator, whereby the content of acetic acid was quantitatively determined.

Sorbic Acid Content

The dried resin composition pellets obtained from each of the Examples and the Comparative Examples were subjected to freeze grinding, and then 22 g of a ground product obtained by eliminating coarse grains by means of a sieve (according to standard sieve designation JIS-Z8801-1 to 3) having a nominal dimension of 0.150 mm (100 mesh) was packed into a Soxhlet extractor, and extraction processing was performed for 16 hrs by using 100 mL of chloroform. An amount of sorbic acid in the chloroform extraction liquid obtained was quantitatively analyzed by high performance liquid chromatography, whereby a content of sorbic acid in the resin composition was quantitatively determined. It is to be noted that in the quantitative determination, a calibration curve created by using an authentic sample of the sorbic acid was used.

Cinnamic Acid Content

The dried resin composition pellets obtained from each of the Examples and the Comparative Examples were subjected to freeze grinding, and then 22 g of a ground product obtained by eliminating coarse grains by means of a sieve (according to standard sieve designation JIS-Z8801-1 to 3) having a nominal dimension of 0.150 mm (100 mesh) was packed into a Soxhlet extractor, and extraction processing was performed for 16 hrs by using 100 mL of acetone. An amount of cinnamic acid in the acetone extraction liquid obtained was quantitatively analyzed by high performance liquid chromatography, whereby a content of cinnamic acid in the resin composition was quantitatively determined. It is to be noted that in the quantitative determination, a calibration curve created by using an authentic sample of the cinnamic acid was used.

Aluminum Ion Content 15 g of the dried resin composition pellets obtained from each of the Examples and the Comparative Examples was weighed out and charged into a platinum crucible, and dry degradation was carried out by using nitric acid and sulfuric acid. To the washed sample materials was added 2 mL of hydrochloric acid, an amount was fixed with a 50 mL volumetric flask made of polytetrafluoroethylene (PTFE), and a thus obtained solution was filtered through a PTFE filter having pores of 0.45 μm to give a sample material solution. Using the solution, the aluminum ion content in the resin composition was measured by high-frequency plasma spectroscopic analysis ("IRIS AP," an ICP emission spectrometer manufactured by Jarrell Ash Corporation).

Synthesis Example 1: Synthesis of EVOH-A

Into a 200 L pressurized reactor equipped with a jacket, a stirrer, a nitrogen-feeding port, an ethylene-feeding port, and an initiator addition port, 75.0 kg of vinyl acetate (hereinafter, may be also referred to as VAc) and 7.2 kg of methanol (hereinafter, may be also referred to as MeOH) were charged, and the reaction liquid was bubbled with a nitrogen gas for 30 min so as to execute nitrogen replacement inside the reactor. Then, the temperature in the reactor was regulated to 65° C., ethylene was introduced into the reactor so as to give a reactor pressure (ethylene pressure) of 4.13 MPa, and 9.4 g of 2,2'-azobis(2,4-dimethylvaleronitrile) ("V-65", manufactured by FUJIFILM Wako Pure Chemical Corporation) as an initiator was added to start polymerization. During the polymerization, the ethylene pressure was maintained at 4.13 MPa and the polymerization temperature was maintained at 65° C. Four hrs later, when the conversion (rate of polymerization) of VAc reached 49.7%, cooling was performed, and a substance in which 0.2 g of copper acetate was dissolved in 20 kg of methanol was charged into the reactor to stop the polymerization. The reactor was opened to evacuate ethylene, and then a nitrogen gas was bubbled into the reaction liquid to completely remove ethylene. Next, the polymerization liquid was removed from the reactor, and diluted with 20 L of MeOH. This liquid was fed from a top of a column-shaped container and MeOH vapor was fed from the bottom of the column, whereby an unreacted monomer that remained in the polymerization liquid was eliminated with the MeOH vapor, to give an MeOH solution of an ethylene-vinyl acetate copolymer (hereinafter, may be also referred to as EVAc).

Next, into a 300 L reactor equipped with a jacket, a stirrer, a nitrogen-feeding port, a reflux condenser, and a solution addition port, 150 kg of a 20% by mass MeOH solution of EVAc was charged. A temperature of the solution was raised to 60° C. while bubbling nitrogen gas thereinto, and a MeOH solution having a sodium hydroxide concentration of 2 N was added for 2 hrs at a rate of 450 mL/min. After completion of adding the MeOH sodium hydroxide solution, a saponification reaction proceeded by stirring for 2 hrs while keeping the temperature in the system at 60° C. and draining MeOH and methyl acetate generated by the saponification reaction outside the reactor. Thereafter, 8.7 kg of acetic acid was added to terminate the saponification reaction.

Thereafter, MeOH was allowed to flow outside the reactor by adding 120 L of ion exchanged water while the mixture was heated at 80° C. with stirring, whereby precipitation of the EVOH was permitted. The EVOH precipitated by decantation was collected, and ground with a grinder. The EVOH powder obtained was charged into a 1 g/L aqueous acetic acid solution (bath ratio of 20:proportion of 1 kg of the powder to 20 L of the aqueous solution), and was washed for 2 hrs with stirring. This was deliquored, and further charged into a 1 g/L aqueous acetic acid solution (bath ratio of 20), and washed for 2 hrs with stirring. An operation of charging this, having been deliquored, in ion exchanged water (bath ratio of 20) and stirring and washing for 2 hrs, and then deliquoring, was carried out three times to perform refinement. An electrical conductivity of the washing liquid was 3 μs/cm (measured with "CM-30ET," manufactured by DKK-TOA Corporation). Next, the resulting solution was immersed for 4 hrs in 250 L of an aqueous solution containing 0.5 g/L of acetic acid and 0.1 g/L of sodium acetate with stirring and then deliquored, followed by drying at 60° C. for 16 hrs to give 16.1 kg of crude dry EVOH. This operation was repeated to give 15.9 kg of crude dry EVOH, whereby a total of 32.0 kg of crude dry EVOH (EVOH-A) was obtained.

Preparation of Resin Composition

Examples 1 to 6 and Comparative Examples 1 to 3

Into a 60 L stirring tank equipped with a jacket, a stirrer, and a reflux condenser were charged 2 kg of the crude dry EVOH (EVOH-A) obtained in Synthesis Example 1, 0.8 kg of water, and 2.2 kg of MeOH, and the mixture was completely dissolved by stirring at 60° C. for 5 hrs. To the thus obtained solution was added aluminum acetate, and the aluminum acetate was completely dissolved by further stirring for 1 hour to give a resin composition solution. It is to be noted that in Comparative Example 3, the resin composition solution was obtained without adding the aluminum acetate. This solution was extruded through a die plate with a diameter of 4 mm in a mixed liquid of water/MeOH in a ratio of 90/10 cooled to −5° C. to permit deposition into a strand form, and the strand was cut into a pellet form with a strand cutter to give hydrous EVOH pellets. A moisture content of the hydrous EVOH pellets thus obtained was measured with "HR73," a halogen moisture analyzer manufactured by Mettler-Toledo International Inc., and was 52% by mass. The hydrous EVOH pellets thus obtained were charged into a 1 g/L aqueous acetic acid solution (bath ratio of 20) and washed for 2 hrs with stirring. The washed hydrous EVOH pellets were deliquored, and further charged into a 1 g/L aqueous acetic acid solution (bath ratio of 20), and washed for 2 hrs with stirring. After the deliquoring, the aqueous acetic acid solution was renewed, and the same operation was repeated. An operation in which the hydrous EVOH pellets, having been washed with the aqueous acetic acid solution and then deliquored, were charged into ion exchanged water (bath ratio of 20), washed for 2 hrs with stirring, and deliquored was carried out three times, and purification was carried out until an electrical conductivity of the washing liquid was 3 μs/cm (measured with "CM-30ET," manufactured by DKK-TOA Corporation) to give hydrous EVOH pellets in which catalyst residue generated in the saponification reaction was eliminated.

The hydrous pellets were charged into an aqueous solution (bath ratio of 20) in which a concentration of sodium acetate was 0.510 g/L, a concentration of acetic acid was 0.8 g/L, and a concentration of phosphoric acid was 0.04 g/L, and the mixture was immersed for 4 hrs with stirring at regular intervals to perform chemical treatment. The pellets were deliquored and then dried at 80° C. for 3 hrs and 105° C. for 16 hrs in a nitrogen atmosphere with an oxygen concentration of 1% by volume or less to give dried resin composition pellets having a circular cylindrical shape, an average diameter of 2.8 mm, and an average length of 3.2 mm, and containing the EVOH-A, acetic acid, a sodium ion (sodium salt), phosphoric acid, and an aluminum ion (aluminum salt). It is to be noted that in each of the Examples and the Comparative Examples, the aluminum ion content was adjusted so as to be as shown in Table 3 by regulating a content of addition of aluminum acetate. With regard to an ethylene content, degree of saponification, terminal lactone ring unit content, terminal carboxylic acid unit content, total content of the terminal carboxylic acid unit and the terminal lactone ring unit, lactone ring unit proportion, MFR, and boric acid content of the EVOH-A in the dried resin composition pellets thus obtained, dried resin composition pellets having an aluminum ion content of 0.3 ppm as a sample were used to perform quantitative determination according to the above-described methods for quantitative determination. The ethylene content, degree of saponification, terminal lactone ring unit content, terminal carboxylic acid unit content, total content of terminal carboxylic acid unit and terminal lactone ring unit, lactone ring unit proportion, MFR, and boric acid content are shown in Table 2. Furthermore, for all of the dried resin composition pellets, the sodium ion content was 90 to 110 ppm, the phosphoric acid content was 35 to 45 ppm in terms of phosphoric acid radical, and the acetic acid content was 190 to 210 ppm. Furthermore, in Table 1, the $^1$H-NMR spectrum of the EVOH-A is shown, measured under conditions involving the solvent being DMSO-$d_6$ and the measurement temperature being 25° C. In Table 2, the $^1$H-NMR spectrum of the EVOH-A is shown, measured under conditions involving the solvent being DMSO-$d_6$ and the measurement temperature being 80° C. In Table 3, the $^1$H-NMR spectrum of the EVOH-A is shown, measured under conditions involving the solvent being $D_2O$+MeOD and the measurement temperature being 80° C.

Synthesis Examples 2 to 11

10.1 to 11.5 kg of crude dry products of each EVOH (EVOH-B to EVOH-K) were obtained by a similar operation to that of Synthesis Example 1, except that amounts of addition of raw materials used in polymerization of the EVOH, polymerization conditions, charging amounts in the saponification treatment, and rates of addition of the 2 N sodium hydroxide MeOH solution were as shown in Table 1, and synthesis was conducted only one time.

Preparation of Resin Composition

Examples 7 to 27 and 34, and Comparative Examples 4 to 23

Using the crude dry products of each EVOH (EVOH-B to EVOH-K) obtained in Synthesis Examples 2 to 11, each dried resin composition pellet was obtained by a similar operation to that of Example 1, except that each component contained in the aqueous solution in the chemical treatment was as shown in Table 1. Furthermore, similar to Example 1 and the like, the aluminum ion content was adjusted so as to be as shown in Tables 3 to 12 and 14 by regulating a content of addition of aluminum acetate. With regard to various measurements as well, similar to Example 1, quantitative determination was carried out using the above-described methods for quantitative determination. The ethylene content, degree of saponification, terminal lactone ring unit content, terminal carboxylic acid unit content, total content of the terminal carboxylic acid unit and the terminal lactone ring unit, lactone ring unit proportion, MFR, and boric acid content are shown in Table 2. Furthermore, for all of the dried resin composition pellets, the sodium ion content was 90 to 110 ppm, the phosphoric acid content was 35 to 45 ppm in terms of phosphoric acid radical, and the acetic acid content was 190 to 210 ppm.

Preparation of Resin Composition

Examples 28 to 33 and Comparative Example 24

Two kg of the crude dry EVOH (EVOH-A) obtained in Synthesis Example 1, 0.8 kg of water, and 2.2 kg of MeOH were charged, and the mixture was completely dissolved by stirring at 60° C. for 5 hrs. To the thus obtained solution was added aluminum acetate, sorbic acid, or cinnamic acid, and the aluminum acetate, sorbic acid, or cinnamic acid was completely dissolved by further stirring for 1 hour to give a resin composition solution. It is to be noted that in Comparative Example 24, the resin composition solution was obtained by adding only sorbic acid, without adding aluminum acetate. Subsequent treatment was conducted similarly to Example 1 to give each dried resin composition pellet. With regard to the aluminum ion, by adjusting the amount of addition of aluminum acetate, and with regard to the content of sorbic acid or cinnamic acid, by adjusting the amount of addition of these, dried resin composition pellets were obtained being as shown in Table 13. With regard to various measurements as well, similarly to Table 1, quantitative determination was carried out using the above-described methods for quantitative determination. For all of the dried resin composition pellets, the sodium ion content was 90 to 110 ppm, the phosphoric acid content was 35 to 45 ppm in terms of phosphoric acid radical, and the acetic acid content was 190 to 210 ppm.

It is to be noted that in each of Tables 3 to 14 and the like, together with the total content (mol %) of the terminal carboxylic acid unit and the lactone ring unit with respect to the total amount of the ethylene unit, the vinyl alcohol unit, and the vinyl acetate unit in the EVOH, the total content (μmol/g) of the terminal carboxylic acid unit and the terminal lactone ring unit per gram of EVOH is shown, being a conversion of the former. Furthermore, together with the aluminum ion content (ppm) in the resin composition, the content (μmol/g) of the aluminum ion per gram of the EVOH is shown, being a conversion of the former. Moreover, a ratio ((i+ii)/b) of the total content (i+ii: μmol/g) of the terminal carboxylic acid unit and the terminal lactone unit per gram of the EVOH to the content (b: μmol/g) of the aluminum ion per gram of the EVOH is shown together.

Preparation of Two-Type EVOH-Blended Resin Composition

Examples 35 to 40

The resin compositions containing each of the EVOH-A, the EVOH-B, the EVOH-D, and/or the EVOH-G obtained in Examples 2, 8, 14, and 23 were dry-blended in a blending ratio shown in Table 15. Thereafter, the blend was extruded in a nitrogen atmosphere by using a twin-screw extruder (Toyo Seiki Seisaku-sho, Ltd., 2D25W, 25 mmφ, die temperature 220° C., screw rotation speed 100 rpm) to give resin composition pellets.

Comparative Example 25

The resin compositions containing each of the EVOH-A and the EVOH-G obtained in Comparative Examples 1 and 14 were dry-blended in a blending ratio shown in Table 15. Thereafter, the blend was extruded in a nitrogen atmosphere by using a twin-screw extruder (Toyo Seiki Seisaku-sho, Ltd., 2D25W, 25 mmφ, die temperature 220° C., screw rotation speed 100 rpm) to give resin composition pellets.

Synthesis Example 12

A modified EVOH-L was synthesized using epoxypropane and a resin composition containing the EVOH-F, which was obtained in Synthesis Example 20 described above, on TEM-35BS (37 mmφ, L/D=52.5) manufactured by Toshiba Machine Co., Ltd., by injecting epoxypropane from C9 under conditions involving the barrels C2 and C3 at 200° C., barrels C4 to C15 at 240° C., and a rotation speed of 400 rpm. The degree of modification of the resultant modified EVOH-L with respect to the total vinyl alcohol units was 8 mol %. Furthermore, the melting point of the modified EVOH-L was 106° C.

Example 41

Resin composition pellets were obtained by dry-blending 90 parts by mass of a resin composition containing the EVOH-D obtained in Example 14 described above with 10 parts by mass of the modified EVOH-L, extruding using a 30 mmφ twin-screw extruder ("TEX-30SS-30CRW-2V," manufactured by The Japan Steel Works, Ltd.) under conditions involving an extruding temperature of 200° C., a screw rotation speed of 300 rpm, and an extruded resin amount of 25 kg/hr, and then, after the pelletizing, performing hot-air drying at 80° C. for 16 hrs.

Preparation of Polyamide (D)-Blended Resin Composition

Examples 42 to 46

Resin composition pellets were obtained by dry-blending resin compositions containing each of the EVOH-A and the EVOH-D, obtained in Examples 2 and 14; a polyamide resin ("Ny1018A" (nylon 6), manufactured by Ube Industries, Ltd.); and a compound containing the metal atom (E) in the blend ratio shown in Table 16 (the content of the metal atom (E) is in terms of metal atoms), and then extruding in a nitrogen atmosphere by using a twin-screw extruder (Toyo Seiki Seisaku-sho, Ltd., 2D25W, 25 mmφ) under conditions involving a die temperature of 250° C. and a screw rotation speed of 100 rpm.

Comparative Example 26

Resin composition pellets were obtained by dry-blending a resin composition containing the EVOH-A, obtained in Comparative Example 1; a polyamide resin ("Ny1018A" (nylon 6), manufactured by Ube Industries, Ltd.); and a compound containing the metal atom (E) in the blend ratio shown in Table 16, and then extruding in a nitrogen atmosphere by using a twin-screw extruder (Toyo Seiki Seisaku-sho, Ltd., 2D25W, 25 mmφ) under conditions involving a die temperature of 250° C. and a screw rotation speed of 100 rpm.

Preparation of Thermoplastic Elastic (F)—Blended Resin Composition

Thermoplastic Elastomer (F)

The thermoplastic elastomers (F) used are as shown below.

F-1: Modic (registered trademark) GQ131 (manufactured by Mitsubishi Chemical Corporation; unsaturated carboxyclic acid-modified polyester elastomer resin)

F-2: Modic (registered trademark) GQ430 (manufactured by Mitsubishi Chemical Corporation; unsaturated carboxyclic acid-modified polyester elastomer resin)

F-3: Tuftec (registered trademark) H1041 (manufactured by Asahi Kasei Chemicals Corporation; styrene-derived elastomer resin)

F-4: Tuftec (registered trademark) M1911 (manufactured by Asahi Kasei Chemicals Corporation; carboxylic acid-containing styrene-derived elastomer resin)

F-5: TAFMER (registered trademark) MH7020 (manufactured by Mitsui Chemicals, Inc.; maleic anhydride-modified ethylene-butene copolymer)

F-6: TAFMER (registered trademark) MH0610 (manufactured by Mitsui Chemicals, Inc.; maleic anhydride-modified ethylene-propylene copolymer)

F-7: TAFMER (registered trademark) P0280 (manufactured by Mitsui Chemicals, Inc.; ethylene-propylene copolymer)

F-8: SIBSTAR (registered trademark) 062T-FD (manufactured by Kaneka Corporation; SIBS: styrene-isobutylene-styrene triblock copolymer)

Examples 47 to 52

Resin composition pellets were obtained by dry-blending resin compositions containing each of the EVOH-B, the EVOH-C, and the EVOH-D, obtained in Examples 8, 11, and 14, with the thermoplastic elastomer in the blending ratio shown in Table 17, and then extruding under the following conditions.

Extrusion Conditions

Device: 30 mmφ twin-screw extruder
L/D: 45.5
Screw: fully intermeshing co-rotation type
Extrusion temperature (° C.): 220° C.
Rotation speed: 200 rpm Discharge amount: 20 kg/hr Comparative Example 27

Resin composition pellets were obtained by dry-blending a resin composition containing the EVOH-B, obtained in Comparative Example 4, with a thermoplastic elastomer in the blending ratio shown in Table 17, and extruding under the above-described conditions.

Preparation of Antioxidant (G)—Blended Resin Composition

Examples 53 and 54, and Comparative Example 28

Resin composition pellets were obtained by dry-blending N,N'-(hexane-1,6-diyl) bis[3-(3,5-di-tert-butyl-4-hydroxyphenyl) propionamide] ("Irganox1098," manufactured by BASF Japan Ltd.; molecular weight: 637) with resin compositions containing each of the EVOH-A and the EVOH-D obtained in Examples 2 and 14, and Comparative Example 1 in the blending amount shown in Table 18, and extruding in a nitrogen atmosphere at an extrusion temperature of 220° C. by using a 30 mmφ co-rotation twin screw extruder ("TEX-30N," manufactured by The Japan Steel Works, Ltd.).

Evaluations

Monolayer Film Production Conditions

A monolayer film having a thickness of 20 μm was obtained by film forming each type of the resin composition pellets obtained in Examples 1 to 54 and Comparative Examples 1 to 28 under the following conditions.

Device: 20 mmφ single-screw extruder (D2020, manufactured by Toyo Seiki Seisaku-sho, Ltd.)
L/D: 20
Screw: full flight
Die width: 30 cm
Temperature of drawing roll: 80° C.
Screw rotation speed: 40 rpm
Speed of roll drawing: 3.0 to 3.5 m/min Examples 1 to 41 and 47 to 54, and Comparative Examples 1 to 25 and 27 to 28

Preset temperatures: C1/C2/C3/D=180° C./210° C./210° C./210° C.

Examples 42 to 46 and Comparative Example 26

Preset temperatures: C1/C2/C3/D=200° C./230° C./230° C./230° C.

Aggregate Generation Inhibition (Aggregates)

50 hrs after the start of the operation, the number of gelatinous aggregates (those being 150 m or more, which are able to be confirmed visually) of the monolayer film was counted, and converted to the number per 1.0 $m^2$. The number of aggregates per 1.0 $m^2$ was evaluated as follows. The evaluation results are shown in Tables 3 to 18. It is to be noted that in Tables 19 to 22, the evaluation results of some of the resin composition pellets of Examples 1 to 54 and Comparative Examples 1 to 28, which were used as the molding materials, are reshown.

A: Less than 20
B: 20 or more and less than 40
C: 40 or more and less than 100
D: 100 or more In a case in which the evaluation result is A or B, the generation of aggregates is sufficiently inhibited, and the level is such that problems do not occur. Also in a case in which the evaluation result is C, the generation of aggregates is inhibited, and the level is such that depending on the intended usage and the like, the aggregates may become a problem, but the monolayer film can be used. In a case in which the evaluation result is D, there is a large amount of aggregates, and the level is such that the monolayer film cannot be used.

Heat/Light Resistance Test

The obtained monolayer film was cut to a size of 150 mm in a TD direction and 70 mm in an MD direction and adhered to a sheet made of PTFE being the same size and having a thickness of 0.3 mm, and was set in a sample holder having an opening with a width of 135 mm and a height of 55 mm. Using Suga Xenon Weather Meter SX75, manufactured by Suga Test Instruments Co., Ltd., irradiation with an ultraviolet ray was continuously performed for 48 hrs under conditions involving irradiance of 150 $W/m^2$, a black panel temperature of 83° C., and an internal vessel humidity of 50% RH. After the irradiation, an unirradiated part of the film perimeter was cut away to give a heat/light resistance test film sample with a width of 135 mm and a height of 55 mm.

Elongation at Break

First, using a razor blade, a 15 mm slit was put into the film sample in which the obtained monolayer film was cut to the size of 150 mm in the TD direction and 70 mm in the MD direction, and then the film sample was irradiated with an ultraviolet ray as in the heat/light resistance test. The sample after the ultraviolet ray irradiation was cut to a width of 15 mm and a length of 50 mm to produce a sample for a tensile test, and the sample was seasoned for 5 days at a temperature of 23° C. and a humidity of 50% RH. Using a tensile tester ("AUTOGRAPH AGS-H," produced by Shimadzu Corporation), the sample after the seasoning was subjected to a tensile test in the MD direction with a distance of 30 mm between chucks at a tensile speed of 500 mm/min at N=5, and elongation at break was measured (evaluation after heat/light resistance test). Furthermore, with regard also to the film samples not subjected to the ultraviolet ray irradiation, the elongation at break was measured by a similar operation (evaluation before heat/light resistance test). A reduction percentage (%) of the elongation at break after the heat/light resistance test with respect to the elongation at break before the heat/light resistance test was calculated. These evaluation results are shown in Tables 3 to 18. It is to be noted that in Tables 19 to 22, the evaluation results of some of the resin composition pellets of Examples 1 to 54 and Comparative Examples 1 to 28, which were used as the molding materials, are reshown. It was confirmed that as the reduction percentage of the elongation at break becomes lower, the heat/light resistance is more superior.

Mass Loss: Microplastic-Promoting Test

Four film samples after the heat/light resistance test processing were prepared, and were dried in vacuo at 60° C. for 24 hrs, and then a total dry mass (W1) of the four film samples before a grinding treatment, described later, was measured. The four film samples after the heat/light resistance test were measured into an alumina ceramic pot mill with a volume of 300 mL, and then 500 g of zirconia balls with a diameter of 3 mm and 100 mL of deionized water were charged thereinto. The sealed pot mill was set on "PM-001," a desktop-type pot mill pedestal manufactured by AS ONE Corporation, the pot mill was operated at a rotation speed of 200 rpm, and the grinding treatment was performed at room temperature for 4 hrs. Contents of the pot mill which had been subjected to the pulverization treatment were removed together with water, and an operation in which deionized water was added thereto and decantation was performed with stirring was repeated to separate the zirconia balls from the ground matter and water. The contents from which the zirconia balls were removed were subjected to low-pressure filtration with a nylon mesh having a mesh opening size of 46 μm, and the filtrate was dried in vacuo at 60° C. The mass (W2) of the ground matter of 46 μm or more which remained after the filtration through the nylon mesh was measured, and the mass loss (M) was calculated in accordance with the following formula (i) (evaluation after heat/light resistance test).

$$M\ (\%)=(W1-W2)/W1\times 100 \quad (i)$$

Furthermore, with regard also to the film samples not subjected to the ultraviolet ray irradiation test, the mass loss was measured by a similar operation (evaluation before heat/light resistance test). These evaluation results are shown in Tables 3 to 18. It is to be noted that in Tables 19 to 22, the evaluation results of some of the resin composition pellets of Examples 1 to 54 and Comparative Examples 1 to 28, which were used as the molding materials, are reshown.

The values of the mass loss in the evaluation after the heat/light test were defined as an indicator of breaking down into microplastic, and as the value becomes lower, breaking down into microplastic can be inhibited.

Thermoformability Evaluation Test

Production of Multilayer Sheet for Thermoforming

By using a layer constituted from the dried resin composition pellets (resin composition) obtained from each of Examples 35 to 41 and Comparative Example 25 as a gas barrier layer, a layer constituted from "Novatec (registered trademark) PP EA7AD" polypropylene (PP dissolvability parameter=8.0) as a thermoplastic resin layer, and "Admer (registered trademark) QF500" adhesive polyolefin as an adhesive layer, a multilayer structure of 5 layers involving 3 types (PP/Ad1/EVOH (resin composition)/Ad1/PP=368 μm/16 μm/32 μm/16 μm/368 μm) was obtained under the following conditions. It is to be noted that as a film forming apparatus, after an extruder having a film forming die, the multilayer sheet (multilayer body) obtained was wound by a winding machine having a drawing roll which can control temperature.

Film Forming Conditions

- EVOH Extruder: single-screw extruder (ME-type CO-EXT extruder for laboratory use, manufactured by Toyo Seiki Seisaku Co., Ltd.)
- Port diameter of 20 mmφ, L/D=20, screw being full flight type
- Supply unit/compression unit/metering unit/die=175/210/220/230° C.
- PP Extruder: single-screw extruder (GT-32-A, manufactured by Research Laboratory of Plastics Technology Co., Ltd.)
- Port diameter of 32 mmφ, L/D=28, screw being full flight type
- Supply unit/compression unit/metering unit/die=170/200/210/230° C.
- Ad1 Extruder: single-screw extruder (SZW20GT-20MG-STD, manufactured by Technovel Corporation)
- Port diameter of 20 mmφ, L/D=20, screw being full flight type
- Supply unit/compression unit/metering unit/die=150/200/220/220° C.
- Die: 300 mm width coat hanger die (manufactured by Research Laboratory of Plastics Technology Co., Ltd.)
- Temperature of drawing roll: 80° C.

Production and Evaluation of Thermoformed Container

The multilayer sheet obtained was subjected to thermoforming (compressed air: 5 kg/cm$^2$; plug: 45φ×65 mm; syntax form; die temperature: 40° C.) into a cup shape (die shape: 70 φ×70 mm; draw ratio S=1.0) using a thermoforming machine (manufactured by Asano Laboratories Co. Ltd.) at a temperature of the multilayer sheet of 150° C. to produce a thermoformed container. A bottom of the container produced was evaluated in accordance with the following criteria by visual inspection. It is to be noted that with regard to standard D, the appearance is poor, and it is difficult to apply the thermoformed container to a packaging purpose. The evaluation results are shown in Table 15.

A: Uniform, with no unevenness observed
B: Streaky unevenness was slightly observed
C: Streaky unevenness was somewhat observed
D: Unevenness was severely observed Retorting Resistance Evaluation Test Production of Multilayer Sheet for Retorting The monolayer film with the thickness of 20 μm of each of Examples 42 to 46 and Comparative Example 26, obtained as described above, a commercially available biaxially stretched nylon 6 film (Emblem ON; manufactured by Unitika Limited; thickness: 15 μm), and a commercially available unstretched polypropylene film (Tohcello CP; manufactured by Mitsui Chemicals Tohcello Inc.; thickness: 60 μm) were each cut into an A4 size piece. 4.0 g/m of an adhesive for dry lamination ("TAKELAC A-385" (manufactured by Takeda Chemical Industries, Ltd.) as a base material, "TAKENATE A-50" (manufactured by Takeda Chemical Industries, Ltd.) as a curing agent, and ethyl acetate as the dilution liquid) was applied to both faces of the single-layer film, and then dry lamination was carried out such that the nylon 6 film was provided as an outer layer and the unstretched polypropylene film was provided as an inner layer. The laminated film thus obtained was dried at 80° C. for 3 min, whereby a dilution liquid was evaporated. After the lamination, aging was carried out at 40° C. for 3 days to give a transparent multilayer sheet having three layers.

OTR (Oxygen Transmission Rate)

The monolayer film of each of Examples 42 to 46 and Comparative Example 26 obtained as described above was conditioned under a condition of 20° C./65% RH, and then an oxygen transmission rate was measured by using an oxygen transmission rate measurement device ("OX-Tran2/20," manufactured by Modem Controls. Inc.), under a condition of 20° C./65% RH. It is to be noted that this measurement was performed in accordance with ISO14663-2 annex C. The measurement results are shown in Table 16.

Retorting Resistance Evaluation

Using the multilayer sheet obtained, a pouch was produced in which the four corners were sealed such that the inner dimensions were 12×12 cm. Water was used as the content. This was subjected to a retorting process at 120° C. for 2 min by using a retorting device (RCS-40RTGN, a high-temperature and high-pressure cooking sterilization tester manufactured by Hisaka Works, Ltd.). After the retorting process, surface water was wiped away and the pouch was left to stand for 1 day in a high-temperature, high-humidity room at 20° C./65% RH, and then the retorting resistance was evaluated in accordance with the following criteria. The evaluation results are shown in Table 16.

Evaluation Criteria of Retorting Resistance

A (favorable): Transparency was secured

B (unfavorable): There was whitening in some spots

Flex Resistance Evaluation Test

In accordance with ASTM-F392-74, bending of the monolayer film with the thickness of 20 μm of Examples 47 to 52 and Comparative Example 27, obtained as described above, was repeated 100 times using "BE1006 Gelvo-type Flex-Cracking Tester with Chamber," manufactured by Tester Sangyo Co Ltd., in an environment of 5° C. The number of pinholes after bending was counted in a range of A4 size (210 mm×297 mm). The counting was performed for three samples each, and an average value was determined. It was evaluated that as the number of pinholes after bending becomes lower, the flexibility (flex resistance) is more superior. The counting results (number of pinholes) are shown in Table 17.

TEM Observation

The resin composition pellets obtained from each of Examples 47 to 52 and Comparative Example 27 were embedded in epoxy resin, and a slice in a lateral direction was produced with an ultra microtome. The lateral slices thus obtained were brought into contact with a 5% phosphotungstic acid solution for 5 min and dried, and then observed at an observation magnification of 5,000 times using "JEM2100," a transmission electron microscope (TEM) manufactured by JEOL, Ltd. Based on a TEM image, an item having a phase separation structured, described above, with a sea phase and island phases, wherein an observed particle diameter was 0.05 μm or more was defined as a sea-island structure, and an item having an observed particle diameter of less than 0.05 μm was defined as a finely dispersed structure. It is to be noted that the "sea-island structure" in the Examples as referred to herein means a structure having a phase separation structure, described above, wherein the EVOH (A) is contained in the sea phase and the thermoplastic elastomer (F) is contained in the island phases. With regard to the "finely dispersed" items, presence of further phases was not confirmed in the dispersed phases. The evaluation results are shown in Table 17.

Oxidative Degradation Resistance Evaluation Test

Production of Monolayer Film for Oxidative Degradation Resistance Evaluation

Monolayer films were obtained by using the dry resin composition pellets (resin composition) obtained from each of Examples 53 and 54 and Comparative Example 28 to perform monolayer film forming with "D2020" (D (mm) =20, L/D=20, compression ratio=2.0, screw: full flight), a 20 mm extruder manufactured by Toyo Seiki Seisaku-sho, Ltd., under the following conditions.

Extrusion temperature: supply unit: 175° C.
compression unit: 210° C.
metering unit: 220° C.
die: 220° C.

Screw rotation speed: 90 rpm

Discharge amount: 2.1 kg/hr

Temperature of drawing roll: 80° C.

Speed of roll drawing: 0.9 m/min

Film thickness: 100 μm

Oxidative Degradation Resistance Evaluation

The monolayer film thus obtained was evaluated on change of tensile strength over time by measuring, under the following evaluation conditions, a plurality of samples in which heat treatment time periods were changed. The time period for the elongation at break to become ¼ of the sample in which heat treatment is not performed was determined and set as an indicator for oxidative degradation resistance. The evaluation results are shown in Table 18.

Evaluation Conditions:

The monolayer film was treated in a hot-air dryer for a predetermined time period and set to 140° C., and then removed. After that, the monolayer film was immersed in 20° C. water for 5 days, surface water was wiped away, the monolayer film was left to stand in a room at 20° C. and 65% RH for 2 weeks, and then the tensile strength was measured in accordance with the following conditions.

Measurement Conditions

Sample width: 15 mm

Interval between chucks: 30 mm

Tensile speed: 50 mm/min

Measurement atmosphere: 20° C., 65% RH

In the above evaluation, deterioration of the gas barrier properties of the EVOH layer owing to the generation of cracks due to oxidative deterioration becomes significant when the elongation at break becomes ¼ or lower; thus, the time period for the elongation at break to become ¼ can be considered as an indicator of lifespan due to oxidative degradation of the EVOH at a high temperature. The time period for the elongation at break to become ¼ shows an Arrhenius-type temperature dependency, and if the time period (lifespan) until the elongation at break becomes ¼ at 80° C. is assumed as 100 years or more, the time period until the elongation at break becomes ¼ at 140° C. must be set to 210 hrs or more.

Production of Thermoformed Container

Examples 55 to 57 and Comparative Example 29

A multilayer sheet (multilayer body) and a thermoformed container were obtained by a similar operation to the thermoformability evaluation test, described above, except that a layer constituted from the resin compositions containing each of the EVOH-A, the EVOH-F, and the EVOH-G, obtained in Examples 2, 20, and 23 and Comparative Example 1 was used as the gas barrier. The thermoformed container obtained was evaluated on the appearance of the bottom of the thermoformed container by an operation similar to that described above. The evaluation results are shown in Table 19.

Production of Blow-Molded Container

Examples 58 to 60 and Comparative Example 30

Preparation of Recovered Resin

Four parts by mass of the EVOH resin composition pellets (resin composition) of each of Examples 2, 14, and 17, and Comparative Example 1, 86 parts by mass of a high density polyethylene resin ("HZ8200B," manufactured by from Mitsui Petrochemical Industries, Inc., melt flow rate (MFR) =0.01 g/10 min at/under 190° C.-2, 160 g, solubility parameter=8.5), and 10 parts by mass of an adhesive resin ("ADMER GT-6A," manufactured by Mitsui Chemicals, Inc., MFR=0.94 g/10 min at load of 190° C.-2, 160 g) were dry blended, and thereafter extruded by using a twin-screw extruder ("2D25W" available from Toyo Seiki Seisaku-sho, Ltd.; 25 mmφ, die temperature: 220° C., screw rotation speed: 100 rpm) in a nitrogen atmosphere, whereby pellets were obtained. In order to obtain a model recovered resin, the extrusion pellets thus obtained were further subjected to extrusion with the same extruder under the same conditions to conduct pelletization. This operation was performed four times (blending in the extruder was repeated five times in total) to obtain a model recovered resin.

Production of Blow-Molded Container

Each dry resin composition pellet (resin composition) obtained in Examples 2, 14, and 17, and Comparative Example 1, the high-density polyethylene resin, the adhesive resin, and the model recovered resin were used to produce a blow-molded container of 6 layers involving 4 types, i.e., high-density polyethylene/adhesive resin/EVOH (resin composition)/adhesive resin/recovered resin/high-density polyethylene, from the inside to the outside, with "TB-ST-6P," a blow-molding apparatus manufactured by Suzuki Seiko Co., Ltd. at 210° C., and evaluation was performed. It is to be noted that in the production of the blow-molded container, cooling at an internal temperature of the die of 15° C. for 20 sec gave a 3 L tank having a total thickness of 1,000 μm (high-density polyethylene/adhesive resin/EVOH (resin composition)/adhesive resin/recovered resin/high-density polyethylene, from the inside to the outside=340/50/40/50/400/120 μm, from the inside to the outside). The tank had a bottom face diameter of 100 mm, and a height of 400 mm.

Appearance Evaluation of Blow-Molded Container

With regard to the 3 L tank thus obtained, the presence of streaks and coloring was confirmed by visual inspection, and the 3 L tank was evaluated in accordance with the following criteria. The evaluation results are shown in Table 20.

Evaluation Criteria of Streaks

A (favorable): no streak recognized
B (somewhat favorable): streak(s) found
C (unfavorable): a large number of streak(s) found Evaluation Criteria of Coloring A (favorable): no coloring
B (somewhat favorable): yellowing
C (unfavorable): significant yellowing Impact Resistance Evaluation of Blow-Molded Container The blow-molded 3 L tank was packed with 2.5 L of propylene glycol, and the opening was shut with a lid by heat sealing of a film with a constitution of polyethylene 40 μm/aluminum foil 12 μm/polyethylene terephthalate 12 μm. This tank was cooled at −40° C. for 3 days, and then dropped from a height of 6 m such that the opening was up. The impact resistance was evaluated by the number of tanks which broke (n=10). The evaluation results are shown in Table 20.

Evaluation Criteria of Impact Resistance

A (favorable): less than 3
B (somewhat favorable): 3 to less than 6
C (unfavorable): 6 or more

Production of Film

Examples 61 to 64 and Comparative Example 31

Dry blending was performed with a tumbler such that with respect to 100 parts by mass of the dry resin composition pellets (resin composition) obtained from each of Examples 2, 8, 11, and 14, and Comparative Example 1, there were 2.9 ppm of acetone, and 0.03 parts by mass (300 ppm) of synthetic silica ("SYLYSIA 310P," manufactured by FUJI SILYSIA CHEMICAL LTD.; average particle diameter of 2.7 μm as measured by laser method) as the inorganic particle (H), melting was carried out at 240° C., and concurrently with extrusion on casting rolls from a die, the air was blown at a rate of 30 m/sec by using an air knife to obtain an unstretched film having an average thickness of 170 μm. The unstretched film thus obtained was brought into contact with hot water at 80° C. for 10 sec, and by using a tenter-type simultaneous biaxial stretching machine, the film was stretched 3.2 times in the machine direction and 3.0 times in the width direction in an atmosphere of 90° C. Furthermore, the stretched film was subjected to a heat treatment in the tenter at 170° C. for 5 sec. Then the film edge was cut away to obtain 100 rolls of a biaxially stretched film (thickness of 12 μm, width of 50 cm, roll length of 4,000 m).

Breakage Resistance Evaluation

The biaxially stretched film obtained as above was applied to a slitter, and wound while imparting a tension of 100 N/m to the film roll. The number of times of breakage was then evaluated in accordance with the following criteria. The evaluation results are shown in Table 21.

Evaluation Criteria

A: 0 to once/100 rolls
B: 2 to 4 times/100 rolls
C: 5 to 7 times/100 rolls
D: 8 to 10 times/100 rolls
E: 11 or more times/100 rolls Production of Vapor Deposition Film A laminate (vapor deposition film) was obtained by using batch-type vapor deposition equipment "EWA-105," manufactured by ULVAC, Inc., on the biaxially stretched film obtained in the film evaluation test to allow vapor deposition of the aluminum on one side of the film, at a travelling speed of the film of 200 m/min.

Measurement of Thickness of Inorganic Vapor Deposition Layer

The laminate thus obtained was cut with a microtome to expose a cross section. This cross section was observed using "ZEISS ULTRA 55," a scanning electron microscope (SEM) manufactured by SII Nano Technology, and the thickness of the vapor deposition layer was measured by using a backscattered electron detector. The measurement results are shown in Table 21.

Vapor Deposition Flaw-Inhibiting Property

The vapor deposition flaw-inhibiting property of the laminate thus obtained was evaluated by counting the number of vapor deposition flaws. The first roll of the laminate obtained was applied to a slitter, and was unwound while illuminating with fluorescent light at 100 W from beneath the film. The number of vapor deposition flaws was counted at 10 different sites, each with an area having a width of 0.5 m and a length of 2 m, and the average value of the number of vapor deposition flaws per $m^2$ was determined. Based on the number of vapor deposition flaws, the vapor deposition flaw-inhibiting property was evaluated in accordance with the following criteria. The evaluation results are shown in Table 21.

Evaluation Criteria

A: 0 to 20 flaws/$m^2$
B: 21 to 40 flaws/$m^2$
C: 41 to 60 flaws/$m^2$
D: 61 to 80 flaws/$m^2$
E: 81 to 100 flaws/$m^2$
F: 101 or more flaws/$m^2$ Adhesion Strength On a surface of the inorganic vapor deposition layer side of the laminate obtained as above, an adhesive for dry lamination ("TAKELAC A-385/A-50," manufactured by Mitsui Chemicals, Inc., a solution in ethyl acetate prepared by mixing in a mass ratio of 6/1 to give a solid content concentration of 23% by mass) was coated by using a bar coater, and after hot-air drying at 50° C. for 5 min, lamination with a PET film ("E5000" available from Toyobo Co., Ltd.) was carried out with nip rolls heated to 80° C. In this step, a half of the film was provided with a part that failed to be laminated, by sandwiching an aluminum foil between the inorganic vapor deposition layer and the PET film. Thereafter, a laminated film was obtained after aging at 40° C. for 72 hrs. The laminated film thus obtained was cut away into a short strip of 100 mm×15 mm with the boundary with the aluminum vapor deposition being centered. Then, of the short strip thus obtained, an end of the laminate and the PET film in the part that failed to be laminated was gripped, and a T-peel test was carried out five times by a tensile tester ("AUTOGRAPH AGS-H," manufactured by Shimadzu Corporation) at a tensile rate of 10 mm/min. An average value of the resulting measurement values was defined as the adhesion strength, and an evaluation was performed in accordance with the following criteria. The evaluation results are shown in Table 21.

Evaluation Criteria

A: 500 g/15 mm or more
B: 450 g/15 mm or more and less than 500 g/15 mm
C: 400 g/15 mm or more and less than 450 g/15 mm
D: 350 g/15 mm or more and less than 400 g/15 mm
E: less than 350 g/15 mm

Production of Plant Medium

Examples 65 and 66, and Comparative Example 32

A planter having a drain hole at a height of 1 cm from the bottom (upper width 28.5 cm×upper length 46.5 cm×depth 26 cm; volume 28 L) was used. The water-absorbing sheet "Germ guard" (from Toyobo STC Co., Ltd) cut to a size larger than the mounting face of a rack was placed in the planter such that the sheet was laid over the rack, with an excess portion folded over the bottom. Further, a root-proof water-permeable sheet (manufactured by Toyobo STC Co., Ltd) was laid thereon on an interior side of the planter, and then the planter was filled to a depth of 20 cm with the dry resin composition pellets (resin composition) obtained in each of Examples 2 and 11 and Comparative Example 1, whereby a plant medium was obtained.

Number of Enlarged Roots

On Apr. 17, 2019, in a greenhouse, 15 holes were made at an interval of 7 cm width and 8 cm length in the plant medium thus obtained, and three Japanese radish "Tanshin" seeds were directly sown per hole. Thinning was performed on Apr. 27, 2019. For irrigation, a nutrient solution of a mixed solution of the fertilizers for hydroponics "Otsuka House No. 1", "Otsuka House No. 2", and "Otsuka House No. 5" from Otsuka AgriTechnno Co., Ltd. (N: 98.7 ppm, P: 19.4 ppm, K: 125.7 ppm, Ca: 63.0 ppm, Mg: 13.4 ppm, Mn: 0.709 ppm, B: 0.487 ppm, Fe: 2.025 ppm, Cu: 0.018 ppm, Zn: 0.048 ppm, Mo: 0.019 ppm) was supplied using the "Tonbo Watering Can No. 4" (manufactured by Shinkigousei Co., Ltd.), about 3 to 6 times a day, depending on the weather and the growth condition. A harvest survey was performed on Jun. 25, 2019. In the harvest survey, the number of radishes having 1 g or more of enlarged roots, relative to the 15 holes in which they were grown, was counted, and the result was used for evaluating the number of enlarged roots. The measurement results are shown in Table 22.

Fine Powder-Inhibiting Property

At the time of evaluating the number of enlarged roots, the resin was removed from the planter after the cultivation test, and a fine powder generated from the pellets remaining on the root-proof water-permeable sheet was visually confirmed. Based on the amount of the fine powder generated, the fine powder-inhibiting property was evaluated in accordance with the following criteria. The evaluation results are shown in Table 22.

A: almost no fine powder recognized on the sheet
B: some fine powder recognized on the sheet
C: an extremely large amount of fine powder recognized on the sheet

TABLE 1

| | Synthesis Example 1 | Synthesis Example 2 | Synthesis Example 3 | Synthesis Example 4 | Synthesis Example 5 | Synthesis Example 6 |
|---|---|---|---|---|---|---|
| EVOH | EVOH-A | EVOH-B | EVOH-C | EVOH-D | EVOH-E | EVOH-F |
| Pressurized reactor | 200 L | 100 L | 100 L | 100 L | 100 L | 100 L |
| Vac | 75.0 kg | 40.0 kg | 40.0 kg | 40.0 kg | 40.0 kg | 40.0 kg |
| MeOH | 7.2 kg | 12.3 kg | 7.5 kg | 17.4 kg | 9.8 kg | 1.9 kg |
| Ethylene pressure | 4.13 Mpa | 3.67 MPa | 3.28 MPa | 2.87 MPa | 2.80 MPa | 5.84 MPa |
| Polymerization initiator | initiator 1 | initiator 1 | initiator 1 | initiator 1 | initiator 1 | initiator 1 |
| Polymerization initiator amount | 9.4 g | 6.4 g | 9.4 g | 13.2 g | 8.8 g | 9.2 g |
| Temperature inside reactor | 65° C. | 65° C. | 60° C. | 60° C. | 60° C. | 65° C. |
| Reaction time period | 4 hrs | 3 hrs | 4 hrs | 3 hrs | 4 hrs | 4 hrs |
| VAc conversion percentage | 49.7% | 45.2% | 50.1% | 44.9% | 49.8% | 55.2% |
| Saponification charging amount | 150 kg | 100 kg | 100 kg | 100 kg | 100 kg | 100 kg |
| Rate of addition of NaOH MeOH solution | 450 mL/min | 300 mL/min | 300 mL/min | 300 mL/min | 300 mL/min | 300 mL/min |

| | Synthesis Example 7 | Synthesis Example 8 | Synthesis Example 9 | Synthesis Example 10 | Synthesis Example 11 |
|---|---|---|---|---|---|
| EVOH | EVOH-G | EVOH-H | EVOH-I | EVOH-J | EVOH-K |
| Pressurized reactor | 100 L | 100 L | 100 L | 100 L | 100 L |
| Vac | 40.0 kg | 40.0 kg | 197 kg | 38.0 kg | 40.0 kg |
| MeOH | 6.8 kg | 2.0 kg | 106 kg | 4.2 kg | 12.5 kg |
| Ethylene pressure | 5.97 MPa | 6.83 MPa | 3.08 MPa | 7.92 MPa | 3.66 MPa |
| Polymerization initiator | initiator 1 | initiator 1 | initiator 2 | initiator 3 | initiator 1 |
| Polymerization initiator amount | 23.2 g | 36.0 g | 400 g | 18.9 g | 14.8 g |
| Temperature inside reactor | 60° C. | 60° C. | 30° C. | 120° C. | 65° C. |
| Reaction time period | 4 hrs | 4 hrs | 4 hrs | 4 hrs | 3 hrs |
| VAc conversion percentage | 54.7% | 59.4% | 9.0% | 64.0% | 59.7% |
| Saponification charging amount | 100 kg | 100 kg | 100 kg | 100 kg | 100 kg |
| Rate of addition of NaOH MeOH | 300 mL/min | 300 mL/min | 300 mL/min | 300 mL/min | 300 mL/min |

TABLE 1-continued

| |
|---|
| solution |

initiator 1: 2,2'-azobis(2,4-dimethylvaleronitrile) ("V-65," manufactured by FUJIFILM Wako Pure Chemical Corporation)
initiator 2: dicyclohexyl peroxydicarbonate
initiator 3: 2,2'azobis(N-butyl-2-methylpropionamide)

TABLE 2

| | Ethylene unit content (mol %) | Degree of saponification (mol %) | Terminal lactone ring unit content (mol %) | Terminal carboxylic acid unit content (mol %) | Total content of terminal carboxylic acid unit and terminal lactone ring unit (mol %) | Lactone ring unit proportion (%) | MFR [g/10 min, 210° C.] | Boric acid content [ppm] | Melting point (° C.) |
|---|---|---|---|---|---|---|---|---|---|
| EVOH-A | 32.12 | 99.78 | 0.09 | 0.07 | 0.16 | 56 | 3.8 | 0 | 183 |
| EVOH-B | 31.87 | 99.85 | 0.11 | 0.08 | 0.19 | 58 | 3.7 | 800 | 183 |
| EVOH-C | 27.32 | 99.99 | 0.09 | 0.06 | 0.15 | 60 | 3.2 | 0 | 190 |
| EVOH-D | 27.24 | 99.98 | 0.12 | 0.06 | 0.18 | 67 | 4.0 | 800 | 190 |
| EVOH-E | 24.16 | 99.99 | 0.09 | 0.05 | 0.14 | 64 | 2.2 | 0 | 195 |
| EVOH-F | 44.28 | 99.89 | 0.09 | 0.10 | 0.19 | 47 | 13 | 0 | 165 |
| EVOH-G | 47.88 | 99.99 | 0.10 | 0.10 | 0.20 | 50 | 6.5 | 800 | 157 |
| EVOH-H | 52.14 | 99.99 | 0.12 | 0.18 | 0.30 | 40 | 2.2 | 1,800 | 152 |
| EVOH-I | 24.33 | 99.97 | 0.04 | 0.01 | 0.05 | 80 | 1.1 | 0 | 195 |
| EVOH-J | 50.04 | 99.98 | 0.10 | 0.40 | 0.50 | 20 | 1.8 | 2,600 | 155 |
| EVOH-K | 31.18 | 99.49 | 0.07 | 0.14 | 0.21 | 33 | 12 | 0 | 184 |

TABLE 3

| | | Et. Cont | Total content (i + ii) of terminal carboxylic acid unit + terminal lactone ring unit | | Aluminum ion content (b) | | Ratio ((i + ii)/b) | Evaluation before heat/light resistance test: aggregates | | Evaluation before heat/light resistance test: elongation at break |
|---|---|---|---|---|---|---|---|---|---|---|
| | | mol % | mol % | μmol/g | ppm | μmol/g | | — | improvement | % |
| Example 1 | EVOH-A | 32 | 0.16 | 29.2 | 0.07 | 0.003 | 9,733 | A | + | 329 |
| Example 2 | EVOH-A | 32 | 0.16 | 29.2 | 0.3 | 0.011 | 2,655 | A | + | 328 |
| Example 3 | EVOH-A | 32 | 0.16 | 29.2 | 0.5 | 0.019 | 1,537 | A | + | 328 |
| Example 4 | EVOH-A | 32 | 0.16 | 29.2 | 1 | 0.037 | 789 | B | + | 328 |
| Example 5 | EVOH-A | 32 | 0.16 | 29.2 | 2 | 0.074 | 395 | B | + | 327 |
| Example 6 | EVOH-A | 32 | 0.16 | 29.2 | 3 | 0.111 | 263 | B | + | 327 |
| Comparative Example 1 | EVOH-A | 32 | 0.16 | 29.2 | 0.02 | 0.001 | 29,200 | C | | 326 |
| Comparative Example 2 | EVOH-A | 32 | 0.16 | 29.2 | 5 | 0.185 | 158 | D | – | 328 |
| Comparative Example 3 | EVOH-A | 32 | 0.16 | 29.2 | — | — | — | D | – | 327 |

| | | Evaluation before heat/light resistance test mass loss | Evaluation after heat/light resistance test: elongation at break | elongation at break reduction percentage | | mass loss | |
|---|---|---|---|---|---|---|---|
| | | % by mass | % | % | improvement | % by mass | improvement |
| Example 1 | EVOH-A | 0.3 | 210 | 36.2 | + | 10.3 | + |
| Example 2 | EVOH-A | 0.2 | 226 | 31.2 | + | 7.8 | + |
| Example 3 | EVOH-A | 0.2 | 235 | 28.4 | + | 5.4 | + |
| Example 4 | EVOH-A | 0.3 | 230 | 29.9 | + | 6.6 | + |
| Example 5 | EVOH-A | 0.2 | 228 | 30.2 | + | 7.6 | + |
| Example 6 | EVOH-A | 0.3 | 232 | 28.9 | + | 6.8 | + |
| Comparative Example 1 | EVOH-A | 0.3 | 205 | 37.1 | | 12.2 | |
| Comparative Example 2 | EVOH-A | 0.3 | 236 | 28.2 | + | 7.2 | + |
| Comparative Example 3 | EVOH-A | 0.3 | 201 | 38.5 | – | 13.4 | – |

TABLE 4

| | | Et. Cont | Total content (i + ii) of terminal carboxylic acid unit + terminal lactone ring unit | | Aluminum ion content (b) | | Ratio ((i + ii)/b) | Evaluation before heat/light resistance test: aggregates | | Evaluation before heat/light resistance test: elongation at break |
|---|---|---|---|---|---|---|---|---|---|---|
| | | mol % | mol % | μmol/g | ppm | μmol/g | | — | improvement | % |
| Example 7 | EVOH-B | 32 | 0.19 | 34.6 | 0.07 | 0.003 | 11,533 | A | + | 358 |
| Example 8 | EVOH-B | 32 | 0.19 | 34.6 | 0.3 | 0.011 | 3,145 | A | + | 358 |
| Example 9 | EVOH-B | 32 | 0.19 | 34.6 | 2 | 0.074 | 468 | B | + | 359 |
| Comparative Example 4 | EVOH-B | 32 | 0.19 | 34.6 | 0.02 | 0.001 | 34,600 | C | | 358 |
| Comparative Example 5 | EVOH-B | 32 | 0.19 | 34.6 | 5 | 0.185 | 187 | D | − | 358 |

| | | Evaluation before heat/light resistance test: mass loss | Evaluation after heat/light resistance test: elongation at break | elongation at break reduction percentage | | mass loss | |
|---|---|---|---|---|---|---|---|
| | | % by mass | % | % | improvement | % by mass | improvement |
| Example 7 | EVOH-B | 0.3 | 216 | 39.8 | + | 7.1 | + |
| Example 8 | EVOH-B | 0.3 | 223 | 37.7 | + | 4.2 | + |
| Example 9 | EVOH-B | 0.2 | 222 | 38.2 | + | 4.8 | + |
| Comparative Example 4 | EVOH-B | 0.2 | 210 | 41.4 | | 7.8 | |
| Comparative Example 5 | EVOH-B | 0.2 | 231 | 35.6 | + | 4.7 | + |

TABLE 5

| | | Et. Cont | Total content (i + ii) of terminal carboxylic acid unit + terminal lactone ring unit | | Aluminum ion content (b) | | Ratio ((i + ii)/b) | Evaluation before heat/light resistance test: aggregates | | Evaluation before heat/light resistance test: elongation at break |
|---|---|---|---|---|---|---|---|---|---|---|
| | | mol % | mol % | μmol/g | ppm | μmol/g | | — | improvement | % |
| Example 10 | EVOH-C | 27 | 0.15 | 26.9 | 0.07 | 0.003 | 8,967 | A | + | 287 |
| Example 11 | EVOH-C | 27 | 0.15 | 26.9 | 0.3 | 0.011 | 2,445 | A | + | 287 |
| Example 12 | EVOH-C | 27 | 0.15 | 26.9 | 2 | 0.074 | 364 | B | + | 286 |
| Comparative Example 6 | EVOH-C | 27 | 0.15 | 26.9 | 0.02 | 0.001 | 26,900 | C | | 287 |
| Comparative Example 7 | EVOH-C | 27 | 0.15 | 26.9 | 5 | 0.185 | 145 | D | − | 286 |

| | | Evaluation before heat/light resistance test: mass loss | Evaluation after heat/light resistance test: elongation at break | elongation at break reduction percentage | | mass loss | |
|---|---|---|---|---|---|---|---|
| | | % by mass | % | % | improvement | % by mass | improvement |
| Example 10 | EVOH-C | 0.2 | 170 | 40.8 | + | 13.4 | + |
| Example 11 | EVOH-C | 0.2 | 189 | 34.0 | + | 9.5 | + |
| Example 12 | EVOH-C | 0.2 | 188 | 34.3 | + | 11.4 | + |
| Comparative Example 6 | EVOH-C | 0.2 | 165 | 42.5 | | 13.6 | |
| Comparative Example 7 | EVOH-C | 0.2 | 193 | 32.6 | + | 9.2 | + |

TABLE 6

| | | Et. Cont | Total content (i + ii) of terminal carboxylic acid unit + terminal lactone ring unit | | Aluminum ion content (b) | | Ratio ((i + ii)/b) | Evaluation before heat/light resistance test aggregates | | elongation at break |
|---|---|---|---|---|---|---|---|---|---|---|
| | | mol % | mol % | μmol/g | ppm | μmol/g | | — | improvement | % |
| Example 13 | EVOH-D | 27 | 0.18 | 32.3 | 0.07 | 0.003 | 10,767 | A | + | 280 |
| Example 14 | EVOH-D | 27 | 0.18 | 32.3 | 0.3 | 0.011 | 2,936 | A | + | 282 |
| Example 15 | EVOH-D | 27 | 0.18 | 32.3 | 2 | 0.074 | 436 | B | + | 282 |
| Comparative Example 8 | EVOH-D | 27 | 0.18 | 32.3 | 0.02 | 0.001 | 32,300 | C | | 280 |
| Comparative Example 9 | EVOH-D | 27 | 0.18 | 32.3 | 5 | 0.185 | 175 | D | – | 282 |

| | | Evaluation before heat/light resistance test mass loss | Evaluation after heat/light resistance test elongation at break | elongation at break reduction percentage | | mass loss | |
|---|---|---|---|---|---|---|---|
| | | % by mass | % | % | improvement | % by mass | improvement |
| Example 13 | EVOH-D | 0.2 | 161 | 42.6 | + | 11.5 | + |
| Example 14 | EVOH-D | 0.2 | 179 | 36.4 | + | 9.7 | + |
| Example 15 | EVOH-D | 0.2 | 171 | 39.2 | + | 10.5 | + |
| Comparative Example 8 | EVOH-D | 0.2 | 158 | 43.4 | | 12.3 | |
| Comparative Example 9 | EVOH-D | 0.2 | 182 | 35.5 | + | 10.2 | + |

TABLE 7

| | | Et. Cont | Total content (i + ii) of terminal carboxylic acid unit + terminal lactone ring unit | | Aluminum ion content (b) | | Ratio ((i + ii)/b) | Evaluation before heat/light resistance test aggregates | | elongation at break |
|---|---|---|---|---|---|---|---|---|---|---|
| | | mol % | mol % | μmol/g | ppm | μmol/g | | — | improvement | % |
| Example 16 | EVOH-E | 24 | 0.14 | 24.9 | 0.07 | 0.003 | 8,300 | A | + | 265 |
| Example 17 | EVOH-E | 24 | 0.14 | 24.9 | 0.3 | 0.011 | 2,264 | A | + | 265 |
| Example 18 | EVOH-E | 24 | 0.14 | 24.9 | 2 | 0.074 | 336 | B | + | 266 |
| Comparative Example 10 | EVOH-E | 24 | 0.14 | 24.9 | 0.02 | 0.001 | 24,900 | C | | 266 |
| Comparative Example 11 | EVOH-E | 24 | 0.14 | 24.9 | 5 | 0.185 | 135 | D | – | 266 |

| | | Evaluation before heat/light resistance test mass loss | Evaluation after heat/light resistance test elongation at break | elongation at break reduction percentage | | mass loss | |
|---|---|---|---|---|---|---|---|
| | | % by mass | % | % | improvement | % by mass | improvement |
| Example 16 | EVOH-E | 0.2 | 166 | 37.5 | + | 13.1 | + |
| Example 17 | EVOH-E | 0.2 | 179 | 32.3 | + | 11.6 | + |
| Example 18 | EVOH-E | 0.2 | 174 | 34.5 | + | 11.3 | + |
| Comparative Example 10 | EVOH-E | 0.2 | 157 | 40.8 | | 14.0 | |
| Comparative Example 11 | EVOH-E | 0.2 | 175 | 34.3 | + | 10.9 | + |

TABLE 8

| | | Et. Cont | Total content (i + ii) of terminal carboxylic acid unit + terminal lactone ring unit | | Aluminum ion content (b) | | Ratio ((i + ii)/b) | Evaluation before heat/light resistance test aggregates | | elongation at break |
|---|---|---|---|---|---|---|---|---|---|---|
| | | mol % | mol % | µmol/g | ppm | µmol/g | | — | improvement | % |
| Example 19 | EVOH-F | 44 | 0.19 | 35.9 | 0.07 | 0.003 | 11,967 | A | + | 419 |
| Example 20 | EVOH-F | 44 | 0.19 | 35.9 | 0.3 | 0.011 | 3,264 | A | + | 420 |
| Example 21 | EVOH-F | 44 | 0.19 | 35.9 | 2 | 0.074 | 485 | B | + | 419 |
| Comparative Example 12 | EVOH-F | 44 | 0.19 | 35.9 | 0.02 | 0.001 | 35,900 | C | | 419 |
| Comparative Example 13 | EVOH-F | 44 | 0.19 | 35.9 | 5 | 0.185 | 194 | D | – | 419 |

| | | Evaluation before heat/light resistance test mass loss | Evaluation after heat/light resistance test elongation at break | elongation at break reduction percentage | | mass loss | |
|---|---|---|---|---|---|---|---|
| | | % by mass | % | % | improvement | % by mass | improvement |
| Example 19 | EVOH-F | 0.2 | 231 | 44.9 | + | 5.4 | + |
| Example 20 | EVOH-F | 0.2 | 252 | 40.1 | + | 4.6 | + |
| Example 21 | EVOH-F | 0.2 | 248 | 40.7 | + | 5.6 | + |
| Comparative Example 12 | EVOH-F | 0.2 | 225 | 46.4 | | 5.9 | |
| Comparative Example 13 | EVOH-F | 0.2 | 242 | 42.2 | + | 4.8 | + |

TABLE 9

| | | Et. Cont | Total content (i + ii) of terminal carboxylic acid unit + terminal lactone ring unit | | Aluminum ion content (b) | | Ratio ((i + ii)/b) | Evaluation before heat/light resistance test aggregates | | elongation at break |
|---|---|---|---|---|---|---|---|---|---|---|
| | | mol % | mol % | µmol/g | ppm | µmol/g | | — | improvement | % |
| Example 22 | EVOH-G | 48 | 0.2 | 38.2 | 0.07 | 0.003 | 12,733 | A | + | 469 |
| Example 23 | EVOH-G | 48 | 0.2 | 38.2 | 0.3 | 0.011 | 3,473 | A | + | 467 |
| Example 24 | EVOH-G | 48 | 0.2 | 38.2 | 2 | 0.074 | 516 | B | + | 469 |
| Comparative Example 14 | EVOH-G | 48 | 0.2 | 38.2 | 0.02 | 0.001 | 38,200 | C | | 468 |
| Comparative Example 15 | EVOH-G | 48 | 0.2 | 38.2 | 5 | 0.185 | 206 | D | – | 467 |

| | | Evaluation before heat/light resistance test mass loss | Evaluation after heat/light resistance test elongation at break | elongation at break reduction percentage | | mass loss | |
|---|---|---|---|---|---|---|---|
| | | % by mass | % | % | improvement | % by mass | improvement |
| Example 22 | EVOH-G | 0.2 | 240 | 48.8 | + | 6.9 | + |
| Example 23 | EVOH-G | 0.2 | 241 | 48.5 | + | 3.9 | + |
| Example 24 | EVOH-G | 0.2 | 239 | 49.0 | + | 4.5 | + |
| Comparative Example 14 | EVOH-G | 0.2 | 225 | 51.9 | | 7.1 | |
| Comparative Example 15 | EVOH-G | 0.2 | 240 | 48.7 | + | 4.0 | + |

TABLE 10

| | | Et. Cont | Total content (i + ii) of terminal carboxylic acid unit + terminal lactone ring unit | | Aluminum ion content (b) | | Ratio ((i + ii)/b) | Evaluation before heat/light resistance test aggregates | | elongation at break |
|---|---|---|---|---|---|---|---|---|---|---|
| | | mol % | mol % | µmol/g | ppm | µmol/g | | — | improvement | % |
| Example 25 | EVOH-H | 52 | 0.3 | 58.0 | 0.07 | 0.003 | 19,333 | C | + | 480 |
| Example 26 | EVOH-H | 52 | 0.3 | 58.0 | 0.3 | 0.011 | 5,273 | B | + | 485 |
| Example 27 | EVOH-H | 52 | 0.3 | 58.0 | 2 | 0.074 | 784 | C | + | 485 |
| Comparative Example 16 | EVOH-H | 52 | 0.3 | 58.0 | 0.02 | 0.001 | 58,000 | D | | 485 |
| Comparative Example 17 | EVOH-H | 52 | 0.3 | 58.0 | 5 | 0.185 | 314 | D | − | 485 |

| | | Evaluation before heat/light resistance test mass loss | Evaluation after heat/light resistance test elongation at break | elongation at break reduction percentage | | mass loss | |
|---|---|---|---|---|---|---|---|
| | | % by mass | % | % | improvement | % by mass | improvement |
| Example 25 | EVOH-H | 0.2 | 209 | 56.5 | + | 5.9 | + |
| Example 26 | EVOH-H | 0.2 | 214 | 55.8 | + | 3.4 | + |
| Example 27 | EVOH-H | 0.3 | 212 | 56.2 | + | 4.4 | + |
| Comparative Example 16 | EVOH-H | 0.2 | 207 | 57.4 | | 6.1 | |
| Comparative Example 17 | EVOH-H | 0.3 | 214 | 55.9 | + | 5.1 | + |

TABLE 11

| | | Et. Cont | Total content (i + ii) of terminal carboxylic acid unit + terminal lactone ring unit | | Aluminum ion content (b) | | Ratio ((i + ii)/b) | Evaluation before heat/light resistance test aggregates |
|---|---|---|---|---|---|---|---|---|
| | | mol % | mol % | µmol/g | ppm | µmol/g | | — |
| Comparative Example 18 | EVOH-I | 24.3 | 0.05 | 8.9 | 0.07 | 0.003 | 2,967 | A |
| Comparative Example 19 | EVOH-I | 24.3 | 0.05 | 8.9 | 0.3 | 0.011 | 809 | B |
| Comparative Example 20 | EVOH-I | 24.3 | 0.05 | 8.9 | 2 | 0.074 | 120 | D |

| | | Evaluation before heat/light resistance test elongation at break % | mass loss % by mass | Evaluation after heat/light resistance test elongation at break % | elongation at break reduction percentage % | mass loss % by mass |
|---|---|---|---|---|---|---|
| Comparative Example 18 | EVOH-I | 266 | 0.2 | 168 | 36.7 | 16.2 |
| Comparative Example 19 | EVOH-I | 266 | 0.3 | 170 | 36.1 | 14.0 |
| Comparative Example 20 | EVOH-I | 266 | 0.3 | 182 | 31.5 | 14.4 |

TABLE 12

| Total content (i + ii) of terminal |
|---|

TABLE 12-continued

| | | Et. Cont | carboxylic acid unit + terminal lactone ring unit | | Aluminum ion content (b) | | Ratio ((i + | Evaluation before heat/ light resistance test aggregates |
|---|---|---|---|---|---|---|---|---|
| | | mol % | mol % | μmol/g | ppm | μmol/g | ii)/b) | — |
| Comparative Example 21 | EVOH-J | 50 | 0.5 | 96.2 | 0.07 | 0.003 | 32,067 | D |
| Comparative Example 22 | EVOH-J | 50 | 0.5 | 96.2 | 0.3 | 0.011 | 8,745 | D |
| Comparative Example 23 | EVOH-J | 50 | 0.5 | 96.2 | 2 | 0.074 | 1,300 | D |

| | | Evaluation before heat/ light resistance test | | Evaluation after heat/light resistance test | | |
|---|---|---|---|---|---|---|
| | | elongation at break % | mass loss % by mass | elongation at break % | elongation at break reduction percentage % | mass loss % by mass |
| Comparative Example 21 | EVOH-J | 470 | 0.2 | 195 | 58.5 | 6.8 |
| Comparative Example 22 | EVOH-J | 470 | 0.2 | 216 | 54.0 | 5.3 |
| Comparative Example 23 | EVOH-J | 470 | 0.2 | 207 | 56.0 | 5.0 |

TABLE 13

| | | Et. Cont | Total content (i + ii) of terminal carboxylic acid unit + terminal lactone ring unit | | Aluminum ion content (b) | | Ratio ((i + | Compound (C) type | Compound (C) content (c) | Evaluation before heat/ light resistance test aggregates |
|---|---|---|---|---|---|---|---|---|---|---|
| | | mol % | mol % | μmol/g | ppm | μmol/g | ii)/b) | | ppm | — |
| Example 28 | EVOH-A | 32 | 0.16 | 29.2 | 0.3 | 0.011 | 2,655 | sorbic acid | 50 | A |
| Example 29 | EVOH-A | 32 | 0.16 | 29.2 | 0.3 | 0.011 | 2,655 | sorbic acid | 200 | A |
| Example 30 | EVOH-A | 32 | 0.16 | 29.2 | 0.3 | 0.011 | 2,655 | sorbic acid | 800 | A |
| Example 31 | EVOH-A | 32 | 0.16 | 29.2 | 0.3 | 0.011 | 2,655 | cinnamic acid | 10 | A |
| Example 32 | EVOH-A | 32 | 0.16 | 29.2 | 0.3 | 0.011 | 2,655 | cinnamic acid | 25 | A |
| Example 33 | EVOH-A | 32 | 0.16 | 29.2 | 0.3 | 0.011 | 2,655 | cinnamic acid | 90 | B |
| Comparative Example 24 | EVOH-A | 32 | 0.16 | 29.2 | — | — | — | sorbic acid | 200 | C |

| | | Evaluation before heat/ light resistance test | | Evaluation after heat/light resistance test | | |
|---|---|---|---|---|---|---|
| | | elongation at break % | mass loss % by mass | elongation at break % | elongation at break reduction percentage % | mass loss % by mass |
| Example 28 | EVOH-A | 350 | 0.2 | 250 | 28.5 | 5.9 |
| Example 29 | EVOH-A | 349 | 0.2 | 255 | 27.0 | 6.5 |
| Example 30 | EVOH-A | 350 | 0.2 | 248 | 29.1 | 6.7 |
| Example 31 | EVOH-A | 349 | 0.2 | 251 | 28.0 | 6.7 |
| Example 32 | EVOH-A | 349 | 0.2 | 254 | 27.2 | 7.1 |
| Example 33 | EVOH-A | 351 | 0.2 | 251 | 28.6 | 5.9 |
| Comparative Example 24 | EVOH-A | 328 | 0.2 | 206 | 37.1 | 11.5 |

TABLE 14

| Total content (i + ii) of terminal carboxylic acid | Evaluation before heat/ |
|---|---|

TABLE 14-continued

| | | Lactone ring unit percentage | unit + terminal lactone ring unit | | Aluminum ion content (b) | | Ratio ((i + | light resistance test aggregates |
|---|---|---|---|---|---|---|---|---|
| | | mol % | mol % | μmol/g | ppm | μmol/g | ii)/b) | — |
| Example 8 (reshown) | EVOH-B | 58 | 0.19 | 34.6 | 0.3 | 0.011 | 3,145 | A |
| Example 34 | EVOH-K | 33 | 0.21 | 38.3 | 0.3 | 0.011 | 3,482 | A |

| | | Evaluation before heat/light resistance test | | Evaluation after heat/light resistance test | | |
|---|---|---|---|---|---|---|
| | | elongation at break | mass loss | elongation at break | elongation at break reduction percentage | mass loss |
| | | % | % by mass | % | % | % by mass |
| Example 8 (reshown) | EVOH-B | 358 | 0.3 | 223 | 37.7 | 4.2 |
| Example 34 | EVOH-K | 314 | 0.3 | 158 | 49.8 | 10.6 |

TABLE 15

| | EVOH (A1) | | EVOH (A2) | | Blend ratio | Total content (i + ii) of terminal carboxylic acid | | | | | Melting |
|---|---|---|---|---|---|---|---|---|---|---|---|
| | type | content (i + ii) | Type | content (i + ii) | (A1/A2) (parts by | unit + terminal lactone ring unit | | Aluminum ion content (b) | | Ratio ((i + | point difference |
| | — | mol % | — | mol % | mass) | mol % | μmol/g | ppm | μmol/g | ii)/b) | (° C.) |
| Example 35 | EVOH-A | 0.16 | EVOH-G | 0.20 | 80/20 | 0.168 | 31.0 | 0.3 | 0.011 | 2,818 | 26 |
| Example 36 | EVOH-A | 0.16 | EVOH-G | 0.20 | 75/25 | 0.170 | 31.5 | 0.3 | 0.011 | 2,859 | 26 |
| Example 37 | EVOH-A | 0.16 | EVOH-G | 0.20 | 70/30 | 0.172 | 31.9 | 0.3 | 0.011 | 2,900 | 26 |
| Example 38 | EVOH-A | 0.16 | EVOH-G | 0.20 | 83/17 | 0.167 | 30.7 | 0.3 | 0.011 | 2,794 | 26 |
| Example 39 | EVOH-B | 0.19 | EVOH-G | 0.20 | 80/20 | 0.192 | 35.2 | 0.3 | 0.011 | 3,204 | 25 |
| Example 40 | EVOH-D | 0.18 | EVOH-A | 0.16 | 60/40 | 0.172 | 31.1 | 0.3 | 0.011 | 2,824 | 7 |
| Example 41 | EVOH-D | 0.18 | EVOH-L | 0.19 | 90/10 | 0.181 | 32.7 | 0.3 | 0.011 | 2,969 | 84 |
| Comparative Example 25 | EVOH-A | 0.16 | EVOH-G | 0.20 | 80/20 | 0.168 | 31.0 | 0.02 | 0.001 | 31,000 | 26 |

| | Evaluation before heat/light resistance test | | | | Evaluation after heat/light resistance test | | | | | Thermo-formed |
|---|---|---|---|---|---|---|---|---|---|---|
| | aggregates | | elongation at break | mass loss | elongation at break | elongation at break reduction percentage | | mass loss | | container bottom |
| | — | improvement | % | % by mass | % | % | improvement | % by mass | improvement | appearance |
| Example 35 | A | + | 355 | 0.3 | 234 | 34.2 | + | 7.1 | + | |
| Example 36 | A | + | 360 | 0.2 | 235 | 34.8 | + | 6.9 | + | |
| Example 37 | A | + | 364 | 0.2 | 236 | 35.2 | + | 6.8 | + | |
| Example 38 | A | + | 350 | 0.3 | 235 | 32.8 | + | 7.3 | + | |
| Example 39 | A | + | 385 | 0.2 | 234 | 39.2 | + | 4.2 | + | |
| Example 40 | A | − | 308 | 0.3 | 197 | 36.2 | + | 6.1 | + | |
| Example 41 | A | + | 350 | 0.3 | 216 | 38.2 | + | 7.5 | + | |
| Comparative Example 25 | C | | 354 | 0.3 | 210 | 40.6 | | 12.1 | | |

TABLE 16

| | Total content (i + ii) of terminal carboxylic acid unit + terminal | Aluminum ion | Ratio | Blend ratio (D/A) (parts | Metal atom (E) | | Evaluation before heat/light resistance test |
|---|---|---|---|---|---|---|---|
| | lactone ring unit | content (b) | ((i + | by | type of | content | aggregates |

TABLE 16-continued

| | | mol % | μmol/g | ppm | μmol/g | ii)/b) | mass) | salt | (ppm) | — |
|---|---|---|---|---|---|---|---|---|---|---|
| Example 42 | EVOH-A | 0.16 | 29.2 | 0.3 | 0.011 | 2655 | 10/90 | magnesium acetate | 100 | A |
| Example 43 | EVOH-D | 0.18 | 32.3 | 0.3 | 0.011 | 2936 | 10/90 | magnesium acetate | 40 | A |
| Example 44 | EVOH-D | 0.18 | 32.3 | 0.3 | 0.011 | 2936 | 10/90 | magnesium stearate | 180 | A |
| Example 45 | EVOH-D | 0.18 | 32.3 | 0.3 | 0.011 | 2936 | 15/85 | magnesium hydroxide | 125 | A |
| Example 46 | EVOH-D | 0.18 | 32.3 | 0.3 | 0.011 | 2936 | 20/80 | magnesium hydroxide | 200 | A |
| Comparative Example 26 | EVOH-A | 0.16 | 29.2 | 0.02 | 0.001 | 29200 | 10/90 | magnesium acetate | 100 | C |

| | | Evaluation before heat/light resistance test | | | Evaluation after heat/light resistance test | | | | |
|---|---|---|---|---|---|---|---|---|---|
| | | aggregates | elongation at break | mass loss | elongation at break | elongation at break reduction percentage | | mass loss | |
| | | improvement | % | % by mass | % | % | improvement | % by mass | improvement |
| Example 42 | EVOH-A | + | 345 | 0.3 | 244 | 29.3 | + | 6.1 | + |
| Example 43 | EVOH-D | + | 336 | 0.2 | 235 | 30.2 | + | 6.5 | + |
| Example 44 | EVOH-D | + | 335 | 0.2 | 232 | 30.8 | + | 6.3 | + |
| Example 45 | EVOH-D | + | 351 | 0.3 | 246 | 29.8 | + | 6.4 | + |
| Example 46 | EVOH-D | + | 372 | 0.2 | 278 | 25.3 | + | 6.3 | + |
| Comparative Example 26 | EVOH-A | | 346 | 0.3 | 228 | 34.2 | | 8.2 | |

| | | OTR $cm^3/m^2$·day·atm 20° C. 65% RH | Retorting resistance |
|---|---|---|---|
| Example 42 | EVOH-A | 0.7 | A |
| Example 43 | EVOH-D | 0.3 | A |
| Example 44 | EVOH-D | 0.3 | A |
| Example 45 | EVOH-D | 0.4 | A |
| Example 46 | EVOH-D | 0.6 | A |
| Comparative Example 26 | EVOH-A | 0.7 | A |

TABLE 17

| | | Total content (i + ii) of terminal carboxylic acid unit + terminal lactone ring unit | | Aluminum ion content (b) | | Ratio ((i + ii)/b) | Thermoplastic elastomer (F) | | Blend ratio (F/A) (parts by mass) | Evaluation before heat/light resistance test aggregates |
|---|---|---|---|---|---|---|---|---|---|---|
| | | mol % | μmol/g | ppm | μmol/g | | type | blend ratio | | — |
| Example 47 | EVOH-D | 0.18 | 32.3 | 0.3 | 0.011 | 2,936 | F-3/F-4 | 10/10 | 20/80 | A |
| Example 48 | EVOH-D | 0.18 | 32.3 | 0.3 | 0.011 | 2,936 | F-5 | — | 10/90 | A |
| Example 49 | EVOH-B | 0.19 | 34.6 | 0.3 | 0.011 | 3,145 | F-6/F-7 | 3/27 | 30/70 | A |
| Example 50 | EVOH-C | 0.15 | 26.9 | 0.3 | 0.011 | 2,445 | F-1 | — | 20/80 | A |
| Example 51 | EVOH-C | 0.15 | 26.9 | 0.3 | 0.011 | 2,445 | F-2 | — | 20/80 | A |
| Example 52 | EVOH-D | 0.18 | 32.3 | 0.3 | 0.011 | 2,936 | F-8 | — | 15/85 | A |
| Comparative Example 27 | EVOH-B | 0.19 | 34.6 | 0.02 | 0.001 | 34,600 | F-6/F-7 | 3/27 | 30/70 | C |

| | | Evaluation before heat/light resistance test | | | Evaluation after heat/light resistance test | | | | | Flex |
|---|---|---|---|---|---|---|---|---|---|---|
| | | aggregates | elongation at break | mass loss | elongation at break | elongation at break reduction percentage | | mass loss | | resistance (no. of |
| | | improvement | % | % by mass | % | % | improvement | % by mass | improvement | pinholes) |
| Example 47 | EVOH-D | + | 390 | 0.3 | 229 | 41.2 | + | 10.9 | + | 10 |
| Example 48 | EVOH-D | + | 369 | 0.2 | 220 | 40.3 | + | 8.9 | + | 15 |

TABLE 17-continued

| | | | | | | | | | | |
|---|---|---|---|---|---|---|---|---|---|---|
| Example 49 | EVOH-B | + | 412 | 0.2 | 240 | 41.8 | + | 12.1 | + | 2 |
| Example 50 | EVOH-C | + | 385 | 0.3 | 228 | 40.8 | + | 9.2 | + | 8 |
| Example 51 | EVOH-C | + | 387 | 0.2 | 229 | 40.9 | + | 9.5 | + | 14 |
| Example 52 | EVOH-D | + | 425 | 0.2 | 249 | 41.4 | + | 9.3 | + | 15 |
| Comparative Example 27 | EVOH-B | | 408 | 0.3 | 222 | 45.6 | | 18.2 | | 20 |

| | | TEM observation |
|---|---|---|
| Example 47 | EVOH-D | sea-island structure |
| Example 48 | EVOH-D | sea-island structure |
| Example 49 | EVOH-B | sea-island structure |
| Example 50 | EVOH-C | sea-island structure |
| Example 51 | EVOH-C | sea-island structure |
| Example 52 | EVOH-D | sea-island structure |
| Comparative Example 27 | EVOH-B | sea-island structure |

TABLE 18

| | | Total content (i + ii) of terminal carboxylic acid unit + terminal lactone ring unit | | Aluminum ion content (b) | | Ratio ((i + | Antioxidant (G) | | Evaluation before heat/ light resistance test aggregates | |
|---|---|---|---|---|---|---|---|---|---|---|
| | | | | | | | | blend amount | | |
| | | mol % | µmol/g | ppm | µmol/g | ii)/b) | type | (% by mass) | — | improvement |
| Example 53 | EVOH-A | 0.16 | 29.2 | 0.3 | 0.011 | 2655 | Irganox 1098 | 0.5 | A | + |
| Example 54 | EVOH-D | 0.18 | 32.3 | 0.3 | 0.011 | 2936 | Irganox 1098 | 0.5 | A | + |
| Comparative Example 28 | EVOH-A | 0.16 | 29.2 | 0.02 | 0.001 | 29200 | Irganox 1098 | 1 | B | |

| | | Evaluation before heat/ light resistance test | | Evaluation after heat/light resistance test | | | | | Oxidative |
|---|---|---|---|---|---|---|---|---|---|
| | | elongation at break | mass loss | elongation at break | elongation at break reduction percentage | | mass loss | | degradation resistance |
| | | % | % by mass | % | % | improvement | % by mass | improvement | [hr] |
| Example 53 | EVOH-A | 343 | 0.3 | 325 | 5.2 | + | 1.2 | + | 280 |
| Example 54 | EVOH-D | 292 | 0.2 | 272 | 6.7 | + | 1.8 | + | 225 |
| Comparative Example 28 | EVOH-A | 338 | 0.3 | 314 | 7.2 | | 2.5 | | 290 |

TABLE 19

| | | Total content (i + ii) of terminal carboxylic acid unit + terminal lactone ring unit | | Aluminum ion content (b) | | Ratio (i + | Evaluation before heat/ light resistance test | | | |
|---|---|---|---|---|---|---|---|---|---|---|
| | | | | | | | aggregates | | elongation at break | mass loss |
| | | mol % | µmol/g | Ppm | µmol/g | ii)/b) | — | improvement* | % | % by mass |
| Example 55 (Example 2) | EVOH-A | 0.16 | 29.2 | 0.3 | 0.011 | 2,655 | A | + | 328 | 0.3 |
| Example 56 (Example 20) | EVOH-F | 0.19 | 35.9 | 0.3 | 0.011 | 3,264 | A | + | 420 | 0.2 |
| Example 57 (Example 23) | EVOH-G | 0.20 | 38.2 | 0.3 | 0.011 | 3,473 | A | + | 467 | 0.2 |
| Comparative Example 29 (Comparative | EVOH-A | 0.16 | 29.2 | 0.02 | 0.001 | 29,200 | C | | 327 | 0.3 |

TABLE 19-continued

Example 1)

| | | Evaluation after heat/light resistance test | | | | | Thermoformed |
| | | elongation at break | elongation at break reduction percentage | | mass loss | | container bottom |
| | | % | % | improvement* | % by mass | improvement* | appearance |
|---|---|---|---|---|---|---|---|
| Example 55 (Example 2) | EVOH-A | 226 | 31.2 | + | 7.8 | + | B |
| Example 56 (Example 20) | EVOH-F | 252 | 40.1 | + | 4.6 | + | A |
| Example 57 (Example 23) | EVOH-G | 241 | 48.5 | + | 3.9 | + | A |
| Comparative Example 29 (Comparative Example 1) | EVOH-A | 206 | 37.1 | | 12.2 | | B |

*Even if the type of EVOH is the same, whether improvement occurred is shown based on the Comparative Examples, in which the aluminum ion amount is 0.02 ppm (0.001 μmol/g) (see Tables 3, 8, 9).

TABLE 20

| | | Total content (i + ii) of terminal carboxylic acid unit + terminal lactone ring unit | | Aluminum ion content (b) | | Ratio ((i + ii)/b) | | Evaluation before heat/ light resistance test | | | | Evaluation after heat/ light resistance test |
| | | | | | | | aggregates | | elongation at break | mass loss | | elongation at break |
| | | mol % | μmol/g | Ppm | μmol/g | — | | improvement* | % | % by mass | | % |
|---|---|---|---|---|---|---|---|---|---|---|---|---|
| Example 58 (Example 2) | EVOH-A | 0.16 | 29.2 | 0.3 | 0.011 | 2,655 | A | + | 328 | 0.3 | | 226 |
| Example 59 (Example 14) | EVOH-D | 0.18 | 32.3 | 0.3 | 0.011 | 2,936 | A | + | 282 | 0.2 | | 179 |
| Example 60 (Example 17) | EVOH-E | 0.14 | 24.9 | 0.3 | 0.011 | 2,264 | A | + | 265 | 0.2 | | 179 |
| Comparative Example 30 (Comparative Example 1) | EVOH-A | 0.16 | 29.2 | 0.02 | 0.001 | 29,200 | C | | 327 | 0.3 | | 206 |

| | | Evaluation after heat/light resistance test | | | | | Blow-molded container evaluation | | |
| | | elongation at break reduction percentage | | mass loss | | | appearance | | impact |
| | | % | improvement* | % by mass | improvement* | | streaks | coloring | resistance |
|---|---|---|---|---|---|---|---|---|---|
| Example 58 (Example 2) | EVOH-A | 31.2 | + | 7.8 | + | | A | A | A |
| Example 59 (Example 14) | EVOH-D | 36.4 | + | 9.7 | + | | B | A | A |
| Example 60 (Example 17) | EVOH-E | 32.3 | + | 11.6 | + | | A | A | A |
| Comparative Example 30 (Comparative Example 1) | EVOH-A | 37.1 | | 12.2 | | | B | A | B |

*Even if the type of EVOH is the same, whether improvement occurred is shown based on the Comparative Examples, in which the aluminum ion amount is 0.02 ppm (0.001 μmol/g) (see Tables 3, 6, 7).

TABLE 21

| Total content (i + ii) of terminal | | Evaluation before heat/ | Evaluation after heat/ |
|---|---|---|---|

TABLE 21-continued

| | | carboxylic acid unit + terminal lactone ring unit | | Aluminum ion content (b) | | Ratio ((i + | light resistance test | | | | light resistance test |
|---|---|---|---|---|---|---|---|---|---|---|---|
| | | | | | | | aggregates | | elongation at break | mass loss | elongation at break |
| | | mol % | µmol/g | ppm | µmol/g | ii)/b) | — | improvement* | % | % by mass | % |
| Example 61 (Example 2) | EVOH-A | 0.16 | 29.2 | 0.3 | 0.011 | 2,655 | A | + | 328 | 0.2 | 226 |
| Example 62 (Example 8) | EVOH-B | 0.19 | 34.6 | 0.3 | 0.011 | 3,145 | A | + | 358 | 0.3 | 223 |
| Example 63 (Example 11) | EVOH-C | 0.15 | 26.9 | 0.3 | 0.011 | 2,445 | A | + | 287 | 0.2 | 189 |
| Example 64 (Example 14) | EVOH-D | 0.18 | 32.3 | 0.3 | 0.011 | 2,936 | A | + | 282 | 0.2 | 179 |
| Comparative Example 31 (Comparative Example 1) | EVOH-A | 0.16 | 29.2 | 0.02 | 0.001 | 29,200 | C | | 326 | 0.3 | 205 |

| | | Evaluation after heat/light resistance test | | | | Film | Vapor deposition film evaluation | | |
|---|---|---|---|---|---|---|---|---|---|
| | | elongation at break reduction percentage | | mass loss | | evaluation impact | inorganic vapor deposition layer thickness | vapor deposition flaw-inhibiting | adhesion |
| | | % | improvement* | % by mass | improvement* | resistance | (nm) | property | strength |
| Example 61 (Example 2) | EVOH-A | 31.2 | + | 7.8 | + | A | 50 | A | A |
| Example 62 (Example 8) | EVOH-B | 37.7 | + | 4.2 | + | A | 50 | A | A |
| Example 63 (Example 11) | EVOH-C | 34.0 | + | 9.5 | + | A | 50 | A | A |
| Example 64 (Example 14) | EVOH-D | 36.4 | + | 9.7 | + | A | 50 | A | A |
| Comparative Example 31 (Comparative Example 1) | EVOH-A | 37.1 | | 12.2 | | B | 50 | B | A |

*Even if the type of EVOH is the same, whether improvement occurred is shown based on the Comparative Examples, in which the aluminum ion amount is 0.02 ppm (0.001 µmol/g) (see Tables 3, 4, 5, 6).

TABLE 22

| | | Total content (i + ii) of terminal carboxylic acid unit + terminal lactone ring unit | | Aluminum ion content (b) | | Ratio ((i + | Evaluation before heat/light resistance test | | | |
|---|---|---|---|---|---|---|---|---|---|---|
| | | | | | | | aggregates | | elongation at break | mass loss |
| | | mol % | µmol/g | Ppm | µmol/g | ii)/b) | — | improvement* | % | % by mass |
| Example 65 (Example 2) | EVOH-A | 0.16 | 29.2 | 0.3 | 0.011 | 2,655 | A | + | 328 | 0.2 |
| Example 66 (Example 11) | EVOH-C | 0.15 | 26.9 | 0.3 | 0.011 | 2,445 | A | + | 287 | 0.2 |
| Comparative Example 32 (Comparative Example 1) | EVOH-A | 0.16 | 29.2 | 0.02 | 0.001 | 29,200 | C | | 326 | 0.3 |

| Evaluation after heat/light resistance test | | | | | Plant medium evaluation | |
|---|---|---|---|---|---|---|
| elongation at break | elongation at break reduction percentage | | mass loss | | no. of enlarged | fine powder-inhibiting |
| % | % | improvement* | % by mass | improvement* | roots | property |

TABLE 22-continued

| | | | | | | | | |
|---|---|---|---|---|---|---|---|---|
| Example 65 (Example 2) | EVOH-A | 226 | 31.2 | + | 7.8 | + | 14 | A |
| Example 66 (Example 11) | EVOH-C | 189 | 34.0 | + | 9.5 | + | 14 | A |
| Comparative Example 32 (Comparative Example 1) | EVOH-A | 205 | 37.1 | | 12.2 | | 14 | C |

*Even if the type of EVOH is the same, whether improvement occurred is shown based on the Comparative Examples, in which the aluminum ion amount is 0.02 ppm (0.001 μmol/g) (see Tables 3, 5).

Observations

As shown in Table 3, in the resin composition of Comparative Example 3, which does not contain the aluminum ion, the effect of inhibiting the generation of aggregates is insufficient, and the heat/light resistance (the reduction percentage of the elongation at break) and the resistance to breaking down into microplastic (the mass loss in the evaluation after the heat/light resistance test) were comparatively high. Conversely, with regard to the resin composition of Comparative Example 1, which contained a small amount of the aluminum ion, while there was a tendency for these to be improved with respect to the resin composition of Comparative Example 3, the improvement effect was low. Furthermore, with regard to the resin composition of Comparative Example 2, which contained a large amount of the aluminum ion, the effect of inhibiting the generation of aggregates was not improved. In contrast, it was revealed that with regard to the resin composition of each of Examples 1 to 6, in which the content (b) of the aluminum ion (B) per gram of the EVOH (A) fell within the range of 0.002 μmol/g or more and 0.17 μmol/g or less, the aggregate-inhibiting effect, the heat/light resistance, and the resistance to breaking down into microplastic were improved further than in the resin composition of Comparative Example 1, which contained a small amount of the aluminum ion.

Tables 4 to 10 show the results obtained by using other EVOHs. From these as well, similar to the results of Table 3, it was revealed that in the case in which the content (b) of the aluminum ion (B) per gram of the EVOH (A) fell within the range of 0.002 μmol/g or more and 0.17 μmol/g or less, the aggregate-inhibiting effect, the heat/light resistance, and the resistance to breaking down into microplastic improved were improved.

Furthermore, as shown in Table 3, in the case in which the content of the aluminum ion was low (0.02 ppm, 0.001 μmol/g), the improvement effect was insufficient; thus, in each of Tables 4 to 10 as well, the Comparative Examples in which the content of the aluminum ion was 0.02 ppm (0.001 μmol/g) were adopted as a standard, whereby the resin compositions being further improved were evaluated as "+" and the resin compositions not being improved were evaluated as "−", and these were indicated in each table.

On the other hand, as shown in Table 11, in the case in which the total content (i+ii) of the terminal carboxylic acid unit and the terminal lactone ring unit (i+ii) was too low, even if the content of the aluminum ion was adjusted, the mass loss in the evaluation after the heat/light resistance test became 14.0% by mass or more, whereby the EVOH did not have sufficient resistance to breaking down into microplastic. Furthermore, as shown in Table 12, in the case in which the total content (i+ii) of the terminal carboxylic acid unit and the terminal lactone ring unit (i+ii) was too high, even if the content of the aluminum ion was adjusted, the aggregate evaluation was D, whereby the EVOH could not sufficiently inhibit the generation of aggregates.

From the above results, it was revealed that in the case of having the total content (i+ii) of the carboxylic acid unit (I) and the lactone ring unit (II) per gram of the ethylene-vinyl alcohol copolymer (A) fall within the range of 14 μmol/g or more and 78 μmol/g or less, having the content (b) of the aluminum ion (B) per gram of the ethylene-vinyl alcohol copolymer (A) fall within the range of 0.002 μmol/g or more and 0.17 μmol/g or less enables obtaining a resin composition in which the generation of aggregates at the time of melt molding is inhibited, and obtaining a molded product which has sufficient heat/light resistance and is unlikely to break down into microplastic after discarding is enabled, wherein the above-mentioned characteristics are sufficiently improved compared to a resin composition obtained using the same EVOH.

Furthermore, as shown in Table 13, it was revealed that by further containing, in addition to the aluminum ion, at least one type of the compound selected from the group consisting of a cinnamic acid and a conjugated polyene compound having a molecular weight of 1,000 or less, the heat/light resistance and the resistance to breaking down into microplastic are improved.

As shown in Table 14, it was revealed that when comparing Example 8 with Example 34, in which were used EVOHs which were almost the same except for the lactone ring unit percentage, Example 8, in which EVOH-B, having a high lactone ring unit percentage, was used, was superior in terms of the heat/light resistance and the resistance to breaking down into microplastic.

It is to be noted that in Tables 15 to 18, with regard to the aggregate-inhibiting effect, the heat/light resistance, and the resistance to breaking down into microplastic, the Comparative Examples in each table were adopted as the standard, whereby the resin compositions being further improved were evaluated as "+" and the resin compositions not being improved were evaluated as "−", and these were indicated in the tables. However, by, for example, comparing Comparative Example 25 with Example 35 in Table 15, comparing Comparative Example 26 with Example 42 in Table 16, comparing Comparative Example 27 with Example 49 in Table 17, and comparing Comparative Example 28 with Example 53 in Table 18, it can be confirmed that when comparing resin compositions in which the same type of EVOH was used, in the resin compositions of the Examples, the aggregate-inhibiting effect, the heat/light resistance, and the resistance to breaking down into microplastic were improved.

On the other hand, Tables 19 to 22 reshow the results of evaluations for the corresponding resin composition pellets used. The same type of EVOH is used, and the Comparative Examples, in which the content of the aluminum ion was 0.02 ppm (0.001 μmol/g) were adopted as the standard, whereby the resin compositions being further improved were evaluated as "+" and the resin compositions not being improved were evaluated as "−". In other words, the "improvement" field in Tables 19 to 22 does not indicate whether each resin composition was improved in comparison to the Comparative Example in the same table.

Example 67: Production of Silage Film

A silage film having a width of 500 mm a total thickness of 25.5 μm was produced by using the resin composition pellets obtained in Example 2 and the following resins to form a film under the following conditions, followed by trimming.

Apparatus: film formation apparatus for blown film of 7 layers involving 7 types (manufactured by Brampton Engineering)

Layer Constitution and Thickness of Each Layer:

outer layer 1/outer layer 2/adhesive resin layer 1/resin composition layer/adhesive resin layer 2/outer layer 3/outer layer 4

Outer layers 1 and 4: a melt-kneaded product of 97% by mass linear low-density polyethylene (TUFLIN HS-7028 NT7, manufactured by Dow Chemical Company (MFR 1.0 g/10 min)) and 3% by mass polyisobutene (PB32, manufactured by Soltex); 6 μm each Outer layers 2 and 3: a melt-kneaded product of 90% by mass linear low-density polyethylene (TUFLIN HS-7028 NT7 manufactured by Dow Chemical Company (MFR 1.0 g/10 min)) and 10% by mass polyisobutene (PB32, manufactured by Soltex); 4 μm each Adhesive resin layers 1 and 2: maleic anhydride-modified linear low-density polyethylene (Admer NF498, manufactured by Mitsui Chemicals, Inc.); 2.0 μm each Resin composition layer: resin composition obtained in Example 2; 1.5 μm Film Formation Conditions Extruder Extruder 1: 45 mmφ single screw extruder (L/D=24) outer layer 1

Extruder 2: 30 mmφ single screw extruder (L/D=24) outer layer 2

Extruder 3: 30 mmφ single screw extruder (L/D=24) outer layer 3

Extruder 4: 45 mmφ single screw extruder (L/D=24) outer layer 4

Extruder 5: 30 mmφ single screw extruder (L/D=24) adhesive resin layer 1

Extruder 6: 30 mmφ single screw extruder (L/D=24) adhesive resin layer 2

Extruder 7: 30 mmφ single screw extruder (L/D=20) resin composition layer

Preset Temperature and Rotation Speed:

Extruders 1, 4: C1/C2/C3/A=180° C./190° C./205° C./205° C.; 27 rpm

Extruders 2, 3: C1/C2/C3/A=180° C./190° C./205° C./205° C.; 69 rpm

Extruders 5, 6: C1/C2/C3/A=190° C./225° C./215° C./220° C.; 26 rpm

Extruder 7: C1/C2/C3/A=180° C./210° C./215° C./220° C.; 19 rpm

Die: 150 mm, preset temperature 220° C.

Blow up rate: 3.09

Wrapping Test

A bale of meadow grass shaped into a size of φ 120 cm×120 cm was wrapped five times using the silage film thus obtained and WM1600R (manufactured by Takakita Co., Ltd.), a remote control wrapper. The silage film thus obtained was able to favorably wrap the bale of grass, and it was confirmed to be appropriate as a silage film.

Example 68: Production of Soil Fumigation Film

A soil fumigation film having a width of 1,400 mm and a total thickness of 35 μm was produced by similar production conditions to those of the silage film of Example 67, except that the resin composition pellets obtained in Example 2 and the following resins were used, a resin composition constituting the outer layer A was extruded with extruders 1 and 2, a resin composition constituting the outer layer D was extruded with extruders 3 and 4, a resin composition constituting the adhesive resin layers B and C was extruded with extruders 5 and 6, and a resin composition constituting the resin composition layer was extruded with extruder 7, followed by trimming.

Layer Constitution and Thickness of Each Layer:

outer layer A/adhesive resin layer B/resin composition layer/adhesive resin layer C/outer layer D Resins Used LLDPE: SCLAIR FP120-A (manufactured by NOVA Chemicals Corporation)

mLLDPE: ELITE540TG (manufactured by Dow Chemical Company)

black MB: Ampacet 190580 (manufactured by Ampacet Corporation)

white MB: Ampacet 112122 (manufactured by Ampacet Corporation)

UVI MB: Ampacet 100840 (manufactured by Ampacet Corporation)

Slip MB Ampacet 10090 (manufactured by Ampacet Corporation)

Outer layer A: melt-kneaded product of LLDPE/mLLDPE/black MB/UVI MB/Slip MB=68/20/10/4/4% by mass; thickness of extruder 1: 10 μm; thickness of extruder 2: 4.5 μm; total: 14.5 μm Outer layer D: melt-kneaded product of LLDPE/mLLDPE/white MB/UVI MB/Slip MB=68/20/10/4/4% by mass; thickness of extruder 3: 10 μm; thickness of extruder 4: 4.5 μm; total: 14.5 μm Adhesive resin layers B, C: Admer AT2474A (manufactured by Mitsui Chemicals, Inc.); 2 μm each Resin composition layer: resin composition obtained in Example 2; 2 μm Rewinding Resistance Test The soil fumigation film was stretched and rolled onto a field from a film roll, and after usage, was rewound onto the film roll and repeatedly used. After conducting the process of rolling and rewinding the soil fumigation film 100 times, the film breakage was evaluated. No breakage of the soil fumigation film was recognized.

Example 69: Production of Grain Storage Bag

A film for a grain storage bag having a width of 900 mm and a total thickness of 230 μm was produced by similar production conditions to those of the silage film of Example 67, except that the resin composition pellets obtained in Example 2 and the following resins were used, a resin constituting the outer layer A was extruded with extruders 1 and 2, a resin constituting the outer layer D was extruded with extruders 3 and 4, a resin constituting the adhesive resin layers B and C were extruded with extruders 5 and 6, and a resin constituting the resin composition layer was extruded with extruder 7, the die was 75 mm, and the blow up rate was 1.5, followed by trimming. From the film thus obtained, a 400 mm×700 mm bag was produced, and was defined as a grain storage bag.

Layer Constitution and Thickness of Each Layer:

outer layer A/adhesive resin layer B/resin composition layer/adhesive resin layer C/outer layer D Resins Used Outer layers A, D: LLDPE; SCLAIR FP120-A (Nova Chemicals Corporation); thickness of extruders 1 and 3: 50 μm each; thickness of extruders 2 and 4: 47 μm each; total: 97 μm each Adhesive resin layers B, C: Admer NF498A (manufactured by Mitsui Chemicals, Inc.); 12 μm each Resin composition layer: resin composition obtained in Example 2; 12 μm Germinability Test Into the grain storage bag thus obtained were packed 50 kg of soybeans, which were stored outdoors for 180 days. One hundred of the soybeans following storage were randomly extracted, and were made to absorb water in purified water at 15° C. for 24 hrs. On a petri dish with a diameter of 150 mm, absorbent cotton as a medium was spread so as to have minimal bulkiness, filter paper was spread on top, water was added so as to soak the filter paper, and the soybeans were lined up so as not to overlap, in a quantity of 50 soybeans for one petri dish. Observation was conducted for 7 days in a 20° C. incubator, and a number of germinations was determined, with a state in which a bud and a root extended 1 mm or more from each soybean was defined as a germinating state. The germinability of the soybeans was evaluated based on the number of germinations, and the germinability of the soybeans following storage was about the same as that of the soybeans before storage.

Example 70: Production of Geomembrane

A geomembrane having a width of 225 mm and a total thickness of 500 μm was produced by similar production conditions to those of the grain storage bag of Example 69, except that the resin composition pellets obtained in Example 2 and the following resins were used, a resin constituting the outer layer A was extruded with extruders 1 and 2, a resin constituting the outer layer D was extruded with extruders 3 and 4, a resin constituting the adhesive resin layers B and C was extruded with extruders 5 and 6, and a resin constituting the resin composition layer was extruded with extruder 7, followed by trimming.

Layer Constitution and Thickness of Each Layer:

outer layer A/adhesive resin layer B/resin composition layer/adhesive resin layer C/outer layer D Resins Used Outer layers A, D: LLDPE; SCLAIR FP120-A (Nova Chemicals Corporation); thickness of extruders 1 and 3: 110 μm each; thickness of extruders 2 and 4: 110 μm each; total: 220 μm each Adhesive resin layers B, C: Admer AT2474A (manufactured by Mitsui Chemicals, Inc.), each being 20 μm Resin composition layer: resin composition obtained in Example 2; 20 μm Landfilling Test In the ground, two holes having a width of 50 cm×50 cm and a depth of 30 cm were dug, garbage was packed inside, and one of the holes was covered with 500 μm of polyethylene film, and the other hole was covered with the geomembrane thus obtained. After 30 days had passed, the surrounding odor was evaluated. Odor was sensed around the polyethylene film, but no odor was sensed around the geomembrane.

INDUSTRIAL APPLICABILITY

The resin composition of the embodiment of the present invention is useful as a molding material for various types of molded products, laminates, and the like.

EXPLANATION OF THE REFERENCE SYMBOLS

1 Cup-shaped container
10 Cup main body
10A Layer (α) constituted from resin composition
10B Thermoplastic resin layer (β)
10C Polyolefin layer (γ)
10D Layer (δ) containing EVOH, thermoplastic resin, and carboxylic acid-modified polyolefin
11 Flange portion
12 Opening
13 Inner surface
14 Outer surface
2 Lid
3 Continuous multilayer body
4 Heating apparatus
40, 41 Heater
5 Die apparatus
50 Lower mold half
51 Upper mold half
52 Recessed part
53 Plug
101 Layer (α) constituted from resin composition
102 Thermoplastic resin layer (β)
103 Polyolefin layer (γ)
104 Layer (δ) containing EVOH, thermoplastic resin, and carboxylic acid-modified polyolefin
105 Blow-molded container
106 Container inner surface
107 Container outer surface

The invention claimed is:

1. A resin composition comprising: an ethylene-vinyl alcohol copolymer (A); and an aluminum ion (B), wherein at least a part of the ethylene-vinyl alcohol copolymer (A) comprises, at a polymer end, at least one of a carboxylic acid unit (I) and a lactone ring unit (II), a total content (i+ii) of the carboxylic acid unit (I) and the lactone ring unit (II) per gram of the ethylene-vinyl alcohol copolymer (A) is 14 μmol/g or more and 78 μmol/g or less, a content (b) of the aluminum ion (B) per gram of the ethylene-vinyl alcohol copolymer (A) is 0.002 μmol/g or more and 0.17 μmol/g or less, and the aluminum ion (B) is derived from a fatty acid aluminum salt having 5 or fewer carbon atoms.

2. The resin composition according to claim 1, wherein a ratio ((i+ii)/b) of the total content (i+ii) of the carboxylic acid unit (I) and the lactone ring unit (II) to the content (b) of the aluminum ion (B) is 180 or more and 20,000 or less.

3. The resin composition according to claim 1, further comprising at least one type of a compound (C) selected from the group consisting of a cinnamic acid component and a conjugated polyene compound having a molecular weight of 1,000 or less, wherein a content (c) of the compound (C) with respect to the ethylene-vinyl alcohol copolymer (A) is 1 ppm or more and 1,000 ppm or less.

4. The resin composition according to claim 1, wherein a proportion (ii/(i+ii)) of a content (ii) of the lactone ring unit (II) with respect to the total content (i+ii) of the carboxylic acid unit (I) and the lactone ring unit (II) is 40 mol % or more.

5. The resin composition according to claim 1, wherein the ethylene-vinyl alcohol copolymer (A) comprises:

an ethylene-vinyl alcohol copolymer (A1) having an ethylene unit content of 20 mol % or more and 50 mol % or less; and an ethylene-vinyl alcohol copolymer (A2) having an ethylene unit content of 30 mol % or more and 60 mol % or less, a value obtained by subtracting the ethylene unit content of the ethylene-vinyl alcohol copolymer (A1) from the ethylene unit content of the ethylene-vinyl alcohol copolymer (A2) is 5 mol % or more, and a mass ratio (A1/A2) of the ethylene-vinyl alcohol copolymer (A1) to the ethylene-vinyl alcohol copolymer (A2) is 60/40 or more and 95/5 or less.

6. The resin composition according to claim 1, further comprising: a polyamide (D); and at least one type of a metal atom (E) selected from the group consisting of atoms of magnesium, calcium, and zinc, wherein a mass ratio (D/A) of the polyamide (D) to the ethylene-vinyl alcohol copolymer (A) is 5/95 or more and 40/60 or less, and a content (e), in terms of metal element equivalent, of the metal atom (E) with respect to the ethylene-vinyl alcohol copolymer (A) is 1 ppm or more and 500 ppm or less.

7. The resin composition according to claim 1, further comprising a thermoplastic elastomer (F), wherein a mass ratio (F/A) of the thermoplastic elastomer (F) to the ethylene-vinyl alcohol copolymer (A) is 5/95 or more and 35/65 or less.

8. The resin composition according to claim 7, wherein the thermoplastic elastomer (F) is at least one selected from the group consisting of a thermoplastic polyester elastomer, a thermoplastic polystyrene elastomer, and a thermoplastic polyolefin elastomer.

9. The resin composition according to claim 1, further comprising an antioxidant (G), wherein a content (g) of the antioxidant (G) with respect to the ethylene-vinyl alcohol copolymer (A) is 0.01% by mass or more and 5% by mass or less.

10. The resin composition according to claim 1, further comprising an inorganic particle (H), wherein a content (h) of the inorganic particle (H) with respect to the ethylene-vinyl alcohol copolymer (A) is 50 ppm or more and 5,000 ppm or less.

11. A molded product formed from the resin composition according to claim 1.

12. A laminate comprising: a layer constituted from the resin composition according to claim 1; and at least one other layer.

13. A thermoformed container comprising a layer constituted from the resin composition according to claim 1.

14. A blow-molded container comprising a layer constituted from the resin composition according to claim 1.

15. A film comprising a layer constituted from the resin composition according to claim 1.

16. The film according to claim 15, further comprising an inorganic vapor deposition layer.

17. An agricultural film comprising a layer constituted from the resin composition according to claim 1.

18. A plant medium constituted from the resin composition according to claim 1.

19. A pipe comprising a layer constituted from the resin composition according to claim 1.

* * * * *